United States Patent
Mochizuki et al.

(10) Patent No.: US 9,820,254 B2
(45) Date of Patent: Nov. 14, 2017

(54) MOBILE COMMUNICATION SYSTEM

(75) Inventors: Mitsuru Mochizuki, Tokyo (JP); Miho Maeda, Tokyo (JP); Shinsuke Uga, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/237,750

(22) PCT Filed: Aug. 9, 2012

(86) PCT No.: PCT/JP2012/070365
§ 371 (c)(1),
(2), (4) Date: Feb. 7, 2014

(87) PCT Pub. No.: WO2013/022067
PCT Pub. Date: Feb. 14, 2013

(65) Prior Publication Data
US 2014/0206352 A1 Jul. 24, 2014

(30) Foreign Application Priority Data

Aug. 9, 2011 (JP) .................................. 2011-173756

(51) Int. Cl.
*H04W 4/00* (2009.01)
*H04W 60/04* (2009.01)
(Continued)

(52) U.S. Cl.
CPC ............ *H04W 60/04* (2013.01); *H04W 16/26* (2013.01); *H04W 88/085* (2013.01)

(58) Field of Classification Search
CPC ....... H04W 60/00; H04W 60/04; H04W 8/08; H04W 84/00; H04W 8/04; H04W 8/26;
(Continued)

(56) References Cited

U.S. PATENT DOCUMENTS 7,058,410 B2 * 6/2006 Hiyama ................ H04W 88/02
342/357.4
8,693,438 B2 * 4/2014 Takahashi ......... H04W 36/0061
370/331

(Continued)

FOREIGN PATENT DOCUMENTS

CN 102118808 A 7/2011
EP 2 683 195 A1 1/2014
(Continued)

OTHER PUBLICATIONS

International Preliminary Report on Patentability and Written Opinion issued Feb. 20, 2014 in PCT/JP2012/070365 with English Translation.

(Continued)

*Primary Examiner* — Kathy Wang-Hurst
*Assistant Examiner* — B.M. M Hannan
(74) *Attorney, Agent, or Firm* — Oblon, McClelland, Maier & Neustadt, L.L.P.

(57) ABSTRACT

A mobile communication system capable of performing communication between a user equipment device connected to a relay device and a core network if the relay device moves. A relay device sets a tracking area of a base station device to be connected with the own device as a tracking area of the own device. For example, when the relay device moves along an arrow, the tracking area of the relay device is changed from a first tracking area to which a fourth base station device belongs to a third tracking area to which a tenth base station device belongs. Upon change of the tracking area of the relay device as described above, a user equipment device transmits a tracking area update request signal of the own device to a target second mobility management entity.

5 Claims, 44 Drawing Sheets

(51) Int. Cl.
*H04W 16/26* (2009.01)
*H04W 88/08* (2009.01)

(58) Field of Classification Search
CPC ..... H04W 12/06; H04W 88/04; H04W 16/26; H04W 76/02; H04W 84/047; H04W 24/02; H04W 84/005; H04W 8/02; H04W 36/0005; H04W 36/0011; H04W 36/0061; H04W 36/165; H04W 48/10; H04W 48/14; H04W 4/08; H04W 88/08; H04W 88/085; H04W 8/265; H04W 92/14; H04W 92/20; H04B 7/2606; H04B 7/155; H04L 2001/0097; H04L 61/103; H04L 61/6095; H04L 63/062
USPC ........... 370/315, 241.1, 328, 331; 455/435.1, 455/456.1, 422.1, 439
See application file for complete search history.

(56) References Cited

U.S. PATENT DOCUMENTS

| | | | | |
|---|---|---|---|---|
| 2010/0039991 | A1* | 2/2010 | Godin | H04W 24/02 370/328 |
| 2010/0056175 | A1* | 3/2010 | Bachmann | H04W 8/08 455/456.1 |
| 2010/0311419 | A1* | 12/2010 | Bi | H04W 60/00 455/435.1 |
| 2011/0306363 | A1* | 12/2011 | Wang | H04W 24/02 455/456.1 |
| 2012/0039246 | A1* | 2/2012 | Zhang et al. | 370/315 |
| 2012/0276910 | A1* | 11/2012 | Zhang | H04W 36/0005 455/439 |
| 2012/0320817 | A1* | 12/2012 | Xu | H04W 8/08 370/315 |
| 2013/0344890 | A1* | 12/2013 | Hahn et al. | 455/456.1 |
| 2014/0128068 | A1* | 5/2014 | Klein | H04W 84/005 455/435.1 |

FOREIGN PATENT DOCUMENTS

| | | |
|---|---|---|
| WO | WO 2010/089949 A1 | 8/2010 |
| WO | WO 2010/124458 A1 | 11/2010 |

OTHER PUBLICATIONS

International Search Report issued Nov. 13, 2012, in PCT/JP12/070365 filed Aug. 9, 2012.
3GPP TS 36.300 v10.2.0, 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), (Dec. 2010), 200 pages.
3GPP TS 36.331 v10.0.0, 3rd Generation Partnership Project; Technical Specification Group Radio Access Network; Evolved Universal Terrestrial Radio Access (E-UTRA); Radio Resource Control (REC); Protocol specification (Release 10), (Dec. 2010), 276 pages.
3GPP TS 36.304 v10.0.0, 3rd Generation Partnership Project; Technical Specification Group Radio Access Network; Evolved Universal Terrestrial Radio Access (E-UTRA); User Equipment (UE) procedures in idle mode (Release 10), (Dec. 2010),33 pages.
3GPP TSG-SA1#42, S1-083461, "LS on HNB/HeNB Open Access Mode", Oct. 13-17, 2008, 2 pages.
3GPP TSG-RAN WG 2 meeting #62, R2-082899, "LS on CSG cell identification", May 5-9, 2008, 2 pages.
3GPP TR 36.814 v9.0.0, 3rd Generation Partnership Project; Technical Specification Group Radio Access Network; Evolved Universal Terrestrial Radio Access (E-UTRA); Further advancements for E-UTRA physical layer aspects (Release 9), (Mar. 2010),104 pages.
3GPP TR 36.912 v9.3.0, 3rd Generation Partnership Project; Technical Specification Group Radio Access Network; Feasibility study for Further Advancements for E-UTRA (LTE-Advanced) (Release 9), (Jun. 2010), 202 pages.
3GPP TS 36.101 v10.0.0, 3rd Generation Partnership Project; Technical Specification Group Radio Access Network; Evolved Universal Terrestrial Radio Access (E-UTRA); User Equipment (UE) radio transmission and reception (Release 10), (Oct. 2010), 188 pages.
3GPP TR 23.830 v9.0.0, 3rd Generation Partnership Project; Technical Specification Group Services and System Aspects; Architecture aspects of Home NodeB and Home eNodeB (Release 9), (Sep. 2009), 55 pages.
3GPP TS 23.401 v10.3.0, 3rd Generation Partnership Project; Technical Specification Group Services and System Aspects; General Packet Radio Service (GPRS) enhancements for Evolved Universal Terrestrial Radio Access Network (E-UTRAN) access (Release 10), (Mar. 2011), 278 pages.
TSG-RAN WG1 #54, R1-082975, "Application Scenarios for LTE-Advanced Relay", Aug. 18-22, 2008, 7 pages.
3GPP TSG-RAN WG3 #71, R3-110656, "Requirements for supporting high speed train scenario in LTE", Feb. 21-25, 2011, 3 pages.
3GPP TSG RAN WG3 Meeting #64, R3-091335, "Additional consideration for Type 1 Relay", May 4-8, 2009, 3 pages.
3GPP TS 23.003 v9.0.0, 3rd Generation Partnership Project; Technical Specification Group Core Network and Terminals; Numbering, addressing and identification (Release 9), (Sep. 2009), 72 pages.
Extended European Search Report issued Sep. 15, 2015 in Patent Application No. 12821393.1.
"Signaling Routing Options for Relays" 3GPP TSG RAN WG3 Meeting AH, Mitsubishi Electric, R3-101845, XP050453760, 2010, 4 pages.
"TA configuration for Mobile Relay" 3GPP TSG RAN WG3 Meeting #77, New Postcom, R3-121680, XP050669456, 2012, 3 pages.
"TA configuration for Mobile Relay" 3GPP TSG RAN WG3 Meeting #75bis, New Postcom, R3-120636, XP050668993, 2012, 3 pages.
"Open Problems on Tracking Area Update" 3GPP TSG-RAN WG3 Meeting #76, LG Electronics Inc., R3-121188, XP050611237, 2012, 2 pages.
"TAU and Reconfiguration issues for Mobile Relay" 3GPP TSG-RAN WG3 Meeting #74, Institute for Information Industry (III), Coiler Corporation, R3-112964, XP050566246, 2 pages.
"Further discussion on scenario and requirements for mobile relays" 3GPP TSG-RAN WG3 Meeting #74, Nokia Siemens Networks, R3-112861, XP050566080, 2 pages.
Office Action issued on Sep. 2, 2016 in Japanese Patent Application No. 2013-528067, and an English translation.
Office Action issued on Dec. 27, 2016 in Chinese Application No. 201280038810.5, along with its English translation.
Office Action issued on Apr. 25, 2017 in Japanese Application No. 2013-528067, and an English translation.
Office Action issued Aug. 25, 2017 in Chinese Application No. 201280038810.5, along with an English translation.

* cited by examiner

F I G . 1
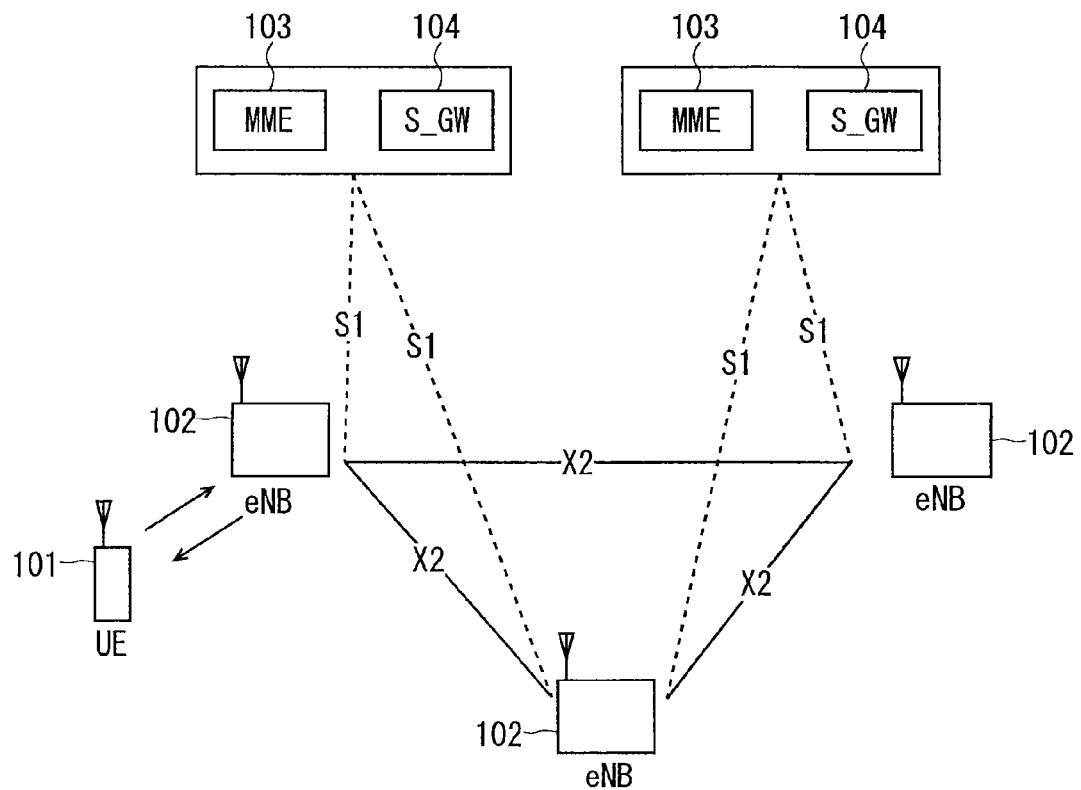

F I G . 2
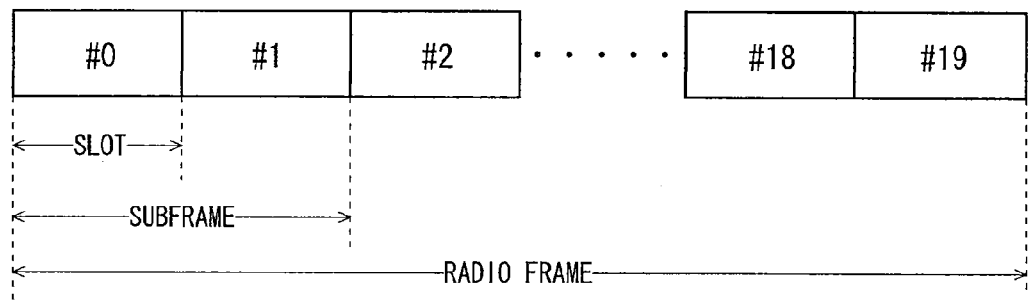

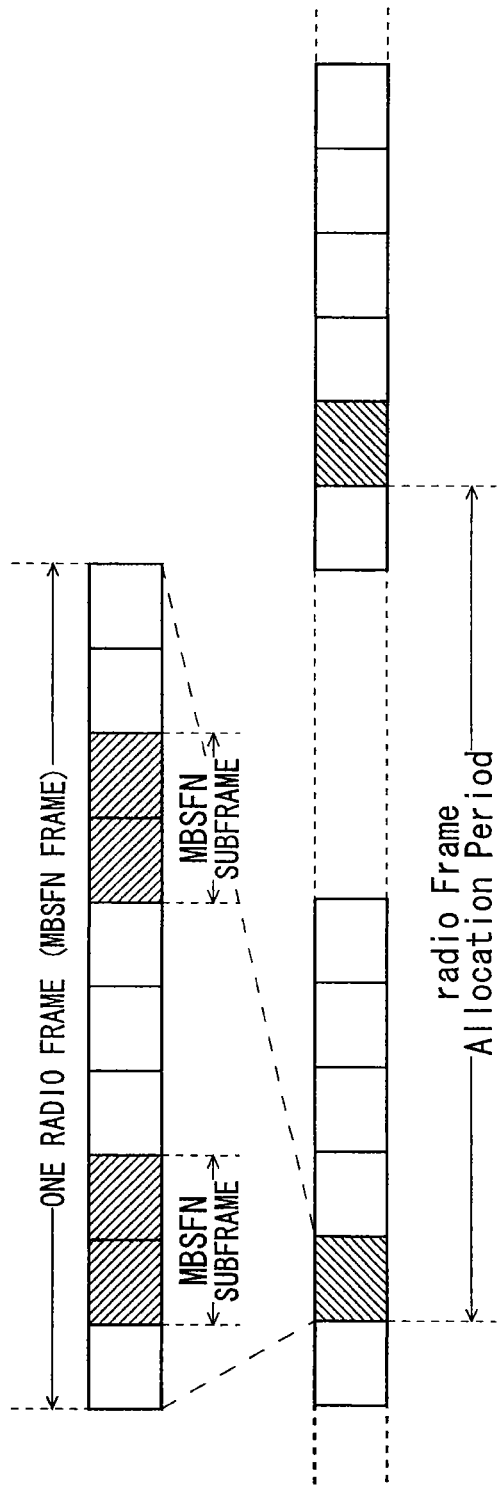

F I G. 4
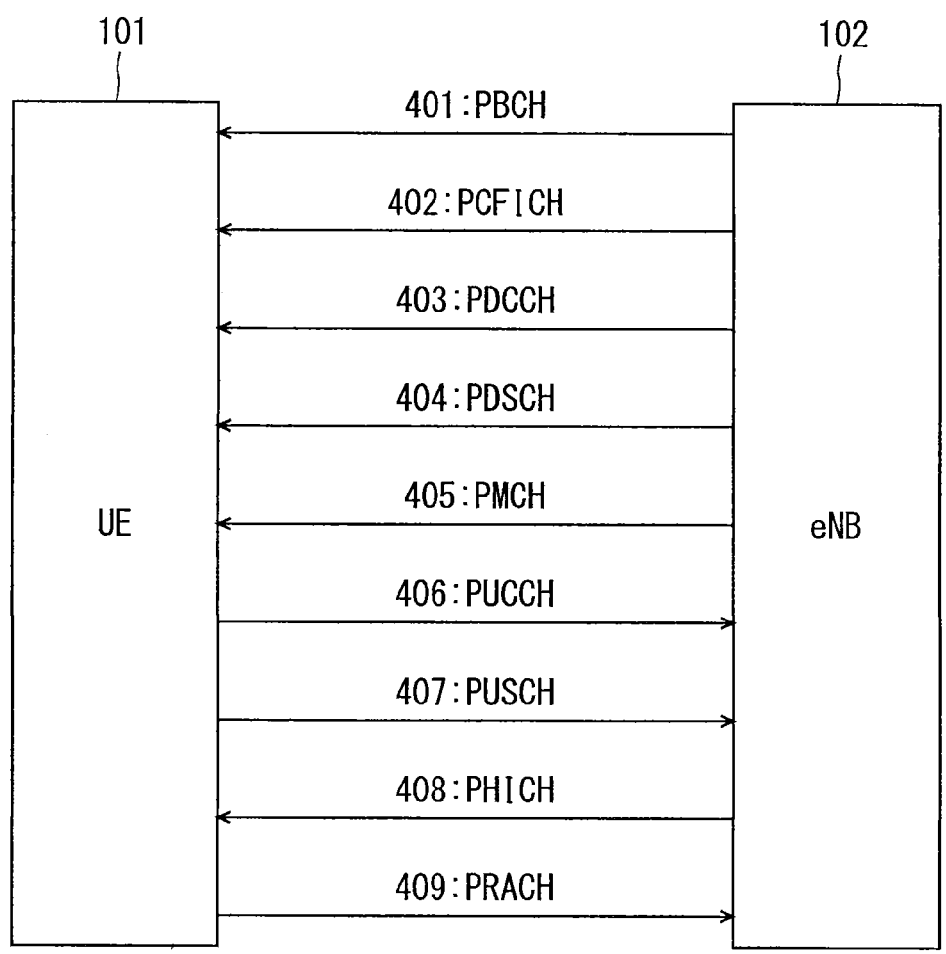

F I G . 5
(A)
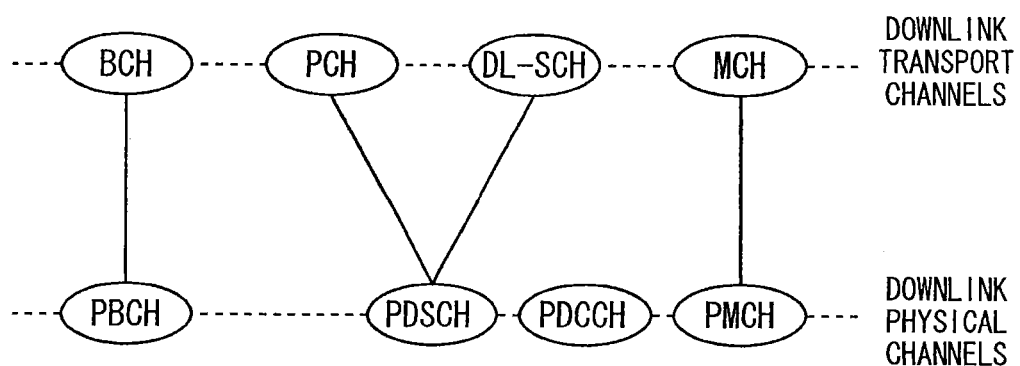
(B)
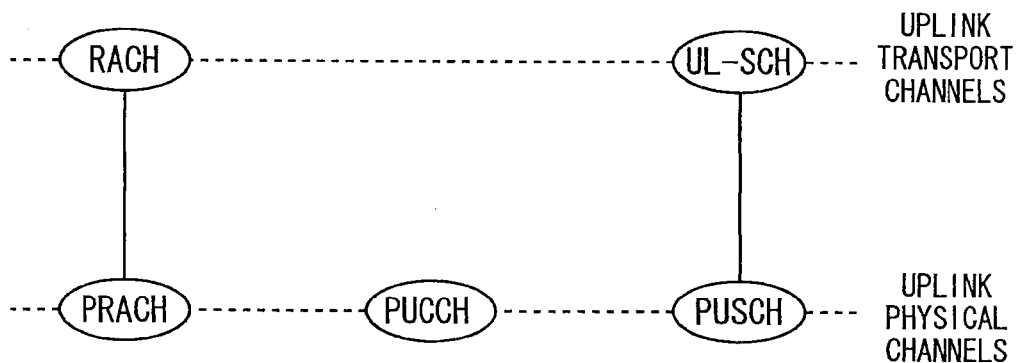

F I G. 6
(A)
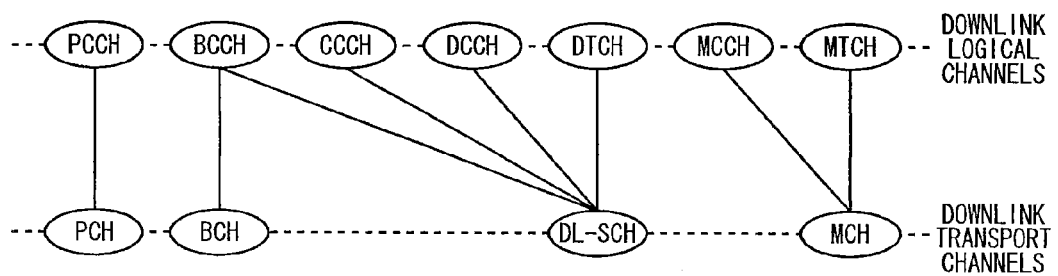
(B)
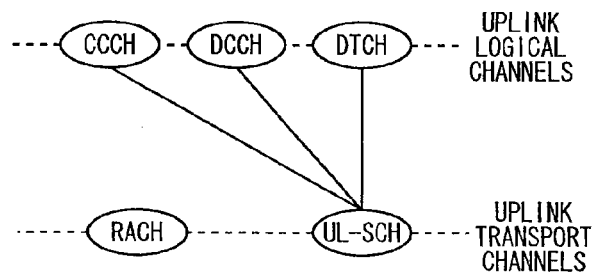

F I G. 1 0
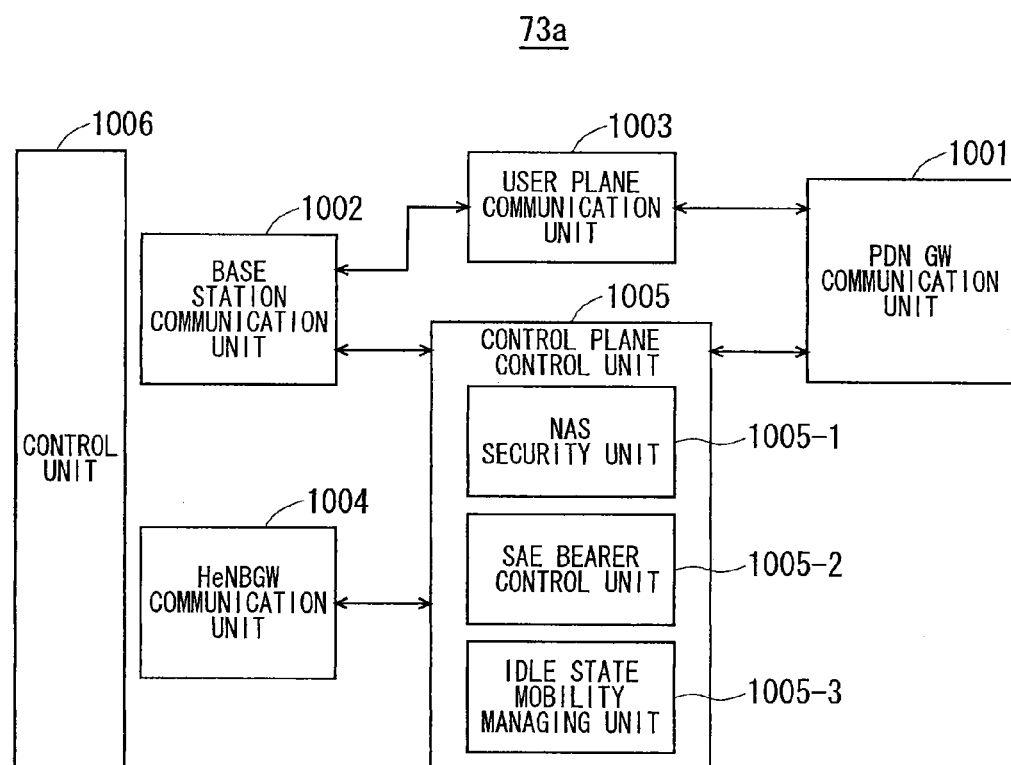

F I G . 1 1
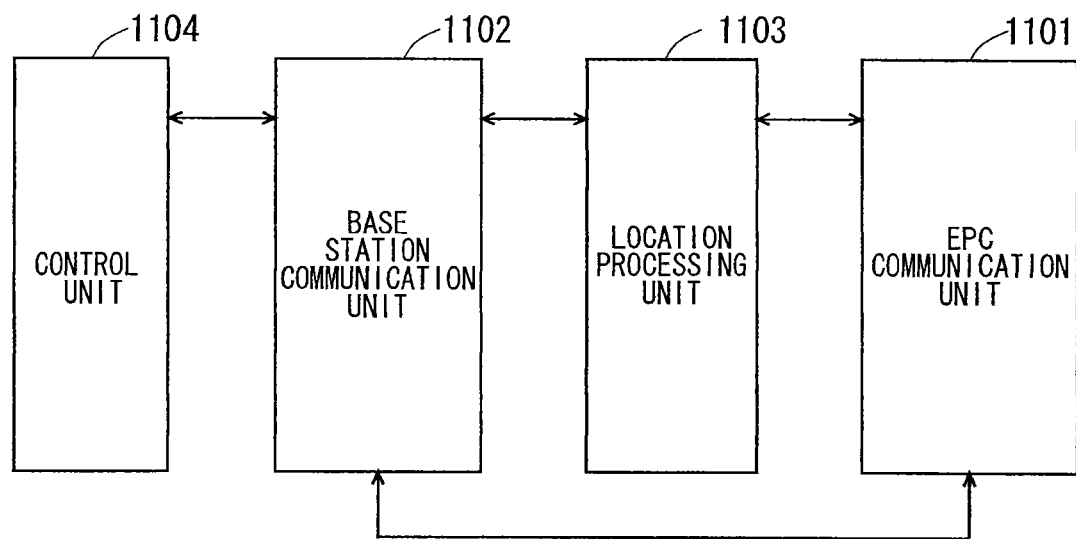

F I G . 1 3
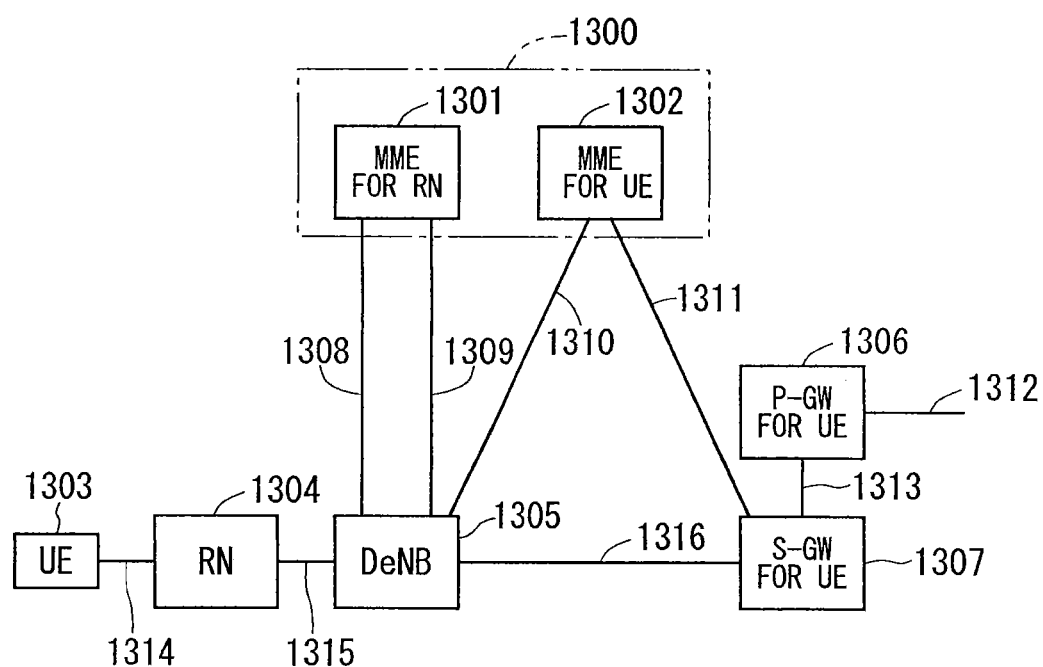

F I G. 1 4
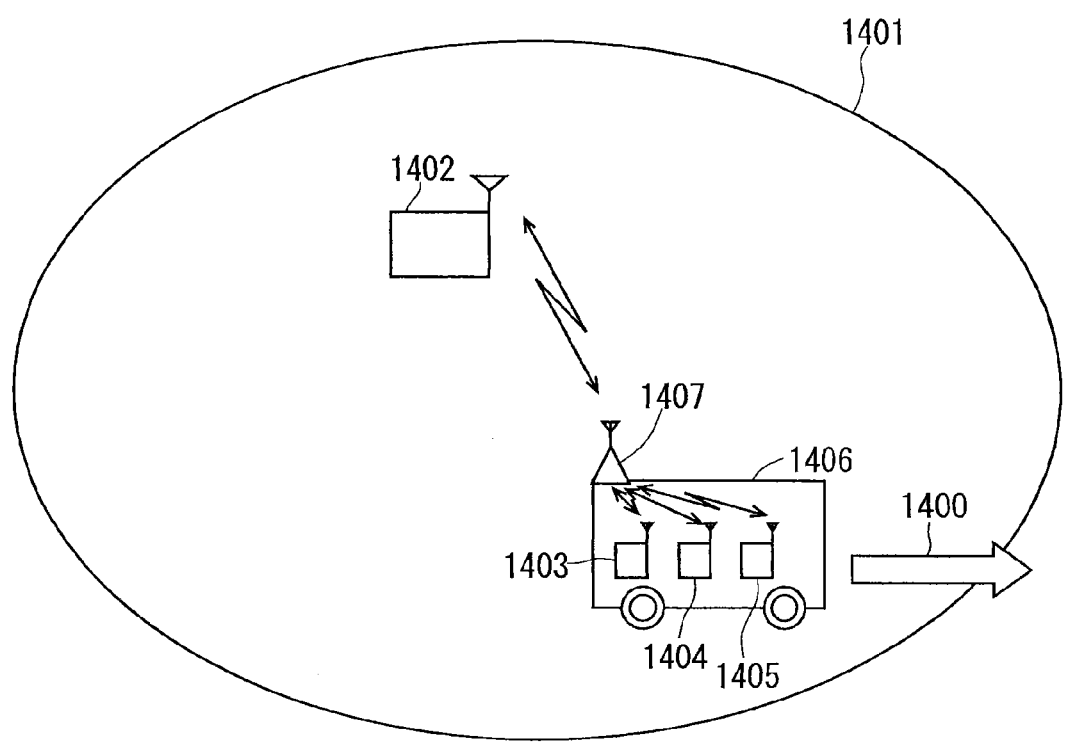

F I G. 1 7
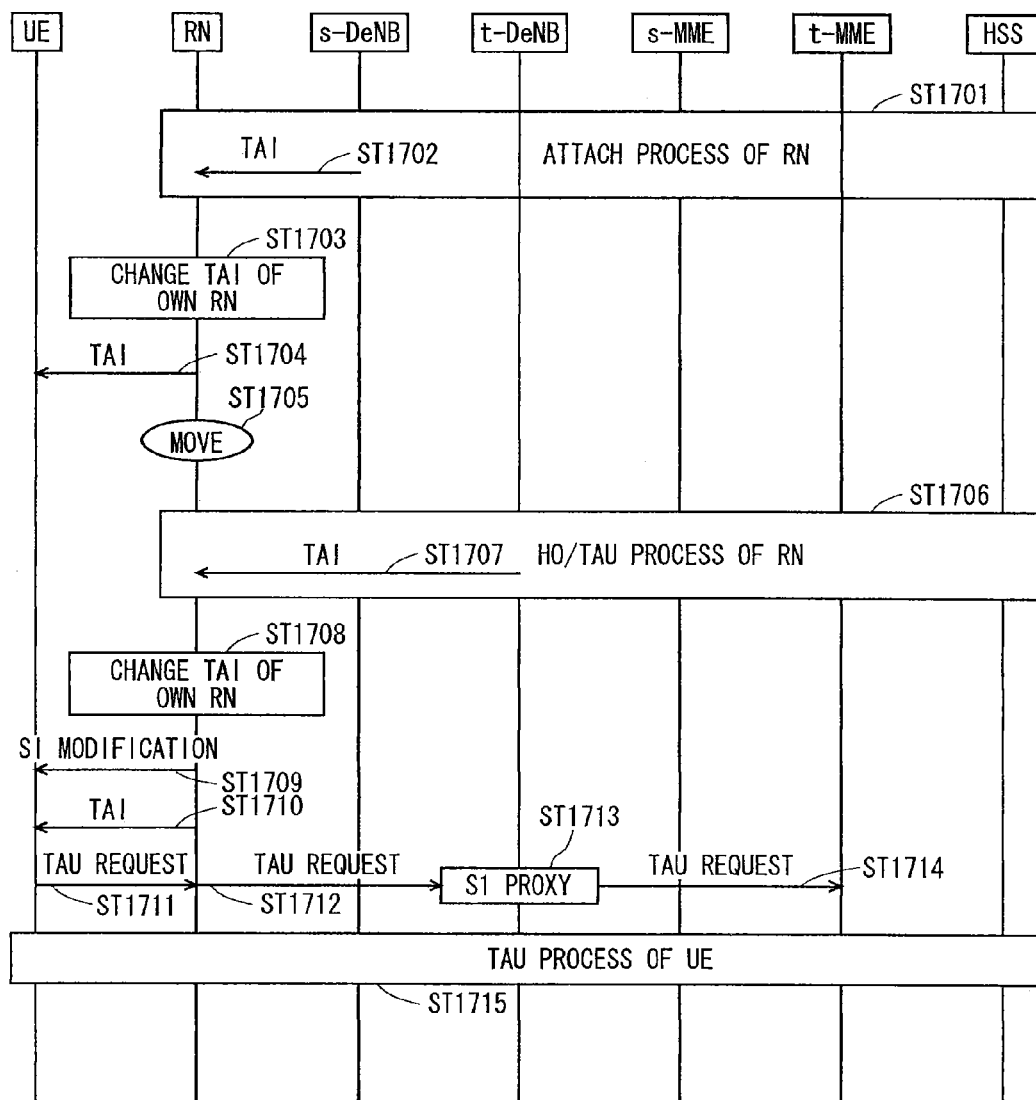

F I G . 1 9
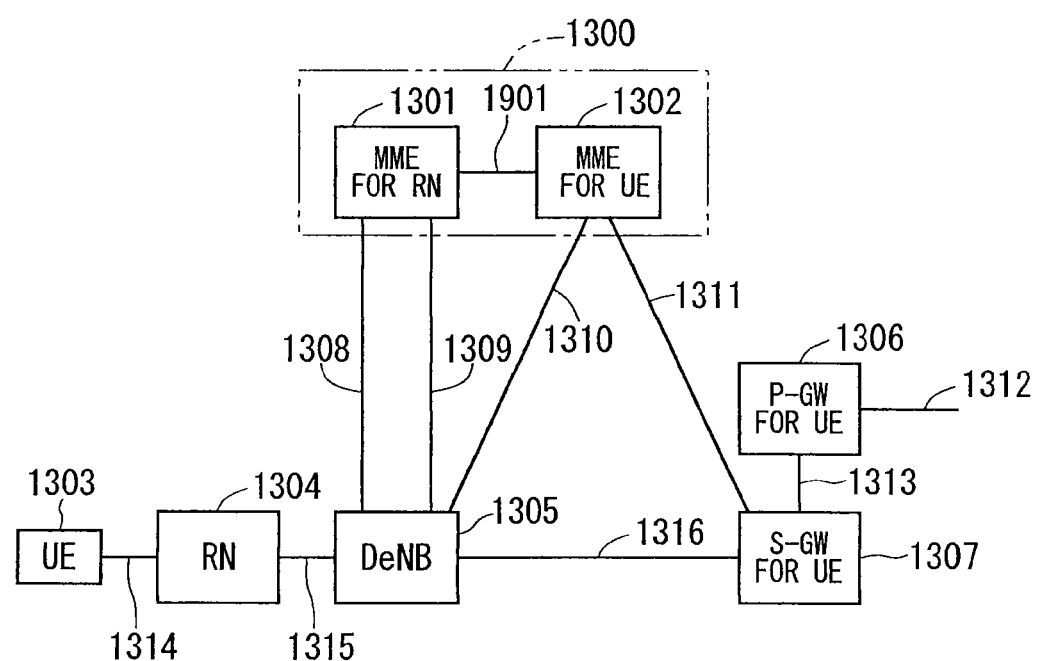

FIG. 20

| TAI#13 | TAI#14 |
|--------|--------|
| RN#0   | RN#3   |
| RN#1   | RN#4   |
| RN#2   | RN#5   |

FIG. 21

| TAI#11  | TAI#12  |
|---------|---------|
| DeNB#0  | DeNB#2  |
| DeNB#1  | DeNB#3  |

F I G. 2 2
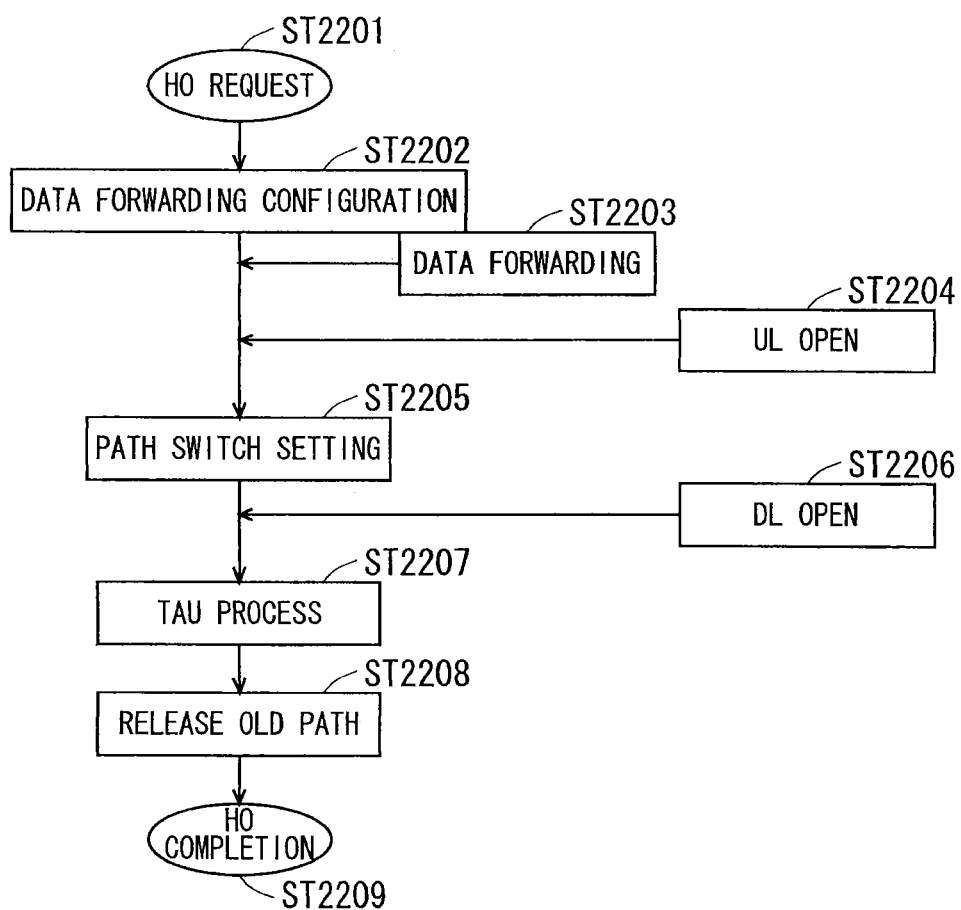

FIG. 24

| TAI#13 | TAI#14 |
|--------|--------|
| DeNB#0 | RN#3 |
| DeNB#1 | RN#4 |
| DeNB#2 | RN#5 |
| DeNB#3 | — |
| RN#1 | — |
| RN#2 | — |

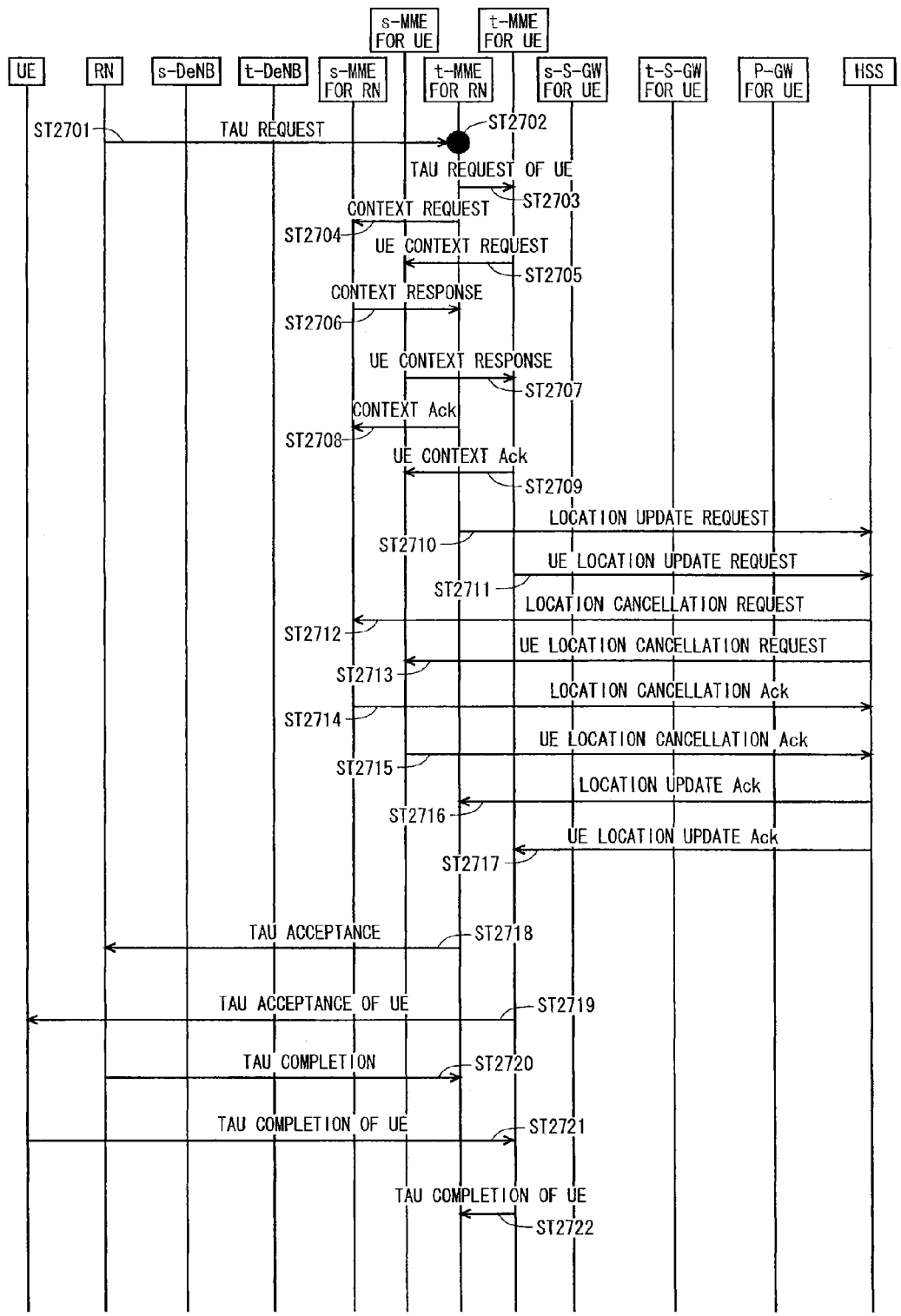

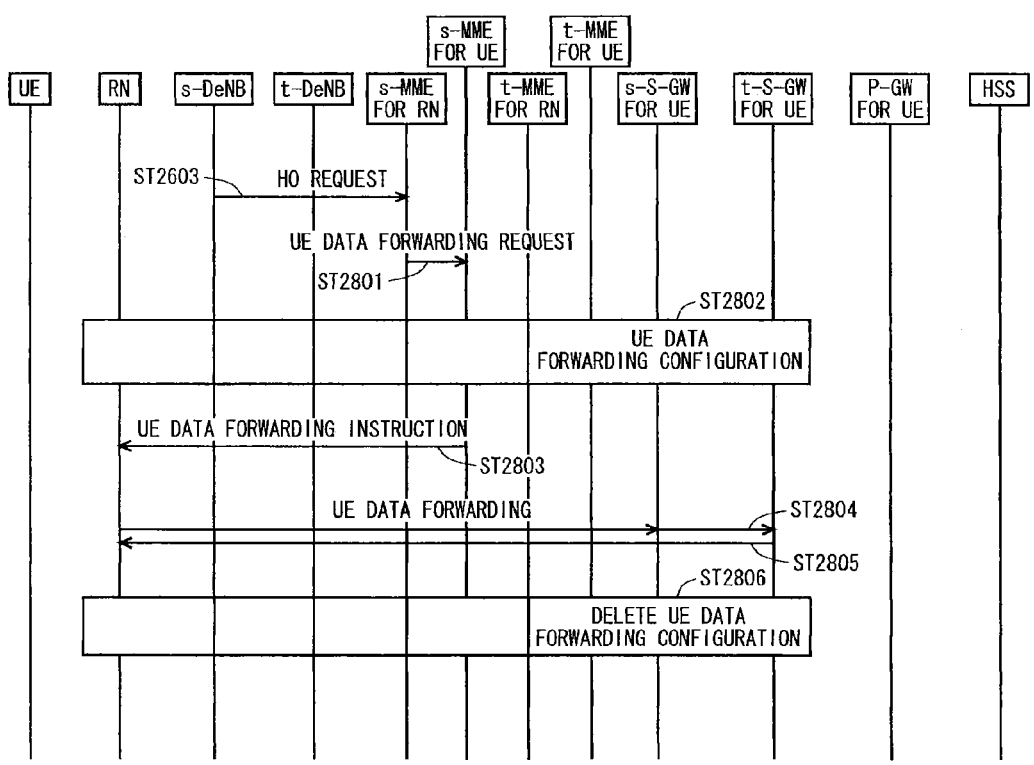
F I G . 2 8

F I G. 2 9
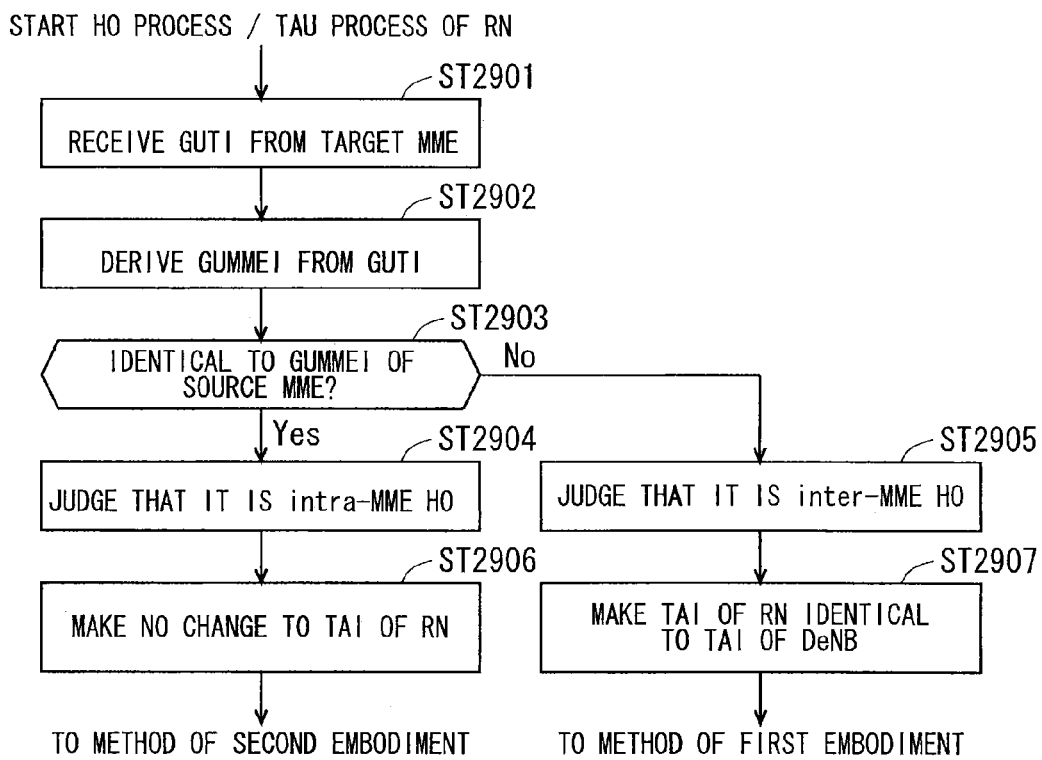

F I G . 3 0
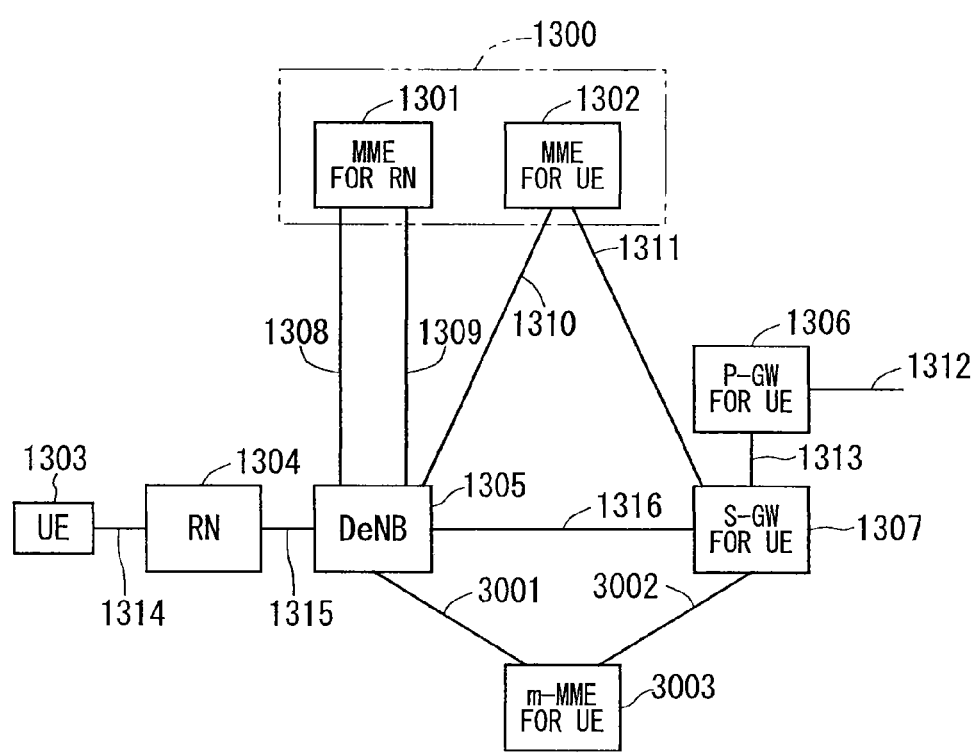

FIG. 35
(a)
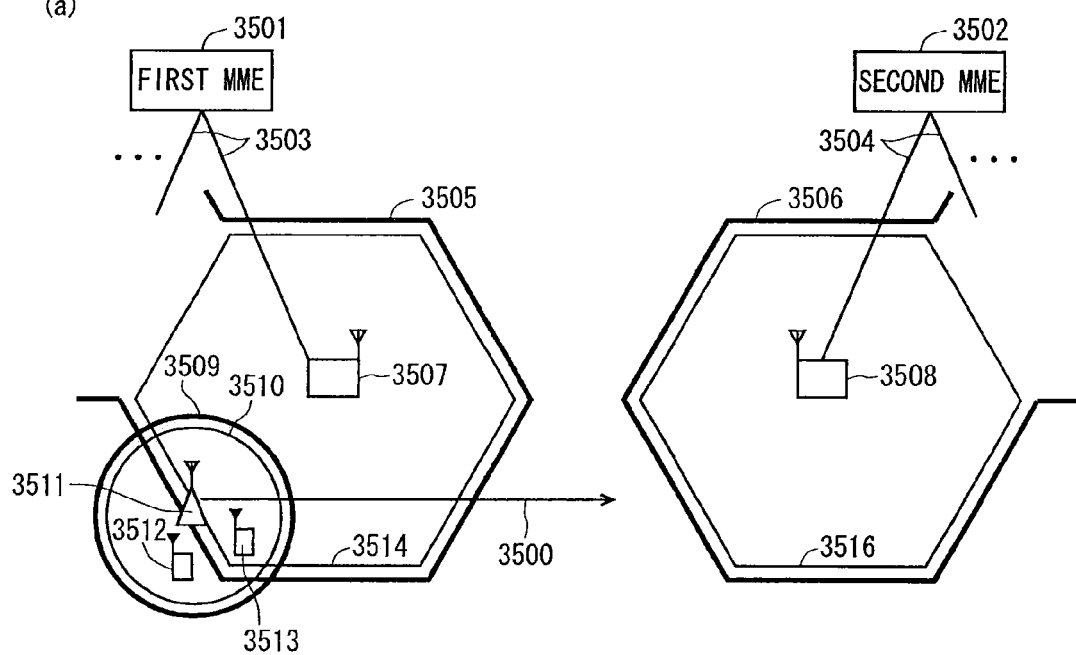
(b)
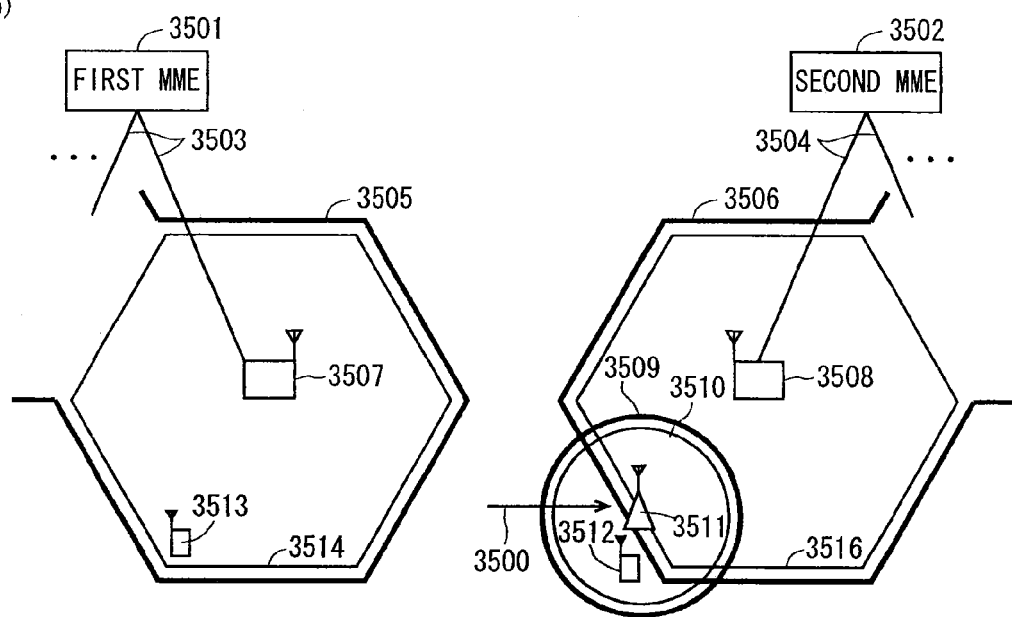

F I G. 3 6
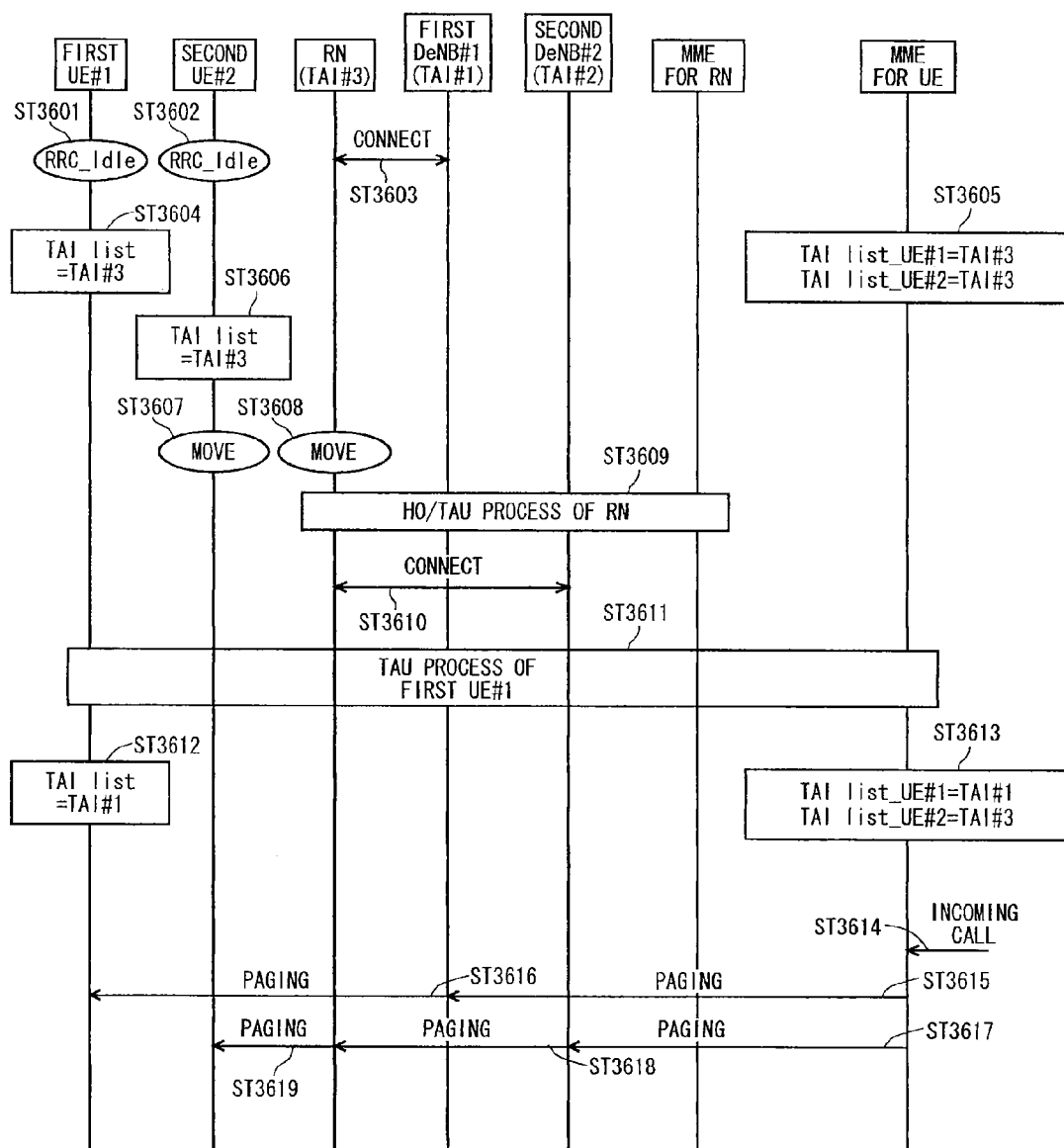

F I G. 3 8
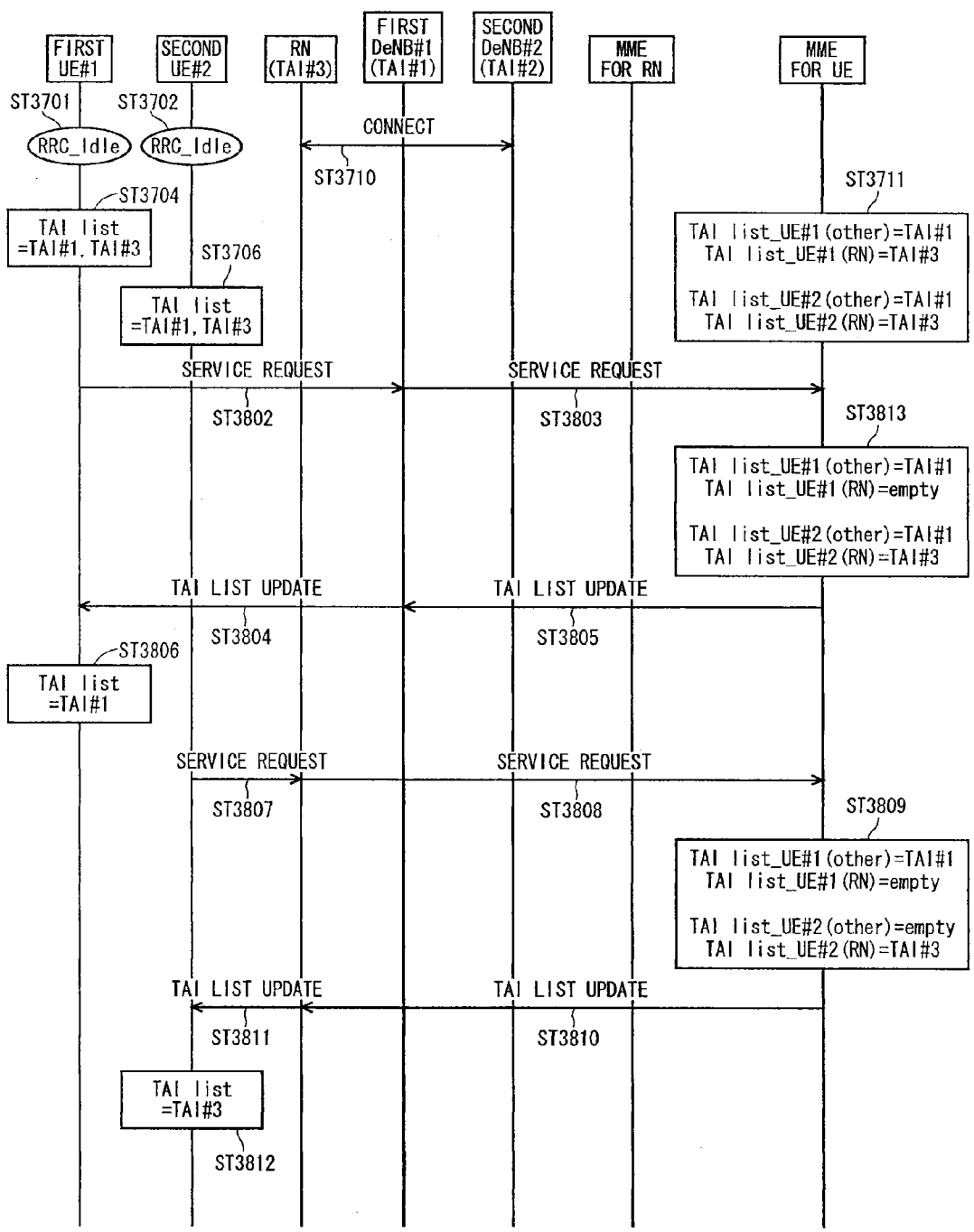

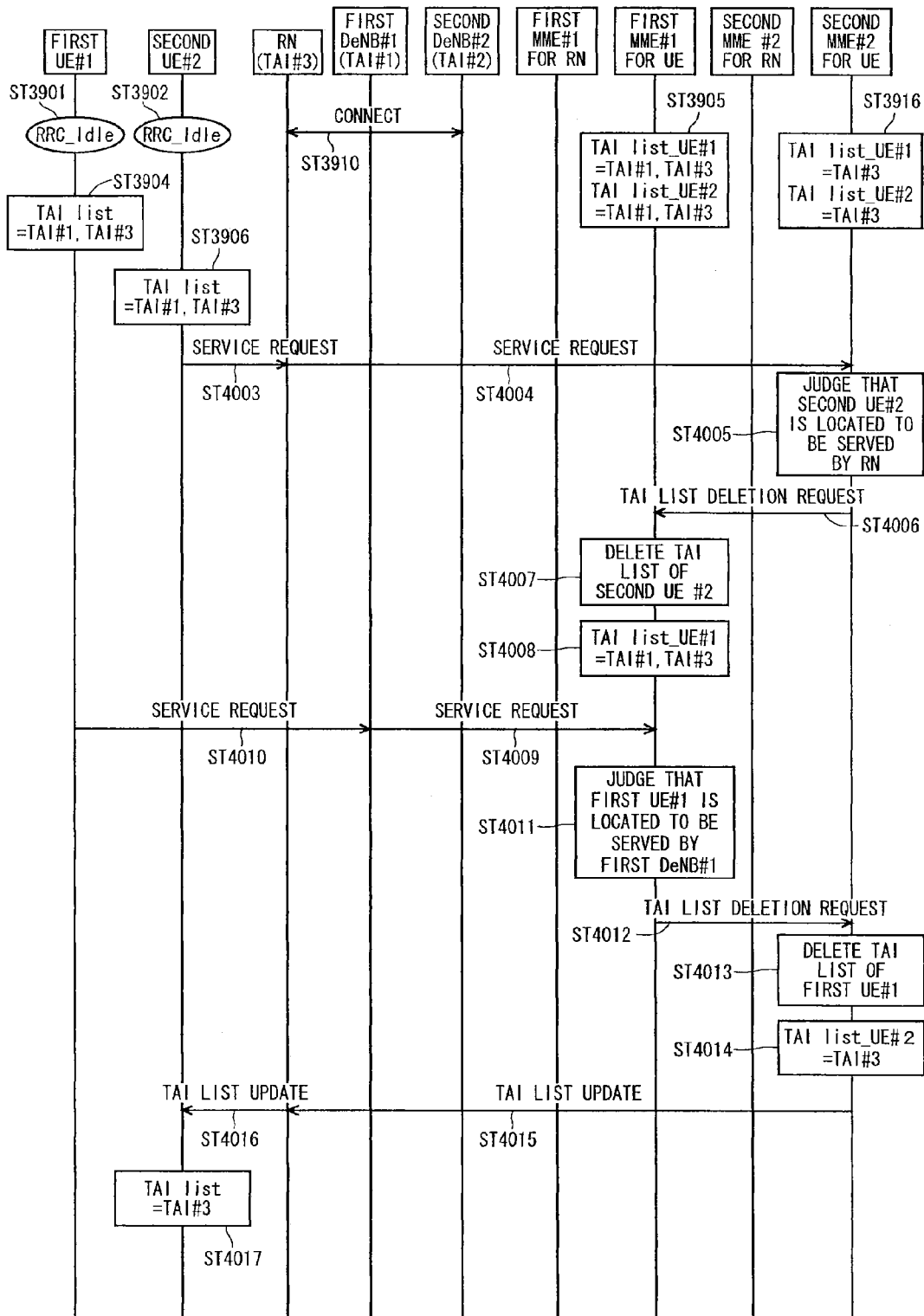
F I G . 4 0

F I G . 4 3
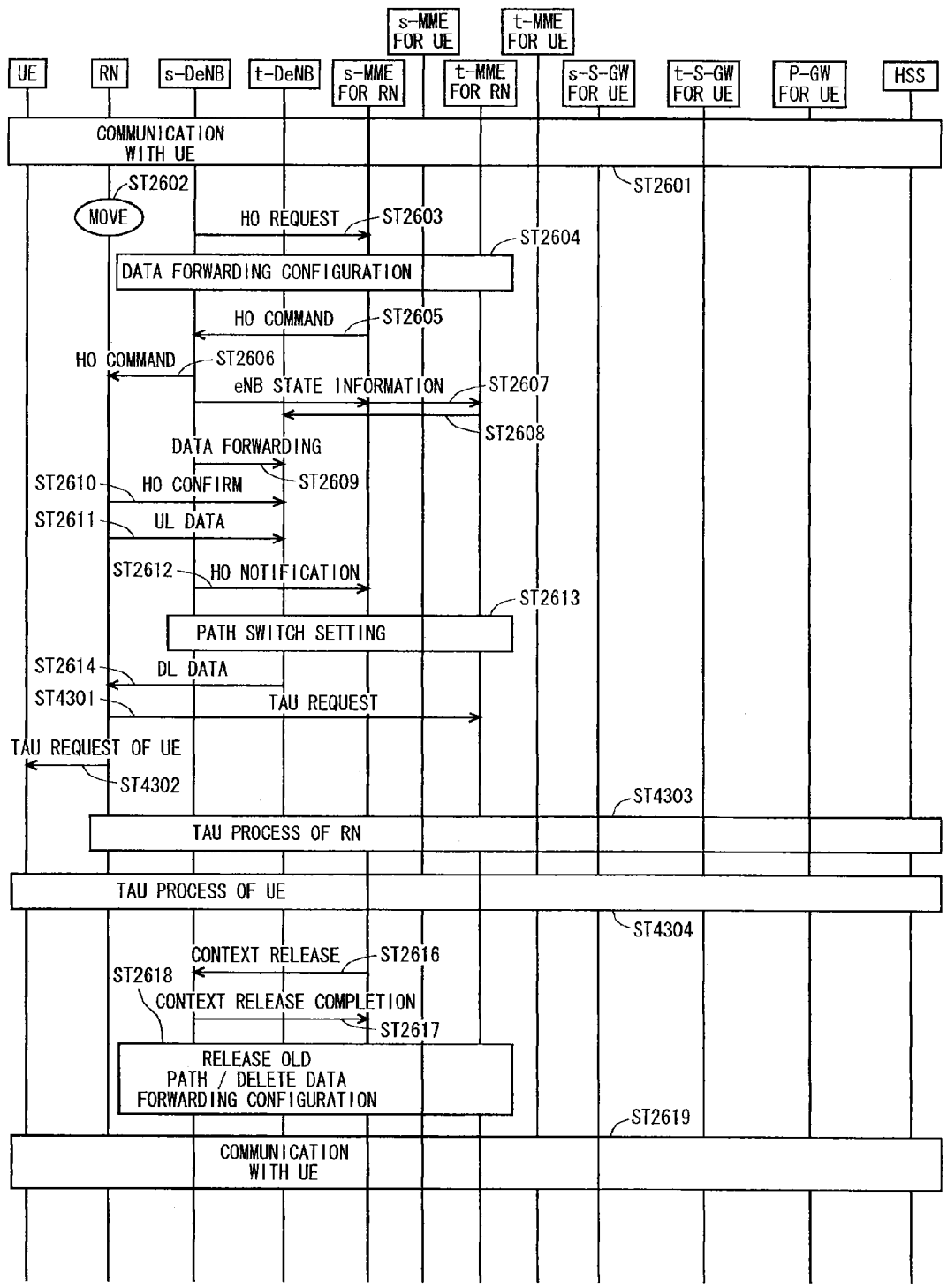

MOBILE COMMUNICATION SYSTEM

TECHNICAL FIELD

The present invention relates to a mobile communication system in which a base station device performs radio communication with a plurality of mobile terminal devices.

BACKGROUND ART

Commercial service of a wideband code division multiple access (W-CDMA) system among so-called third-generation communication systems has been offered in Japan since 2001. In addition, high speed downlink packet access (HS-DPA) service for achieving higher-speed data transmission using a downlink has been offered by adding a channel for packet transmission (high speed-downlink shared channel (HS-DSCH)) to the downlink (dedicated data channel, dedicated control channel). Further, in order to increase the speed of data transmission in an uplink direction, service of a high speed uplink packet access (HSUPA) system has been offered. W-CDMA is a communication system defined by the 3rd generation partnership project (3GPP) that is the standard organization regarding the mobile communication system, where the specifications of Release 10 version are produced.

Further, new communication systems referred to as long term evolution (LTE) regarding radio areas and system architecture evolution (SAE) regarding the overall system configuration including a core network (merely referred to as network as well) as communication systems independent of W-CDMA is studied in 3GPP. This communication system is also referred to as 3.9 generation (3.9 G) system.

In the LTE, an access scheme, a radio channel configuration and a protocol are totally different from those of the W-CDMA (HSDPA/HSUPA). For example, as to the access scheme, code division multiple access is used in the W-CDMA, whereas in the LTE, orthogonal frequency division multiplexing (OFDM) is used in a downlink direction and single career frequency division multiple access (SC-FDMA) is used in an uplink direction. In addition, the bandwidth is 5 MHz in the W-CDMA, while in the LTE, the bandwidth can be selected from 1.4 MHz, 3 MHz, 5 MHz, 10 MHz, 15 MHz and 20 MHz per base station. Further, differently from the W-CDMA, circuit switching is not provided but a packet communication system is only provided in the LTE.

In the LTE, its communication system is configured by a new core network different from a general packet radio service (GPRS) being a core network of the W-CDMA, and thus, the radio access network of the LTE is defined as a radio access network independent of the W-CDMA network.

Therefore, for differentiation from the W-CDMA communication system, in the LTE communication system, a base station that communicates with a user equipment (UE) is referred to as an E-UTRAN NodeB (eNB), and a radio network controller that transmits/receives control data and user data to/from a plurality of base stations are referred to as an evolved packet core (EPC) or access gateway (aGW).

Unicast service and evolved multimedia broadcast multicast service (E-MBMS service) are provided in this LTE communication system. The E-MBMS service is broadcast multimedia service. The E-MBMS service is merely referred to as MBMS in some cases. In the E-MBMS service, bulk broadcast contents such as news, weather forecast and mobile broadcast are transmitted to a plurality of user equipments. This is also referred to as point to multipoint service.

Non-Patent Document 1 (Chapter 4) describes the decisions by 3GPP regarding an overall architecture in the LTE system. The overall architecture is described with reference to FIG. 1. FIG. 1 is a diagram illustrating the configuration of the LTE communication system. With reference to FIG. 1, the evolved universal terrestrial radio access network (E-UTRAN) is composed of one or a plurality of base stations 102, provided that a control protocol for a user equipment 101 such as a radio resource control (RRC) and user planes such as a packet data convergence protocol (PDCP), radio link control (RLC), medium access control (MAC) and physical layer (PHY) are terminated in the base station 102.

The base stations 102 perform scheduling and transmission of a paging signal (also referred to as paging messages) notified from a mobility management entity (MME) 103. The base stations 102 are connected to each other by means of an X2 interface. In addition, the base stations 102 are connected to an evolved packet core (EPC) by means of an S1 interface. More specifically, the base station 102 is connected to the mobility management entity (MME) 103 by means of an S1_MME interface and connected to a serving gateway (S-GW) 104 by means of an S1_U interface.

The MME 103 distributes the paging signal to a plurality of or a single base station 102. In addition, the MME 103 performs mobility control of an idle state. When the user equipment is in the idle state and an active state, the MME 103 manages a list of tracking areas.

The S-GW 104 transmits/receives user data to/from one or a plurality of base stations 102. The S-GW 104 serves as a local mobility anchor point in handover between base stations. Moreover, a PDN gateway (P-GW) is provided in the EPC, which performs per-user packet filtering and UE-ID address allocation.

The control protocol RRC between the user equipment 101 and the base station 102 performs broadcast, paging, RRC connection management and the like. The states of the base station and the user equipment in RRC are classified into RRC_IDLE and RRC_CONNECTED. In RRC_IDLE, public land mobile network (PLMN) selection, system information (SI) broadcast, paging, cell re-selection, mobility and the like are performed. In RRC_CONNECTED, the user equipment has RRC connection, is capable of transmitting/receiving data to/from a network, and performs, for example, handover (HO) and measurement of a neighbour cell.

The decisions by 3GPP regarding the frame configuration in the LTE system described in Non-Patent Document 1 (Chapter 5) are described with reference to FIG. 2. FIG. 2 is a diagram illustrating the configuration of a radio frame used in the LTE communication system. With reference to FIG. 2, one radio frame is 10 ms. The radio frame is divided into ten equally sized subframes. The subframe is divided into two equally sized slots. The first and sixth subframes contain a downlink synchronization signal (SS) per each radio frame. The synchronization signals are classified into a primary synchronization signal (P-SS) and a secondary synchronization signal (S-SS).

Multiplexing of channels for multimedia broadcast multicast service single frequency network (MBSFN) and for non-MBSFN is performed on a per-subframe basis. MBSFN transmission is a simulcast transmission technique realized by simultaneous transmission of the same waveforms from a plurality of cells. The MBSFN transmission from a plurality of cells in the MBSFN area is seen as a single transmission by a user equipment. The MBSFN is a network that supports such MBSFN transmission. Hereinafter, a subframe for MBSFN transmission is referred to as MBSFN subframe.

Non-Patent Document 2 describes a signaling example when MBSFN subframes are allocated. FIG. 3 is a diagram illustrating the configuration of the MBSFN frame. With reference to FIG. 3, a radio frame including the MBSFN subframes is allocated per radio frame allocation period. The MBSFN subframe is a subframe allocated for the MBSFN in a radio frame defined by the allocation period and the allocation offset (radio frame allocation offset), and serves to transmit multimedia data. The radio frame satisfying Equation (1) below is a radio frame including the MBSFN subframes.

$$\text{SFN mod radioFrameAllocationPeriod} = \text{radioFrameAllocationOffset} \quad (1)$$

The MBSFN subframe is allocated with six bits. The leftmost bit defines the MBSFN allocation for the second subframe (#1). The second bit, third bit, fourth bit, fifth bit, and sixth-bit define the MBSFN allocation for the third subframe (#2), fourth subframe (#3), seventh subframe (#6), eighth subframe (#7), and ninth subframe (#8), respectively. The case where the bit indicates "one" represents that the corresponding subframe is allocated for the MBSFN.

Non-Patent Document 1 (Chapter 5) describes the decisions by 3GPP regarding the channel configuration in the LTE system. It is assumed that the same channel configuration is used in a closed subscriber group cell (CSG cell) as that of a non-CSG cell. Physical channels are described with reference to FIG. 4. FIG. 4 is a diagram illustrating physical channels used in the LTE communication system.

With reference to FIG. 4, a physical broadcast channel (PBCH) 401 is a channel for downlink transmission from the base station 102 to the user equipment 101. A BCH transport block is mapped to four subframes within a 40 ms interval. There is no explicit signaling indicating 40 ms timing. A physical control format indicator channel (PCFICH) 402 is a channel for downlink transmission from the base station 102 to the user equipment 101. The PCFICH notifies the number of OFDM symbols used for PDCCHs from the base station 102 to the user equipment 101. The PCFICH is transmitted in each subframe.

A physical downlink control channel (PDCCH) 403 is a channel for downlink transmission from the base station 102 to the user equipment 101. The PDCCH notifies the resource allocation information of downlink shared channel (DL-SCH) that is one of the transport channels shown in FIG. 5 described below), resource allocation information of paging channel (PCH) that is one of the transport channels shown in FIG. 5, and hybrid automatic repeat request (HARQ) information related to DL-SCH. The PDCCH carries an uplink scheduling grant. The PDCCH carries acknowledgement (Ack)/negative acknowledgement (Nack) that is a response signal to uplink transmission. The PDCCH is referred to as an L1/L2 control signal as well.

A physical downlink shared channel (PDSCH) 404 is a channel for downlink transmission from the base station 102 to the user equipment 101. A DL-SCH (downlink shared channel) that is a transport channel and a PCH that is a transport channel are mapped to the PDSCH.

A physical multicast channel (PMCH) 405 is a channel for downlink transmission from the base station 102 to the user equipment 101. A multicast channel (MCH) that is a transport channel is mapped to the PMCH.

A physical uplink control channel (PUCCH) 406 is a channel for uplink transmission from the user equipment 101 to the base station 102. The PUCCH carries Ack/Nack that is a response signal to downlink transmission. The PUCCH carries a channel quality indicator (CQI) report. The CQI is quality information indicating the quality of received data or channel quality. In addition, the PUCCH carries a scheduling request (SR).

A physical uplink shared channel (PUSCH) 407 is a channel for uplink transmission from the user equipment 101 to the base station 102. An uplink shared channel (UL-SCH) that is one of the transport channels shown in FIG. 5 is mapped to the PUSCH.

A physical hybrid ARQ indicator channel (PHICH) 408 is a channel for downlink transmission from the base station 102 to the user equipment 101. The PHICH carries Ack/Nack that is a response to uplink transmission. A physical random access channel (PRACH) 409 is a channel for uplink transmission from the user equipment 101 to the base station 102. The PRACH carries a random access preamble.

A downlink reference signal (RS) is a known symbol in a mobile communication system. Five types of downlink reference signals are defined as follows; cell-specific reference signals (CRSs), MBSFN reference signals, demodulation reference signal (DM-RS) being UE-specific reference signals, positioning reference signals (PRSs), and channel-state information reference signals (CSI-RSs). The physical layer measurement objects of a user equipment include reference signal received power (RSRP) measurement.

The transport channels described in Non-Patent Document 1 (Chapter 5) are described with reference to FIG. 5. FIG. 5 is a diagram illustrating transport channels used in the LTE communication system. Part (A) of FIG. 5 shows mapping between a downlink transport channel and a downlink physical channel. Part (B) of FIG. 5 shows mapping between an uplink transport channel and an uplink physical channel.

Downlink transport channels are described. A broadcast channel (BCH) is broadcast to the entire coverage of a base station (cell). The BCH is mapped to the physical broadcast channel (PBCH).

Retransmission control according to a hybrid ARQ (HARQ) is applied to a downlink shared channel (DL-SCH). The DL-SCH enables broadcast to the entire coverage of the base station (cell). The DL-SCH supports dynamic or semi-static resource allocation. The semi-static resource allocation is also referred to as persistent scheduling. The DL-SCH supports discontinuous reception (DRX) of a user equipment for enabling the user equipment to save power. The DL-SCH is mapped to the physical downlink shared channel (PDSCH).

The paging channel (PCH) supports DRX of the user equipment for enabling the user equipment to save power. The PCH is required to broadcast to the entire coverage of the base station (cell). The PCH is mapped to physical resources such as the physical downlink shared channel (PDSCH) that can be used dynamically for traffic.

The multicast channel (MCH) is used for broadcast to the entire coverage of the base station (cell). The MCH supports SFN combining of MBMS service (MTCH and MCCH) in multi-cell transmission. The MCH supports semi-static resource allocation. The MCH is mapped to the PMCH.

Retransmission control according to a hybrid ARQ (HARQ) is applied to an uplink shared channel (UL-SCH). The UL-SCH supports dynamic or semi-static resource allocation. The UL-SCH is mapped to the physical uplink shared channel (PUSCH).

A random access channel (RACH) shown in Part (B) of FIG. 5 is limited to control information. The RACH involves a collision risk. The RACH is mapped to the physical random access channel (PRACH).

The HARQ is described. The HARQ is the technique for improving the communication quality of a channel by combination of automatic repeat request (ARQ) and error correction (forward error correction). The HARQ has an advantage that error correction functions effectively by retransmission even for a channel whose communication quality changes. In particular, it is also possible to achieve further quality improvement in retransmission through combination of the reception results of the first transmission and the reception results of the retransmission.

An example of the retransmission method is described. In a case where the receiver fails to successfully decode the received data, in other words, in a case where a cyclic redundancy check (CRC) error occurs (CRC=NG), the receiver transmits "Nack" to the transmitter. The transmitter that has received "Nack" retransmits the data. In a case where the receiver successfully decodes the received data, in other words, in a case where a CRC error does not occur (CRC=OK), the receiver transmits "AcK" to the transmitter. The transmitter that has received "Ack" transmits the next data.

Examples of the HARQ system include chase combining. In chase combining, the same data is transmitted in the first transmission and retransmission, which is the system for improving gains by combining the data of the first transmission and the data of the retransmission in retransmission. This is based on the idea that correct data is partially included even if the data of the first transmission includes an error, and highly accurate data transmission is enabled by combining the correct portions of the first transmission data and the retransmission data. Another example of the HARQ system is incremental redundancy (IR). The IR is aimed to increase redundancy, where a parity bit is transmitted in retransmission to increase the redundancy by combining the first transmission and retransmission, to thereby improve the quality by an error correction function.

Logical channels described in Non-Patent Document 1 (Chapter 6) are described with reference to FIG. 6. FIG. 6 is a diagram illustrating logical channels used in an LTE communication system. Part (A) of FIG. 6 shows mapping between a downlink logical channel and a downlink transport channel. Part (B) of FIG. 6 shows mapping between an uplink logical channel and an uplink transport channel.

A broadcast control channel (BCCH) is a downlink channel for broadcast system control information. The BCCH that is a logical channel is mapped to the broadcast channel (BCH) or downlink shared channel (DL-SCH) that is a transport channel.

A paging control channel (PCCH) is a downlink channel for transmitting changes of the paging information and system information. The PCCH is used when the network does not know the cell location of a user equipment. The PCCH that is a logical channel is mapped to the paging channel (PCH) that is a transport channel.

A common control channel (CCCH) is a channel for transmission control information between user equipments and a base station. The CCCH is used in a case where the user equipments have no RRC connection with the network. In a downlink direction, the CCCH is mapped to the downlink shared channel (DL-SCH) that is a transport channel. In an uplink direction, the CCCH is mapped to the uplink shared channel (UL-SCH) that is a transport channel.

A multicast control channel (MCCH) is a downlink channel for point-to-multipoint transmission. The MCCH is used for transmission of MBMS control information for one or several MTCHs from a network to a user equipment. The MCCH is used only by a user equipment during reception of the MBMS. The MCCH is mapped to the multicast channel (MCH) that is a transport channel.

A dedicated control channel (DCCH) is a channel for point-to-point transmission of the dedicated control information between a user equipment and a network. The DCCH is used when a user equipment is in RRC connected. The DCCH is mapped to the uplink shared channel (UL-SCH) in uplink and mapped to the downlink shared channel (DL-SCH) in downlink.

A dedicated traffic channel (DTCH) is a point-to-point communication channel for transmission of the user information to a dedicated user equipment. The DTCH exists in uplink as well as downlink. The DTCH is mapped to the uplink shared channel (UL-SCH) in uplink and mapped to the downlink shared channel (DL-SCH) in downlink.

A multicast traffic channel (MTCH) is a downlink channel for traffic data transmission from a network to a user equipment. The MTCH is a channel used only by a user equipment during reception of the MBMS. The MTCH is mapped to the multicast channel (MCH).

GCI represents a global cell identification. EGCI represents an E-UTRAN global cell identification. A closed subscriber group cell (CSG cell) is introduced in the LTE and in long term evolution advanced (LTE-A) and universal mobile telecommunication system (UMTS) described below. The CSG cell is described below (see Chapter 3.1 of Non-Patent Document 3).

The closed subscriber group (CSG) cell is a cell in which subscribers who are allowed to use are specified by an operator (hereinafter, referred to as "cell for specific subscribers" in some cases). The specified subscribers are allowed to access one or more cells of a public land mobile network (PLMN). One or more cells in which the specified subscribers are allowed access are referred to as "CSG cell(s)". Note that access is restricted in the PLMN.

The CSG cell is part of the PLMN that broadcasts a specific CSG identity (CSG ID; CSG-ID) and broadcasts "TRUE" by CSG indication. The authorized members of the subscriber group who have registered in advance access the CSG cells using the CSG-ID that is the access permission information.

The CSG-ID is broadcast by the CSG cell or cells. A plurality of CSG-IDs exist in a mobile communication system. The CSG-IDs are used by user equipments (UEs) for making access from CSG-related members easier.

The locations of user equipments are tracked based on an area composed of one or more cells. The locations are tracked for enabling tracking of the locations of user equipments and calling user equipments, that is, allowing user equipments to receive calls even in an idle state. An area for tracking locations of user equipments is referred to as a tracking area.

A CSG whitelist is a list that may be stored in a universal subscriber identity module (USIM) in which all CSG IDs of the CSG cells to which the subscribers belong are recorded. The CSG whitelist is merely referred to as whitelist or allowed CSG list in some cases. The MME performs access control for the UEs accessing through CSG cells (see Chapter 4.3.1.2 of Non-Patent Document 9). Specific examples of the access by user equipments include attach, combined attach, detach, service request, and tracking area update procedure (see Chapter 4.3.1.2 of Non-Patent Document 9).

Service types of a user equipment in an idle state are described below (see Chapter 4.3 of Non-Patent Document 3). The service types of a user equipment in an idle state are classified into a limited service (also referred to as closed service), a normal service, and an operator service. The limited service includes emergency calls, an earthquake and tsunami warning system (ETWS), and a commercial mobile alert system (CMAS) on an acceptable cell described below. The normal service (also referred to as standard service) is the service for public use on a suitable cell described below. The operator service is the service for operators only on a reserved cell described below.

A "suitable cell" is described below. The "suitable cell" is a cell on which a UE may camp to obtain a normal service. Such a cell shall fulfill the following conditions (1) and (2).

(1) The cell is part of the selected PLMN or the registered PLMN, or part of the PLMN of an "equivalent PLMN list".

(2) According to the latest information provided by a non-access stratum (NAS), the cell shall further fulfill the following conditions (a) to (d):

(a) the cell is not a barred cell;

(b) the cell is part of a tracking area (TA), not part of the list of "forbidden LAs for roaming", where the cell needs to fulfill (1) above;

(c) the cell shall fulfill the cell selection criteria; and (d) for a cell specified as CSG cell by system information (SI), the CSG-ID is part of a "CSG whitelist" of the UE, that is, is contained in the CSG whitelist of the UE.

An "acceptable cell" is described below. The "acceptable cell" is the cell on which a UE may camp to obtain a limited service. Such a cell shall fulfill all the requirements of (1) and (2) below.

(1) The cell is not a barred cell.

(2) The cell fulfills the cell selection criteria.

"Barred cell" is shown in the system information. "Reserved cell" is shown in the system information.

"Camping on a cell" represents the state where a UE has completed the cell selection or reselection process and the UE has selected a cell for monitoring the system information and paging information. A cell on which the UE camps is referred to as "serving cell" in some cases.

Base stations referred to as Home-NodeB (Home-NB; HNB) and Home-eNodeB (Home-eNB; HeNB) are studied in 3GPP. HNB/HeNB is a base station for, for example, household, corporation or commercial access service in UTRAN/E-UTRAN. Non-Patent Document 4 discloses three different modes of the access to the HeNB and HNB. Specifically, those are an open access mode, a closed access mode, and a hybrid access mode.

The respective modes have the following characteristics. In the open access mode, the HeNB and HNB are operated as a normal cell for a normal operator. In the closed access mode, the HeNB and HNB are operated as a CSG cell. The CSG cell is a cell where only CSG members are allowed access. In the hybrid access mode, the HeNB and HNB are operated as CSG cells that can also be accessed by non-CSG members at the same time. In other words, a cell in the hybrid access mode (also referred to as hybrid cell) is the cell that supports both the open access mode and the closed access mode.

According to 3GPP, there is a range of PCIs in all physical cell identities (PCIs), which is reserved by the network for use by CSG cells (see Chapter 10.5.1.1 of Non-Patent Document 1). Splitting the range of PCIs is referred to as PCI-split at times. The PCI split information is broadcast in the system information from the base station to the user equipments being served thereby. To being served by a base station means to take that base station as a serving cell. Non-Patent Document 5 discloses the basic operation of a user equipment using PCI split. The user equipment that does not have the PCI split information needs to perform cell search using all PCIs, for example, using all 504 codes. Meanwhile, the user equipment that has the PCI split information is capable of performing cell search using the PCI split information.

Further, specifications standard of long term evolution advanced (LTE-A) as Release 10 are pursued in 3GPP (see Non-Patent Document 6 and Non-Patent Document 7).

As to the LTE-A system, it is studied that a relay and a relay node (RN) are supported for achieving a high data rate, high cell-edge throughput, new coverage area, and the like. The relay node being a relay device is wirelessly connected to the radio-access network via a donor cell (Donor eNB; DeNB). The network (NW)-to-relay node link shares the same frequency band (hereinafter, referred to as "frequency band" in some cases) with the network-to-UE link within the range of the donor cell. In this case, the UE in Release 8 can also be connected to the donor cell. The link between a donor cell and a relay node is referred to as a backhaul link, and the link between the relay node and the UE is referred to as an access link.

As the method of multiplexing a backhaul link in frequency division duplex (FDD), the transmission from DeNB to RN is carried out in a downlink (DL) frequency band, and the transmission from RN to DeNB is carried out in an uplink (UL) frequency band. As the method of dividing resources in relays, a link from DeNB to RN and a link from RN to UE are time-division multiplexed in one frequency band, and a link from RN to DeNB and a link from UE to RN are also time-division multiplexed in one frequency band. This enables to prevent, in a relay, the transmission of the relay from interfering with the reception of the own relay.

Not only a normal eNB (macro cell) but also so-called local nodes such as pico eNB (pico cell), HeNB (HNB, CSG cell), node for hotzone cells, relay node, remote radio head (RRH) and repeater are studied in 3GPP. The network composed of various types of cells as described above is also referred to as a heterogeneous network (HetNet) in some cases.

As to the LTE, the frequency bands (hereinafter, referred to as "operating bands" in some cases) usable for communication have been predetermined. Non-Patent Document 8 describes the frequency bands.

As to the LTE-A system, carrier aggregation (CA) is studied, in which two or more component carriers (CCs) are aggregated to support wider transmission bandwidths up to 100 MHz.

A Release 8- or 9-compliant UE, which supports LTE, is capable of transmission and reception on only the CC corresponding to one serving cell. Meanwhile, it is conceivable that a Release 10-compliant UE may have the capability of transmission and reception, only reception, or only transmission on the CCs corresponding to a plurality of serving cells at the same time.

Each CC employs the configuration of Release 8 or 9, and the CA supports contiguous CCs, non-contiguous CCs, and CCs in different frequency bandwidths. The UE cannot configure the number of uplink CCs (UL CCs) equal to or more than the number of downlink CCs (DL CCs). The CCs configured by the same eNBs do not need to provide the same coverage. The CC is compatible with Release 8 or 9.

In CA, an independent HARQ entity is provided per serving cell in uplink as well as downlink. A transport block is generated per TTI for each serving cell. Each transport block and HARQ retransmission are mapped to a single serving cell.

In a case where CA is configured, a UE has single RRC connection with a NW. In RRC connection, one serving cell provides NAS mobility information and security input. This cell is referred to as primary cell (PCell). In downlink, a carrier corresponding to PCell is a downlink primary component carrier (DL PCC). In uplink, a carrier corresponding to PCell is an uplink primary component carrier (UL PCC).

A secondary cell (SCell) is configured to form a pair of a PCell and a serving cell, in accordance with the UE capability. In downlink, a carrier corresponding to SCell is a downlink secondary component carrier (DL SCC). In uplink, a carrier corresponding to SCell is an uplink secondary component carrier (UL SCC).

A pair of one PCell and a serving cell configured by one or more SCells is configured for one UE.

The above-mentioned LTE Advanced (LTE-A) as a further advanced communication system regarding radio areas is studied in 3GPP (see Non-Patent Document 6 and Non-Patent Document 7). The LTE-A is based on the LTE communication system regarding radio areas and is configured by addition of several new techniques thereto. The new techniques include the technique of supporting wider bands (wider bandwidth extension) and the coordinated multiple point transmission and reception (CoMP) technique. The CoMP which is being studied for LTE-A in 3GPP is described in Non-Patent Document 6 and Non-Patent Document 7.

CoMP implies the technique of improving the coverage of high data rates, improving a cell-edge throughput, and increasing a communication system throughput by transmission or reception coordinated among multiple geographically separated points. The types of CoMP are grouped into downlink CoMP (DL CoMP) and uplink CoMP (UL CoMP).

In DL CoMP, the PDSCH to one user equipment (UE) is transmitted in cooperation among multiple points. The PDSCH to one UE may be transmitted from one point among multiple points or may be transmitted from points among multiple points. In DL CoMP, a serving cell refers to a single cell that transmits resource allocation over the PDCCH.

Joint processing (JP) and coordinated scheduling (CS)/coordinated beamforming (CB) are studied as the DL CoMP method.

For JP, data is available at each point in a CoMP cooperating set. Types of JP are grouped into joint transmission (JT) and dynamic cell selection (DCS). In JT, the PDSCH is transmitted from multiple points, specifically, part of or entire CoMP cooperating set, at a time. In DCS, the PDSCH is transmitted from one point in the CoMP cooperating set at a time.

In CS/CB, data is only available in transmission from a serving cell but user scheduling/beamforming decisions are made with coordination among cells corresponding to the CoMP cooperating set.

Base stations (NB, eNB, HNB, HeNB), remote radio unit (RRU), remote radio equipment (RRE), remote radio head (RRH), relay node (RN), and the like are studied as the units and cells that perform transmission at multiple points. The unit and cell that perform coordinated multiple point transmission are referred to as a multi-point unit and a multi-point cell, respectively.

PRIOR ART DOCUMENTS

Non-Patent Documents

Non-Patent Document 1: 3GPP TS 36.300 V10.2.0
Non-Patent Document 2: 3GPP TS 36.331 V10.0.0
Non-Patent Document 3: 3GPP TS 36.304 V10.0.0 Chapter 3.1, Chapter 4.3, Chapter 5.2.4
Non-Patent Document 4: 3GPP S1-083461
Non-Patent Document 5: 3GPP R2-082899
Non-Patent Document 6: 3GPP TR 36.814 V9.0.0
Non-Patent Document 7: 3GPP TR 36.912 V9.3.0
Non-Patent Document 8: 3GPP TS 36.101 V10.0.0
Non-Patent Document 9: 3GPP TR 23.830 V9.0.0

SUMMARY OF INVENTION

Problem to be Solved by the Invention

The communication method in a case where an RN moves has not been specifically discussed in 3GPP. In a case where the moving RN is supported by the conventional technique, a problem arises in communication performed between a UE being served by the RN and a network. For example, in a case where the RN installed in a movable body such as an express bus moves, a UE being served by the RN, which is carried by a passenger, actually moves together with the movable body but does not operate as in moving alone. This is because the UE being served by the moving RN communicates with the RN and thus does not recognize that it has moved between cells. The UE being served by the moving RN accordingly does not perform the mobility process to be performed when the UE moves alone between cells.

In a case where the UE being served by the moving RN does not perform the mobility process, the MME connected to a DeNB newly connected after the moving of the RN cannot recognize the presence of the UE, and cannot manage the mobility of the UE. The MME connected to the DeNB that has been connected before the moving of the RN attempts to communicate with the UE but is not allowed to communicate with the UE because the UE is not located in a management range.

The communication between the UE and core network is not allowed in a case where the MME cannot recognize the presence of the UE and cannot perform mobility management as described above.

An object of the present invention is to provide a mobile communication system capable of performing communication between a core network and a user equipment device connected to a relay device even if the relay device moves.

Means to Solve the Problem

A mobile communication system of the present invention includes a plurality of base station devices to be connected to a core network, a user equipment device configured to perform radio communications with the base station devices, and a relay device movably configured to relay the radio communications between the base station devices and the user equipment device, wherein: the core network includes unit that manages the base station devices, the user equipment device, and the relay device per predetermined tracking area; the relay device sets, as a tracking area to which the own relay device belongs, a tracking area to which the base station device to be connected with the own relay device belongs; and upon judging that the tracking area to which the relay device to be connected with the own user equipment device has been changed, the user equipment device transmits, to the management unit, a tracking area update request signal for updating the tracking area to which the own user equipment device belongs.

Another mobile communication system of the present invention includes a plurality of base station devices to be connected to a core network, a user equipment device configured to perform radio communications with the base station devices, and a relay device movably configured to relay the radio communications between the base station devices and the user equipment device, wherein: the core network includes management unit that manages the base station devices, the user equipment device, and the relay device per predetermined tracking area; upon judging that a tracking area to which the base station device to be connected with the own relay device has been changed, the relay device transmits, to the management unit, a tracking area update request signal for updating a tracking area to which the own relay device belongs; and upon receipt of the tracking area update request signal from the relay device, the management unit performs a process of updating the tracking area to which the relay device belongs and performs a process of updating the tracking area to which the user equipment device belongs.

Effects of the Invention

According to the mobile communication system of the present invention, the relay device sets, as a tracking area (hereinafter, also referred to as a "tracking area of the relay device") to which the own relay device belongs, a tracking area (hereinafter, also referred to as a "tracking area of the base station device") to which a base station device to be connected with the own relay device belongs. Upon this, the relay device moves, and the base station device to be connected with the relay device is changed, so that the tracking area of the relay device is changed.

The tracking area of the relay device is changed as described above, whereby the user equipment device transmits a tracking area update request signal to the management unit. Upon this, the tracking area (hereinafter, also referred to as a "tracking area of the user equipment device") to which the user equipment device belongs is updated. As a result, if the relay device moves, the management unit can recognize and manage the user equipment device connected to the relay device, allowing for communication between the user equipment device and core network.

According to the other mobile communication system of the present invention, upon change of the tracking area of the base station device to be connected with the relay device, the relay device transmits a tracking area update request signal to the management unit. Upon this, the management unit performs the process of updating the tracking area of the relay device and also performs the process of updating the tracking area of the user equipment device. Thus, if the relay device moves, the management unit can recognize and manage the user equipment device connected to the relay device, allowing for communication between the user equipment device and core network.

These and other objects, features, aspects and advantages of the present invention will become more apparent from the following detailed description of the present invention when taken in conjunction with the accompanying drawings.

BRIEF DESCRIPTION OF DRAWINGS

FIG. 1 is a diagram illustrating the configuration of an LTE communication system.

FIG. 2 is a diagram illustrating the configuration of a radio frame used in the LTE communication system.

FIG. 3 is a diagram illustrating the configuration of an MBSFN frame.

FIG. 4 is a diagram illustrating physical channels used in the LTE communication system.

FIG. 5 is a diagram illustrating transport channels used in the LTE communication system.

FIG. 6 is a diagram illustrating logical channels used in the LTE communication system.

FIG. 10 is a block diagram showing the configuration of an MME (MME unit 73 of FIG. 7) according to the present invention.

FIG. 11 is a block diagram showing the configuration of a HeNBGW 74 shown in FIG. 7 that is a HeNBGW according to the present invention.

FIG. 13 is a diagram showing an architecture of a mobile communication system in a case where an RN in Release 10 of 3GPP is provided.

FIG. 14 is a diagram for describing a use case of a mobile RN.

FIG. 17 is a diagram showing an example of a sequence when an RN moves in a case where a TAI of the RN is made identical to a TAI of a target DeNB.

FIG. 19 is a diagram showing an architecture of a mobile communication system including an RN in a case where the information regarding a TA is transmitted and received between an MME for UE and an MME for RN.

FIG. 20 is a diagram for describing an example of a method of managing a TA in an MME for UE.

FIG. 21 is a diagram for describing an example of a method of managing a TA in an MME for RN.

FIG. 22 is a flowchart showing a processing procedure of a HO process of an RN.

FIG. 24 is a diagram showing a mapping table after a process of associating TAI list information of an RN and TAI list information of a UE in the MME for UE.

FIG. 27 is a diagram showing a sequence in a case where a TAU process of a UE being served by the RN is activated when triggered by the receipt of a TAU request message from the RN by a target MME.

FIG. 28 is a diagram showing a sequence of activating a data forwarding process of the UE.

FIG. 29 is a flowchart showing a processing procedure of a process in which an RN judges whether HO is intra-MME HO or inter-MME HO.

FIG. 30 is a diagram showing an architecture of an RN in a case where an MME that manages only a TA to which a mobile RN belongs is provided.

FIG. 35 is a diagram for describing cases in which a UE in an RRC_Idle state moves and does not move together with a mobile RN.

FIG. 36 is a diagram showing a sequence when an RN moves in a case where a TAI of the RN and a TAI of other type of cell are prohibited from being included in the same TAI list.

FIG. 38 is a diagram showing a sequence in which the MME deletes one of the TAI lists when the UE changes to an RRC_Connected state.

FIG. 40 is a diagram showing a sequence in which the MME deletes one of the TAI lists when a UE changes to an RRC_Connected state.

FIG. 43 is a diagram showing a sequence in which an RN notifies a UE being served thereby of a TAU activation request signal in a case where the RN has performed the HO process.

DESCRIPTION OF EMBODIMENTS

First Embodiment

Figure 7:
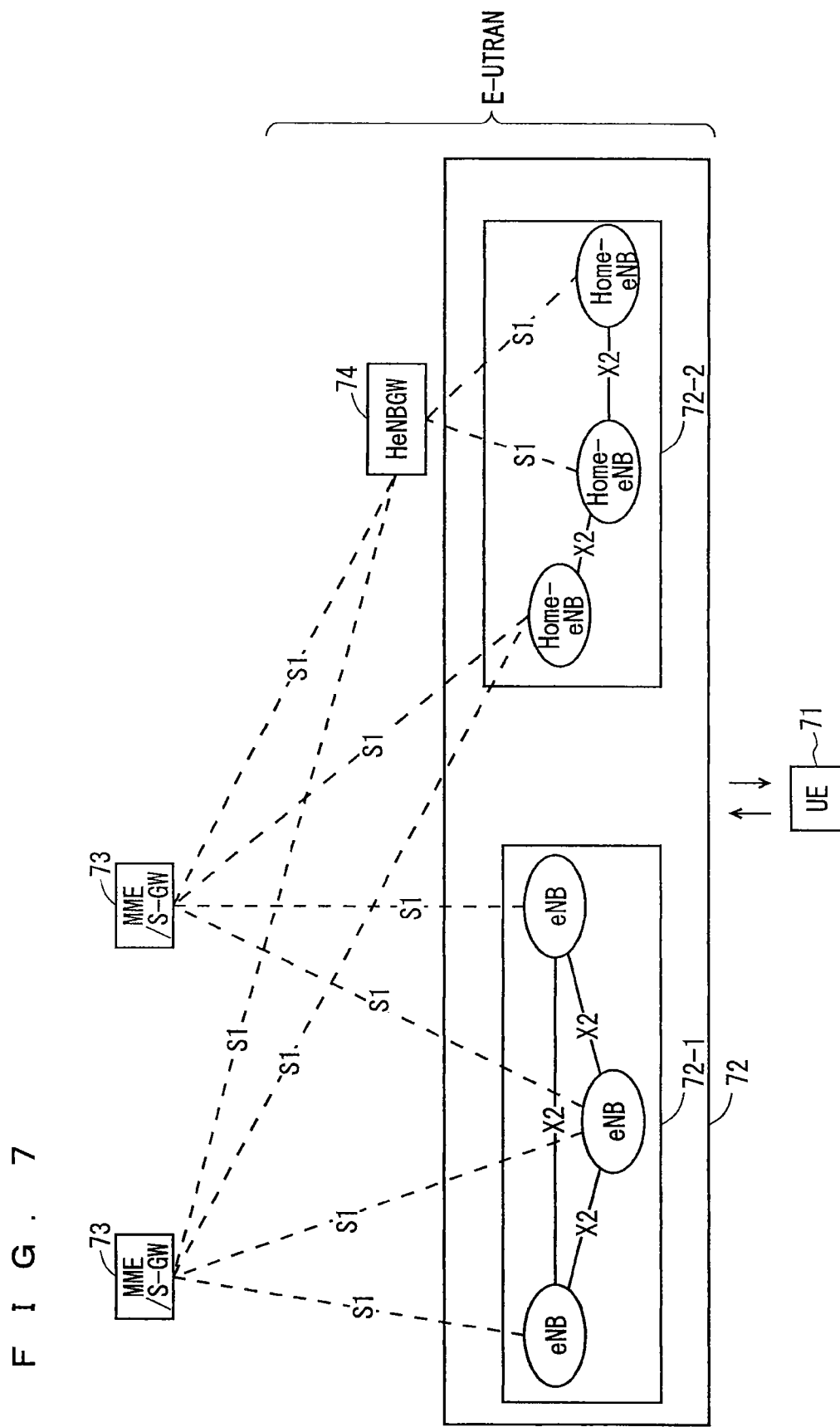
FIG. 7 is a block diagram showing the overall configuration of an LTE mobile communication system currently under discussion of 3GPP.

FIG. 7 is a block diagram showing an overall configuration of an LTE mobile communication system, which is under discussion of 3GPP. The overall system configuration including closed subscriber group (CSG) cells (Home-eNodeBs (Home-eNB; HeNB) of E-UTRAN, Home-NB (HNB) of UTRAN) and non-CSG cells (eNodeB (eNB) of E-UTRAN, NodeB (NB) of UTRAN, and BSS of GERAN) is studied in 3GPP and, as to E-UTRAN, the configuration as shown in FIG. 7 is proposed (see Chapter 4.6.1 of Non-Patent Document 1).

FIG. 7 is described. A user equipment device (hereinafter, referred to as "user equipment" or "UE") 71 is capable of performing radio communication with a base station device (hereinafter, referred to as "base station") 72 and transmits/receives signals through radio communication. The base stations 72 are classified into an eNB 72-1 that is a macro cell and a Home-eNB 72-2 that is a local node. The eNB 72-1 has a relatively large-scale coverage as the coverage in a range in which communication with the user equipment (UE) 71 is possible. The Home-eNB 72-2 has a relatively small-scale coverage as the coverage.

The eNB 72-1 is connected to an MME/S-GW unit (hereinafter, referred to as an "MME unit" in some cases) 73 including an MME, S-GW, or MME and S-GW through an S1 interface, and control information is communicated between the eNB 72-1 and the MME unit 73. A plurality of MME units 73 may be connected to one eNB 72-1. The MME unit 73 is equivalent to management unit. The MME unit 73 is included in the core network. The eNBs 72-1 are connected to each other by means of an X2 interface, and control information is communicated between the eNBs 72-1.

The Home-eNB 72-2 is connected to the MME unit 73 by means of an S1 interface, and the control information is communicated between the Home-eNB 72-2 and the MME unit 73. A plurality of Home-eNBs 72-2 are connected to one MME unit 73. Or, the Home-eNBs 72-2 are connected to the MME units 73 through a Home-eNB Gateway (HeNBGW) 74. The Home-eNBs 72-2 are connected to the HeNBGW 74 by means of the S1 interface, and the HeNBGW 74 is connected to the MME units 73 through an S1 interface. One or a plurality of Home-eNBs 72-2 are connected to one HeNBGW 74, and information is communicated therebetween through an S1 interface. The HeNBGW 74 is connected to one or a plurality of MME units 73, and information is communicated therebetween through an S1 interface.

The MME unit 73 and HeNBGW 74 are equivalent to host node devices, and control the connection between the user equipment (UE) 71 and each of the eNB 72-1 and Home-eNB 72-2 being a base station. The MME unit 73, specifically, an MME and an S-GW forming the MME unit 73, and the HeNBGW74 are equivalent to management unit. The MME unit 73 and the HeNBGW 74 are included in the core network.

Further, the configuration below is studied in 3GPP. The X2 interface between the Home-eNBs 72-2 is supported. That is, the Home-eNBs 72-2 are connected to each other by means of the X2 interface, and control information is communicated between the Home-eNBs 72-2. The HeNBGW 74 appears to the MME unit 73 as the Home-eNB 72-2. The HeNBGW 74 appears to the Home-eNB 72-2 as the MME unit 73. The interfaces between the Home-eNBs 72-2 and the MME units 73 are the same, which are the S1 interfaces, in both of the case where the Home-eNB 72-2 is connected to the MME unit 73 through the HeNBGW 74 and the case where the Home-eNB 72-2 is directly connected to the MME unit 73. The HeNBGW 74 does not support the mobility to the Home-eNB 72-2 or the mobility from the Home-eNB 72-2 that spans a plurality of MME units 73. The Home-eNB 72-2 supports a single cell.

Figure 8:
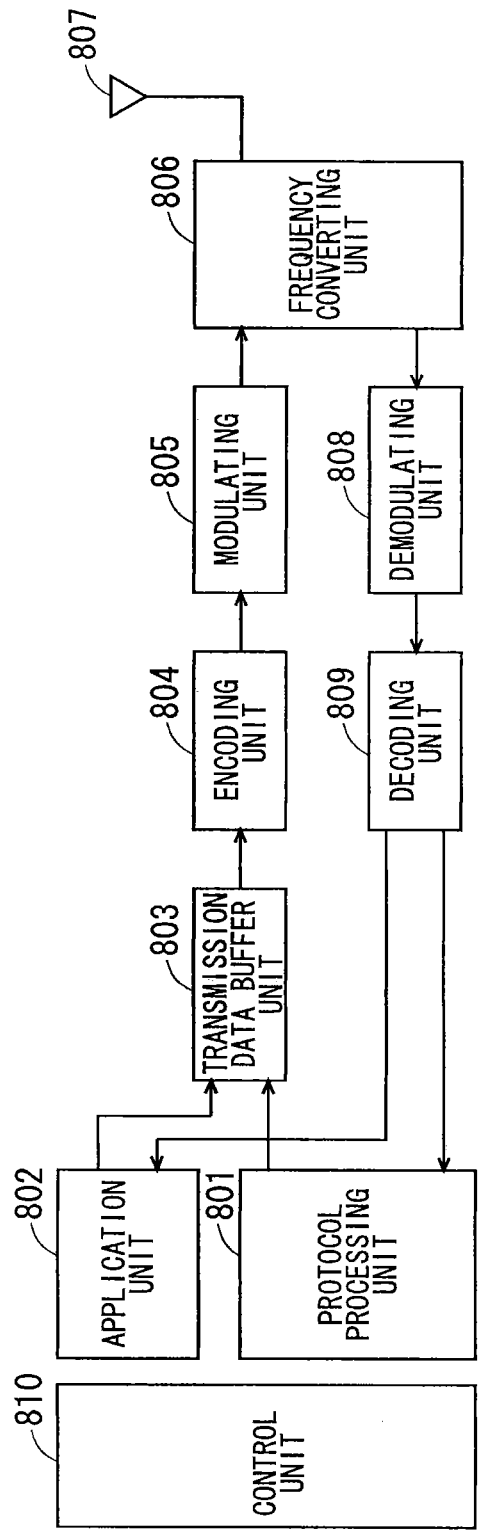
FIG. 8 is a block diagram showing the configuration of a user equipment (user equipment 71 of FIG. 7) according to the present invention.

FIG. 8 is a block diagram showing the configuration of the user equipment (user equipment 71 of FIG. 7) according to the present invention. The transmission process of the user equipment 71 shown in FIG. 8 is described. First, a transmission data buffer unit 803 stores the control data from a protocol processing unit 801 and the user data from an application unit 802. The data stored in the transmission data buffer unit 803 is transmitted to an encoding unit 804 and is subjected to an encoding process such as error correction. There may exist the data output from the transmission data buffer unit 803 directly to a modulating unit 805 without the encoding process. The data encoded by the encoding unit 804 is modulated by the modulating unit 805. The modulated data is output to a frequency converting unit 806 after being converted into a baseband signal, and then is converted into a radio transmission frequency. After that, a transmission signal is transmitted from an antenna 807 to the base station 72.

The user equipment 71 executes the reception process as follows. The radio signal is received through the antenna 807 from the base station 72. The received signal is converted from a radio reception frequency to a baseband signal by the frequency converting unit 806 and is then demodulated by a demodulating unit 808. The demodulated data is transmitted to a decoding unit 809 and is subjected to a decoding process such as error correction. Among the pieces of decoded data, the control data is transmitted to the protocol processing unit 801, while the user data is transmitted to the application unit 802. A series of processes of the user equipment 71 is controlled by a control unit 810. This means that, though not shown in FIG. 8, the control unit 810 is connected to the respective units 801 to 809.

Figure 9:
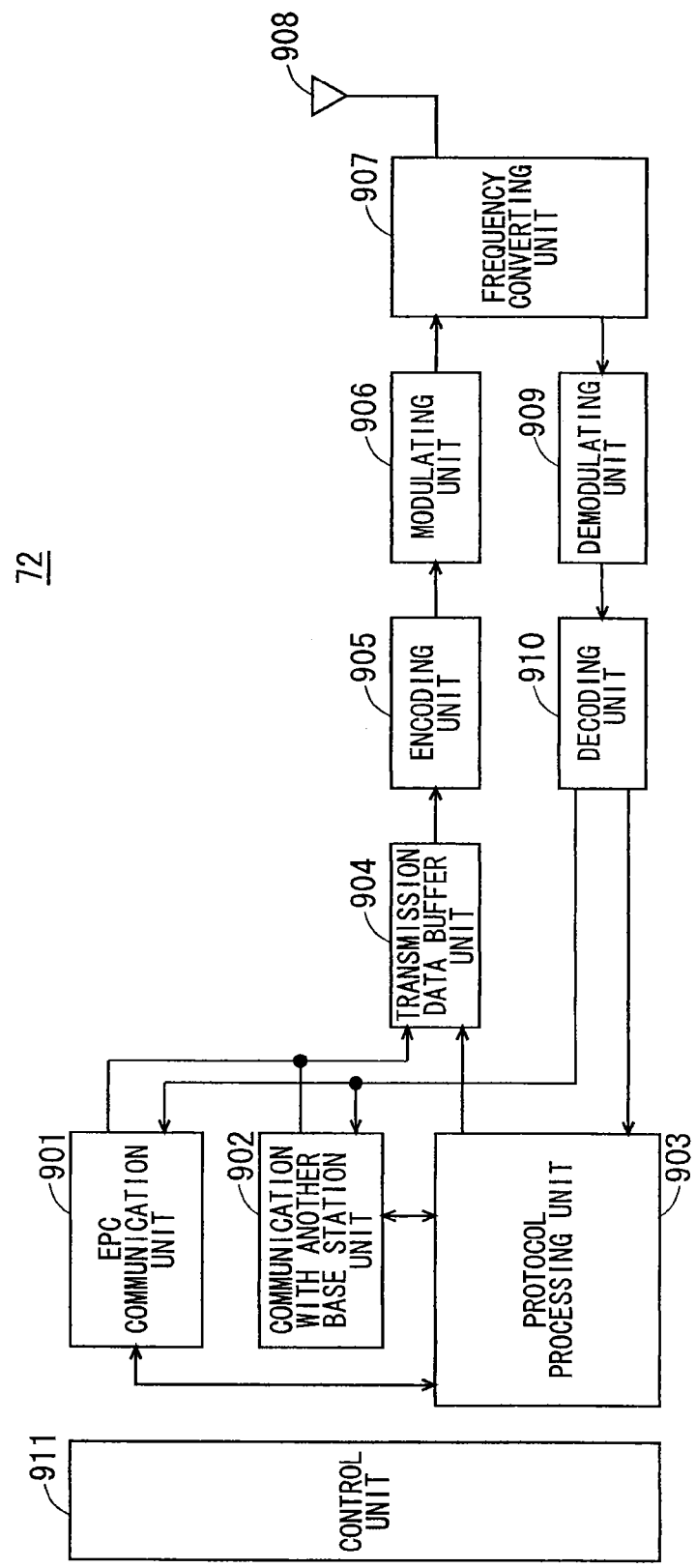
FIG. 9 is a block diagram showing the configuration of a base station (base station 72 of FIG. 7) according to the present invention.

FIG. 9 is a block diagram showing the configuration of the base station (base station 72 of FIG. 7) according to the present invention. The transmission process of the base station 72 shown in FIG. 9 is described. An EPC communication unit 901 performs data transmission/reception between the base station 72 and the EPCs (such as MME unit 73 and HeNBGW 74). A communication with another base station unit 902 performs data transmission/reception to/from another base station. The EPC communication unit 901 and the communication with another base station unit 902 respectively transmit/receive information to/from a protocol processing unit 903. The control data from the protocol processing unit 903, and the user data and control data from the EPC communication unit 901 and the communication with another base station unit 902 are stored in a transmission data buffer unit 904.

The data stored in the transmission data buffer unit 904 is transmitted to an encoding unit 905 and is then subjected to an encoding process such as error correction. There may exist the data output from the transmission data buffer unit 904 directly to a modulating unit 906 without the encoding process. The encoded data is modulated by the modulating unit 906. The modulated data is output to a frequency converting unit 907 after being converted into a baseband signal, and is then converted into a radio transmission frequency. After that, a transmission signal is transmitted to one or a plurality of user equipments 71 through an antenna 908.

While, the reception process of the base station 72 is executed as follows. Radio signals from one or a plurality of user equipments 71 are received through the antenna 908. The received signal is converted from a radio reception frequency into a baseband signal by the frequency converting unit 907, and is then demodulated by a demodulating unit 909. The demodulated data is transmitted to a decoding unit 910 and is then subjected to a decoding process such as error correction. Among the pieces of decoded data, the control data is transmitted to the protocol processing unit 903, EPC communication unit 901, or communication with another base station unit 902, while the user data is transmitted to the EPC communication unit 901 and the communication with another base station unit 902. A series of processes of the base station 72 is controlled by a control unit 911. This means that, though not shown in FIG. 9, the control unit 911 is connected to the respective units 901 to 910.

The communication with another base station unit 902 is equivalent to a notification unit and an acquisition unit. The transmission data buffer unit 904, encoding unit 905, modulating unit 906, frequency converting unit 907, antenna 908, demodulating unit 909, and decoding unit 910 are equivalent to a communication unit.

The functions of the Home-eNB 72-2 under discussion of 3GPP are described below (see Chapter 4.6.2 of Non-Patent Document 1). The Home-eNB 72-2 has the same function as that of the eNB 72-1. In addition, the Home-eNB 72-2 has the function of discovering a suitable serving HeNBGW 74 in a case of connection to the HeNBGW 74. The Home-eNB 72-2 is connected only to one HeNBGW 74. That is, in a case of the connection to the HeNBGW 74, the Home-eNB 72-2 does not use the Flex function in the S1 interface. When the Home-eNB 72-2 is connected to one HeNBGW 74, it is not simultaneously connected to another HeNBGW 74 or another MIME unit 73.

The TAC and PLMN ID of the Home-eNB 72-2 are supported by the HeNBGW 74. When the Home-eNB 72-2 is connected to the HeNBGW 74, selection of the MME unit 73 at "UE attachment" is performed by the HeNBGW 74 instead of the Home-eNB 72-2. The Home-eNB 72-2 may be deployed without network planning. In this case, the Home-eNB 72-2 is moved from one geographical area to another geographical area. Accordingly, the Home-eNB 72-2 in this case is required to be connected to a different HeNBGW 74 depending on its location.

FIG. 10 is a block diagram showing the configuration of the MME according to the present invention. FIG. 10 shows the configuration of an MME 73a included in the MME unit 73 shown in FIG. 7 described above. A PDN GW communication unit 1001 performs data transmission/reception between the MME 73a and a PDN GW. A base station communication unit 1002 performs data transmission/reception between the MME 73a and the base station 72 by means of the S1 interface. In the case where the data received from the PDN GW is user data, the user data is transmitted from the PDN GW communication unit 1001 to the base station communication unit 1002 through a user plane communication unit 1003 and is then transmitted to one or a plurality of base stations 72. In the case where the data received from the base station 72 is user data, the user data is transmitted from the base station communication unit 1002 to the PDN GW communication unit 1001 through the user plane communication unit 1003 and is then transmitted to the PDN GW.

In the case where the data received from the PDN GW is control data, the control data is transmitted from the PDN GW communication unit 1001 to a control plane control unit 1005. In the case where the data received from the base station 72 is control data, the control data is transmitted from the base station communication unit 1002 to the control plane control unit 1005.

A HeNBGW communication unit 1004 is provided in the case where the HeNBGW 74 is provided, which performs data transmission/reception by means of the interface (IF) between the MME 73a and the HeNBGW 74 according to an information type. The control data received from the HeNBGW communication unit 1004 is transmitted from the HeNBGW communication unit 1004 to the control plane control unit 1005. The processing results of the control plane control unit 1005 are transmitted to the PDN GW through the PDN GW communication unit 1001. The processing results of the control plane control unit 1005 are transmitted to one or a plurality of base stations 72 by means of the S1 interface through the base station communication unit 1002, and are transmitted to one or a plurality of HeNBGWs 74 through the HeNBGW communication unit 1004.

The control plane control unit 1005 includes an NAS security unit 1005-1, an SAE bearer control unit 1005-2, and an idle state mobility managing unit 1005-3, and performs an overall process for the control plane. The NAS security unit 1005-1 provides, for example, security of a non-access stratum (NAS) message. The SAE bearer control unit 1005-2 manages, for example, a system architecture evolution (SAE) bearer. The idle state mobility managing unit 1005-3 performs, for example, mobility management of an idle state (LTE-IDLE state, which is merely referred to as idle as well), generation and control of paging signaling in an idle state, addition, deletion, update, and search of a tracking area (TA) of one or a plurality of user equipments 71 being served thereby, and tracking area list (TA list) management.

The MME 73a begins a paging protocol by transmitting a paging message to the cell belonging to a tracking area (TA) with which the UE is registered. The idle state mobility managing unit 1005-3 may manage the CSG of the Home-eNBs 72-2 to be connected to the MME 73a, CSG-IDs, and a whitelist.

In the CSG-ID management, the relationship between a user equipment corresponding to the CSG-ID and the CSG cell is managed (added, deleted, updated, or searched). For example, it may be the relationship between one or a plurality of user equipments whose user access has been registered with a CSG-ID and the CSG cells belonging to this CSG-ID. In the whitelist management, the relationship between the user equipment and the CSG-ID is managed (added, deleted, updated, or searched). For example, one or a plurality of CSG-IDs with which user registration has been performed by a user equipment may be stored in the whitelist. The above-mentioned management related to the CSG may be performed by another part of the MME 73a. A series of processes by the MME 73a is controlled by a control unit 1006. This means that, though not shown in FIG. 10, the control unit 1006 is connected to the respective units 1001 to 1005.

The function of the MME 73a under discussion of 3GPP is described below (see Chapter 4.6.2 of Non-Patent Document 1). The MME 73a performs access control for one or a plurality of user equipments being members of closed subscriber groups (CSGs). The MME 73a recognizes the execution of paging optimization as an option.

FIG. 11 is a block diagram showing the configuration of the HeNBGW 74 shown in FIG. 7 that is a HeNBGW according to the present invention. An EPC communication unit 1101 performs data transmission/reception between the HeNBGW 74 and the MME 73a by means of the S1 interface. A base station communication unit 1102 performs data transmission/reception between the HeNBGW 74 and the Home-eNB 72-2 by means of the S1 interface. A location processing unit 1103 performs the process of transmitting, to a plurality of Home-eNBs 72-2, the registration information or the like among the data transmitted from the MME 73a through the EPC communication unit 1101. The data processed by the location processing unit 1103 is transmitted to the base station communication unit 1102 and is transmitted to one or a plurality of Home-eNBs 72-2 through the S1 interface.

The data only caused to path through (to be transparent) without requiring the process by the location processing unit 1103 is passed from the EPC communication unit 1101 to the base station communication unit 1102, and is transmitted to one or a plurality of Home-eNBs 72-2 through the S1 interface. A series of processes by the HeNBGW 74 is controlled by a control unit 1104. This means that, though not shown in FIG. 11, the control unit 1104 is connected to the respective units 1101 to 1103.

The function of the HeNBGW 74 under discussion of 3GPP is described below (see Chapter 4.6.2 of Non-Patent Document 1). The HeNBGW 74 relays an S1 application. The HeNBGW 74 terminates the S1 application that is not linked to the user equipment 71 though it is a part of the procedures toward the Home-eNB 72-2 and towards the MME 73a. When the HeNBGW 74 is deployed, the procedure that is not linked to the user equipment 71 is communicated between the Home-eNB 72-2 and the HeNBGW 74 and between the HeNBGW 74 and the MIME 73a. The X2 interface is not set between the HeNBGW 74 and another node. The HeNBGW 74 recognizes the execution of paging optimization as an option.

Figure 12:
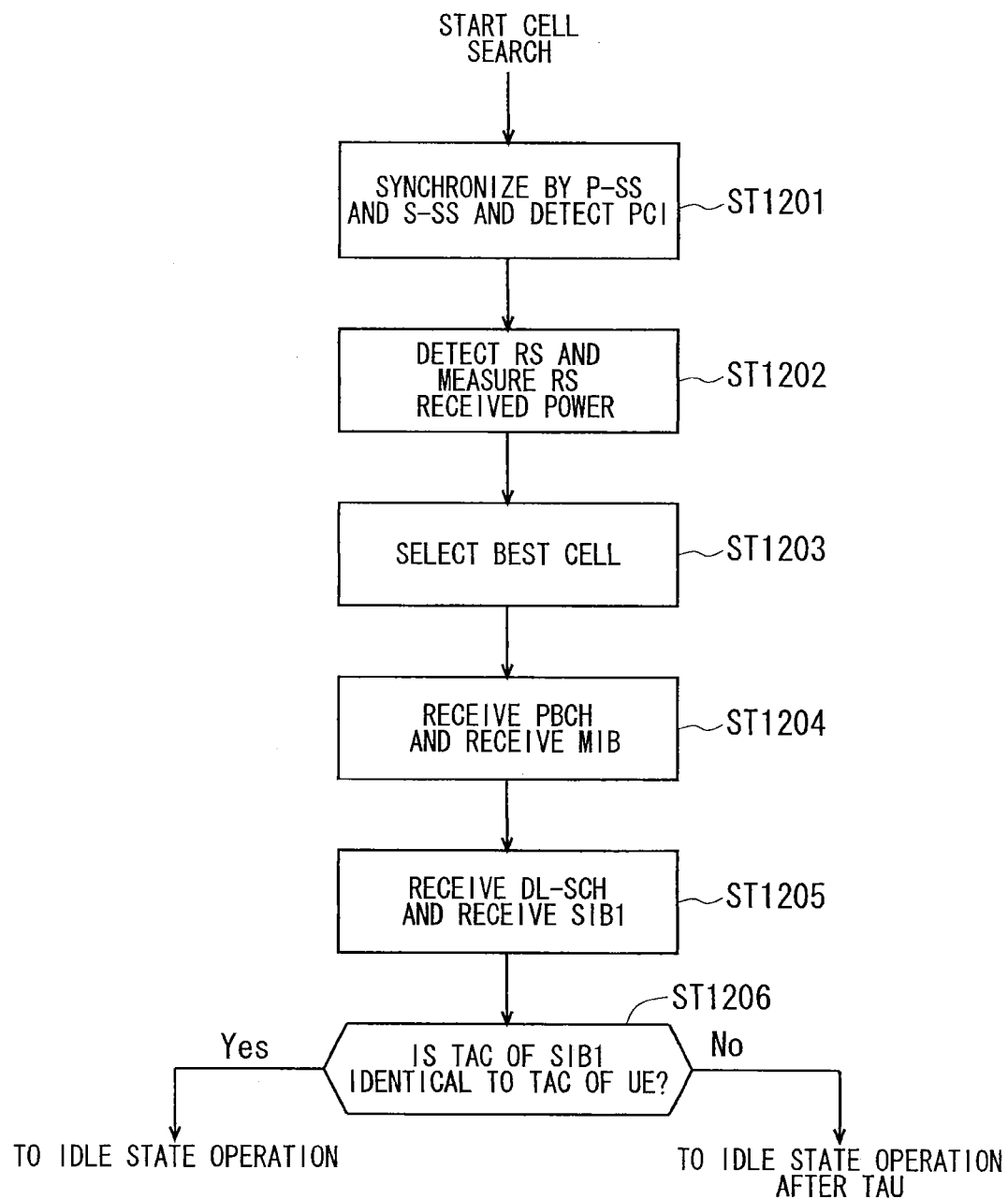
FIG. 12 is a flowchart showing an outline from a cell search to an idle state operation performed by a user equipment (UE) in the LTE communication system.

Next, an example of a typical cell search method in a mobile communication system is described. FIG. 12 is a flowchart showing an outline from a cell search to an idle state operation performed by a user equipment (UE) in the LTE communication system. When starting the cell search, in Step ST1201, the user equipment synchronizes the slot timing and frame timing by a primary synchronization signal (P-SS) and a secondary synchronization signal (S-SS) transmitted from a neighbour base station.

P-SS and S-SS are collectively referred to as synchronization signals (SSs). Synchronization codes, which correspond to physical cell identities (PCIs) assigned per cell one by one, are assigned to the synchronization signals (SSs). The number of PCIs is studied in 504 ways. These 504 ways are used for synchronization, and the PCIs of the synchronized cells are detected (specified).

Next, in Step ST1202, the user equipment detects a cell-specific reference signal (CRS) being a reference signal (RS) transmitted from the base station per cell and measures the reference signal received power (RSRP). The code corresponding to the PCI one by one is used for the reference signal (RS), and separation from another cell is enabled by correlation using the code. The code for RS of the cell is derived from the PCI specified in Step ST1201, which makes it possible to detect the RS and measure the RS received power.

Next, in Step ST1203, the user equipment selects the cell having the best RS reception quality, for example, cell having the highest RS received power, that is, best cell from one or more cells that have been detected up to Step ST1202.

In Step ST1204, next, the user equipment receives the PBCH of the best cell and obtains the BCCH that is the broadcast information. A master information block (MIB) containing the cell configuration information is mapped to the BCCH over the PBCH. Accordingly, the MIB is obtained by obtaining the BCCH through reception of the PBCH. Examples of the MIB information include the downlink (DL) system bandwidth (also referred to as transmission bandwidth configuration (dl-bandwidth)), transmission antenna number, and system frame number (SFN).

In Step ST1205, next, the user equipment receives the DL-SCH of the cell based on the cell configuration information of the MIB, to thereby obtain a system information block (SIB) 1 of the broadcast information BCCH. The SIB1 includes the information related to the access to the cell, information related to cell selection, and scheduling information of other SIB (SIBk; k is an integer equal to or larger than two). In addition, the SIB1 includes a tracking area code (TAC).

In Step ST1206, next, the user equipment compares the TAC of the SIB1 received in Step ST1205 with a TAC portion of the tracking area identity (TAI) in the tracking area (TA) list that has been already possessed by the user equipment. The tracking area (TA) list is also referred to as a TAI list. TAI denotes TA identity, and is composed of a mobile country code (MCC), a mobile network code (MNC), and a tracking area code (TAC). MCC denotes a country code. MNC denotes a network code. TAC denotes a TA code number.

In a case where the TAC received in Step ST1205 is identical to the TAC included in the tracking area (TA) list as a result of the comparison, the user equipment enters an idle state operation in the cell. In a case where the TAC received in Step ST1205 is not included in the tracking area (TA) list as a result of the comparison in Step ST1206, the user equipment requires a core network (EPC) including MME and the like to change a tracking area (TA) through the cell for performing tracking area update (TAU). The core network updates the tracking area (TA) list based on an identification number (such as a UE-ID) of the user equipment transmitted from the user equipment together with a TAU request signal. The core network transmits the updated tracking area (TA) list to the user equipment. The user equipment rewrites (updates) the TAC list of the user equipment with the received tracking area (TA) list. After that, the user equipment enters the idle state operation in the cell.

As to the LTE, LTE-A, and universal mobile telecommunication system (UMTS), the introduction of a closed subscriber group (CSG) cell is studied. As described above, access is allowed for only one or a plurality of user equipments registered with the CSG cell. A CSG cell and one or a plurality of user equipments registered with the CSG cell constitute one CSG. A specific identification number referred to as CSG-ID is added to the thus constituted CSG. Note that one CSG may contain a plurality of CSG cells. After being registered with any one of the CSG cells, the user equipment can access another CSG cell of the CSG to which the registered CSG cell belongs.

Alternatively, the Home-eNB in the LTE and LTE-A or the Home-NB in the UMTS is used as the CSG cell in some cases. The user equipment registered with the CSG cell has a whitelist. Specifically, the whitelist is stored in the subscriber identity module (SIM)/USIM. The CSG information of the CSG cell with which the user equipment has been registered is stored in the whitelist. Specific examples of the CSG information include CSG-ID, tracking area identity (TAI), and TAC. Any one of the CSG-ID and TAC is adequate as long as they are associated with each other. Alternatively, EGCI is adequate as long as the CSG-ID and TAC are associated with EGCI.

As can be seen from the above, the user equipment that does not have a whitelist (including a case where the whitelist is empty in the present invention) is not allowed to access the CSG cell but is allowed to access the non-CSG cell only. Meanwhile, the user equipment which has a whitelist is allowed to access the CSG cell of the CSG-ID with which registration has been performed as well as the non-CSG cell.

The HeNB and HNB are required to support various services. For example, an operator causes the predetermined HeNB and HNB to register user equipments therein and permits only the registered user equipments to access the cells of the HeNB and HNB, which increases radio resources available for the user equipments and enables high-speed communication. In such a service, the operator correspondingly sets a higher charge than a normal service.

In order to achieve the above-mentioned service, the closed subscriber group (CSG) cell accessible only to the registered (subscribed or member) user equipments is introduced. It is required to install a large number of closed subscriber group (CSG) cells in shopping malls, apartment buildings, schools, companies and the like. For example, the following manner of use is required; the CSG cells are installed for each store in shopping malls, for each room in apartment buildings, for each classroom in schools, and for each section in companies such that only the users who have registered with the respective CSG cells are permitted to use those CSG cells. The HeNB/HNB is required not only to complement the communication outside the coverage of the macro cell (area complementing HeNB/HNB) but also to support various services as described above (service providing HeNB/HNB). This also leads to a case where the HeNB/HNB is installed within the coverage of the macro cell.

As described above, it is studied to support a relay and a relay node (RN) as a new technique of LTE-A. The RN supported in Release 10 of 3GPP is a fixed RN and does not move after starting the operation.

FIG. 13 is a diagram showing an architecture of a mobile communication system in a case where the RN in Release 10 of 3GPP is provided. The architecture of the mobile communication system (hereinafter, also merely referred to as "communication system") shown in FIG. 13 is described in TS23.401 V10.3.0 (hereinafter, referred to as "Reference 1") by 3GPP. The mobile communication system includes an MME for RN 1301, an MME for UE 1302, a UE 1303, an RN 1304, a DeNB 1305, a P-GW for UE 1306, and an S-GW for UE 1307.

The MME for RN 1301 is an MME that manages the RN 1304. The MME for UE 1302 is an MME that manages the MME for UE 1303. The MME for RN 1301 and MME for UE 1302 may be configured in the same MME 1300. FIG. 13 shows a case in which the MME for RN 1301 and MME for UE 1302 are configured in the same MME 1300. The MME for RN 1301 and MME for UE 1302 are not required to be configured in the same MME 1300. The P-GW for UE 1306 is a P-GW for the UE 1303. The S-GW for UE 1307 is an S-GW for the UE 1303.

The UE 1303 and RN 1304 are connected by a Uu interface 1314. The RN 1304 and DeNB 1305 are connected by an interface 1315 formed of an S1 interface, an X2 interface, and a Un interface. The DeNB 1305 and MME for RN 1301 are connected by an S1 interface 1308 and an S11 interface 1309. The MME for UE 1302 and DeNB 1305 are connected by an S1 interface 1310. The MME for UE 1302 and S-GW for UE 1307 are connected by an S11 interface 1311. The DeNB 1305 and S-GW for UE 1307 are connected by an S1 interface 1316. The P-GW for UE 1306 and S-GW for UE 1307 are connected by an S5/S8 interface 1313. The P-GW for UE 1306 and an external packet network are connected by an SGi interface 1312.

As the concept of the architecture of the mobile communication system involving the RN, the RN is recognized as an eNB by the UE and recognized as a UE by the DeNB.

The DeNB hosts the following two functions in addition to the conventional functions of the eNB (see Non-Patent Document 1).

(1) S1/X2 proxy functionality for supporting one or a plurality of RNs.

(2) S11 termination and S-GW/P-GW functionality for supporting one or a plurality of RNs.

In a case where the RN operates as a UE, communications are performed among the RN, DeNB, MME for RN, and S-GW/P-GW functionality of the DeNB. The Un interface is used in the communication between the RN and the DeNB. The S1 interface is used in the communication between the DeNB and the MME for RN. The S11 interface is used in the communication between the MME for RN and the S-GW/P-GW functionality of the DeNB.

Meanwhile, in a case where the RN operates as the eNB for the UE, communications are performed among the UE, RN, S1/X2 proxy functionality of the DeNB, MME for UE, and S-GW for UE/P-GW for HE. The Uu interface is used in the communication between the UE and RN. The S1 interface is used in the communication between the RN and the MME for UE via the S1 proxy functionality of the DeNB. The S11 interface is used in the communication between the MME for UE and the S-GW for UE/P-GW for UE. In a case where an X2 interface is used in place of the S1 interface, the Uu interface is used in the communication between the UE and RN. The X2 interface is used in the communication between the RN and a neighbour eNB via the X2 proxy functionality of the DeNB.

In 3GPP, the mobile relay nodes (mobile RNs) are newly proposed in addition to the fixed RNs. The mobile RNs are disclosed in R1-082975 (hereinafter, referred to as "Reference 2") by 3GPP and R3-110656 (hereinafter, referred to as "Reference 3") by 3GPP.

The mobiles RN are installed in, for example, moving bodies such as express buses and high-speed rails and move together therewith. The mobile RN relays the communication between the base station and the user equipment (UE) of a passenger in the moving body, such as an express bus and a high-speed rail.

FIG. 14 is a diagram for describing a use case of the mobile RN. A base station 1402 is located in a coverage 1401 provided by the base station 1402. FIG. 14 shows a case in which one base station 1402 provides one cell. In this case, the cell corresponds to the base station 1402. Not limited to the above, one base station may provide a plurality of cells. In this case, each of the cells corresponds to the base station 1402. The above holds true for the case in which, for example, the base station is an eNB. This also holds true for the diagrams below.

The moving body, for example, an express bus 1406 is currently located within the coverage 1401 provided by the base station 1402 and is moving along the direction of an arrow 1400. An RN 1407 is installed in the express bus 1406. Passengers riding in the express bus 1406 carry UEs 1403 to 1405. In other words, the UEs 1403 to 1405 are installed in the express bus 1406.

The base station 1402 communicates with the RN 1407 moving together with the express bus 1406. The UEs 1403 to 1405 in the express bus 1406 do not directly communicate with the base station 1402 but communicate with the base station 1402 via the RN 1407 installed in the express bus 1406. In other words, the RN 1407 appears as a base station to the UEs 1403 to 1405 in the express bus 1406.

The following problems arise in the case where the UEs 1403 to 1405 in the express bus 1406 directly communicate with the macro cell. The problems include an impact of the Doppler shift to the UEs, a transmission loss between the inside and outside of a vehicle, a reduction in HO success rate, and increases in investment and operational costs of an operator.

The mobile RN is considered effective as the means for solving those problems. The UE communicates with the mobile RN, resulting in no impact of Doppler shift to the UE and no transmission loss between the inside and outside of a vehicle. The distance between the UE and mobile RN is much smaller than the distance between the UE and macro cell, leading to a reduction in consumption power of the UE as well. Further, the UE is connected to the mobile RN via an air interface and thus does not need to perform HO, which solves signaling congestion. By virtue of the above, it is not necessary to install a new macro cell, leading to reductions in investment and operational costs of the operator.

Discussions have not been specifically made in 3GPP as to the communication method when an RN moves. In a case where the mobile RN is supported by the conventional technique, a problem arises in the communication performed between a UE being served by the RN and a network. For example, in a case where the RN installed in a moving body such as an express bus moves, the UE being served by the RN, which is carried by a passenger of the moving body such as an express bus, actually moves together with the moving body but does not operate as in the case where the UE moves alone. This is because the UE being served by the moving RN is communicating with this RN and thus does not recognize that it has moved between cells. Thus, the UE being served by the moving RN does not perform the mobility process that is performed when the UE moves alone between cells.

The problem in a case where the UE does not perform the mobility process is described below. First, a case in which a UE being served by a macro cell moves is described. In this case, the mobility process of the UE is performed without any trouble.

As described above, the MME manages the TAI list of UE for mobility management of the UE. The TAI list is shared between the UE and MME. The TAIs in the TAI list are the TAIs of the TAs managed by the MME that manages this TAI list.

For example, in a case where the UE during communication has moved between eNBs that are connected to different MMEs, the HO process is activated in the UE. Through the HO process, in order to update the TA to which the own UE belongs to the TA to which a newly connected eNB (hereinafter, also referred to as "target eNB") belongs, the UE issues a TAU request to an MME (hereinafter, also referred to as "target MME") to be connected with the target eNB.

The MME that has received the TAU request performs the process of managing the UE mobility and then transmits the TAI list, by including the TAI of the TA to which the target eNB belongs in the TAI list, to the UE.

This process enables the target MME to recognize the UE and perform the mobility management. This allows for communication between the UE and core network.

The UE activates the TAU process not only during communication but also during moving in an idle state, and thus, a series of processes enables the target MME to recognize the UE and perform the mobility management. This allows for communication between the UE and core network.

Figure 15:
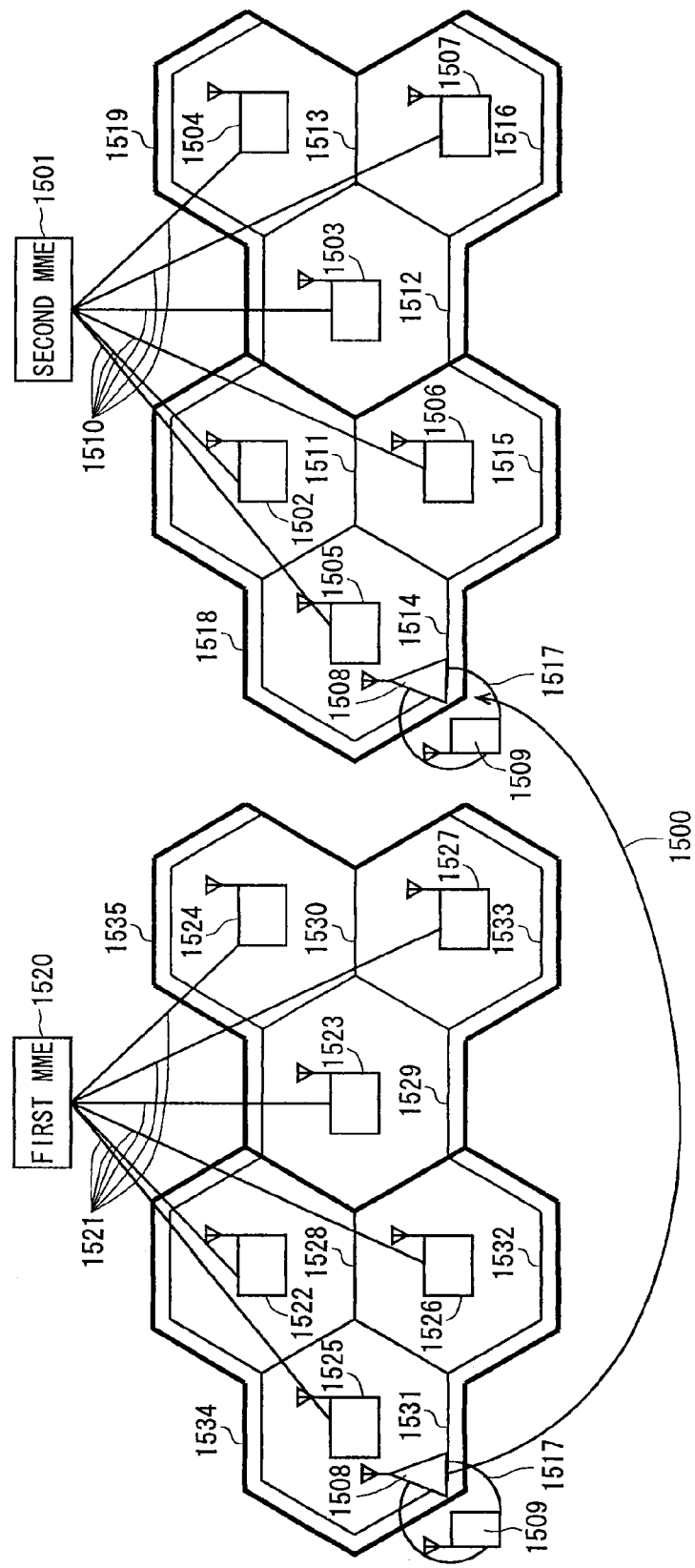
FIG. 15 is a diagram for describing TAs of a UE in a case where an RN moves.

Next, a case in which the RN moves is described. FIG. 15 is a diagram for describing the TAs of the UE in a case where the RN moves. First to sixth eNBs (cells) 1522 to 1527 are connected to a first MME 1520 via S1 interfaces 1521. Seventh to twelfth eNBs (cells) 1502 to 1507 are connected to a second MME 1501 via S1 interfaces 1510.

The first to sixth eNBs (cells) 1522 to 1527 are located in first to sixth coverages 1528 to 1533 provided by the eNBs (cells) 1522 to 1577, respectively. Similarly, the seventh to twelfth eNBs (cells) 1502 to 1507 are located in seventh to twelfth coverages 1511 to 1516 provided by the eNBs (cells) 1502 to 1507, respectively.

An RN 1508 is located in the coverage 1517 provided by the RN 1508. A UE 1509 is served by the RN 1508.

The first, fourth, and fifth eNBs (cells) 1522, 1525, and 1526 belong to a first TA 1534 set in advance. The second, third, and sixth eNBs (cells) 1523, 1524, and 1527 belong to a second TA 1535 set in advance.

The seventh, tenth, and eleventh eNBs (cells) 1502, 1505, and 1506 belong to a third TA 1518 set in advance. The eighth, ninth, and twelfth eNBs (cells) 1503, 1504, and 1507 belong to a fourth TA 1519 set in advance.

The first TA 1534 and second TA 1535 are managed by the first MME 1520. The third TA 1518 and fourth TA 1519 are managed by the second MME 1501.

As described above, the MME manages the TAI list of a UE for mobility management of the UE. The TAI list is shared between the UE and MME. The TAIs in the TAI list are the TAIs of the TAs managed by the MME that manages this TAI list.

For example, in a case where the RN 1508 moves along an arrow 1500 as shown in FIG. 15, it moves between the fourth eNB 1525 and tenth eNB 1505, namely between the fourth coverage 1531 and tenth coverage 1514, and the HO process is activated in the RN 1508. The fourth eNB 1525 and tenth eNB 1505 are DeNBs having the functionality for supporting the RN 1508.

However, the UE 1509 being served by the RN 1508 that has moved continuously communicates with the same RN 1508, and thus does not activate the HO process. Thus, the UE 1509 being served by the RN 1508 that has moved does not activate the TAU.

In the example shown in FIG. 15, the eNB (hereinafter, also referred to as a "source eNB"), to which the RN 1508 has been connected before moving, is the fourth eNB 1525, and the MME (hereinafter, also referred to as a "source MME") connected to the source eNB is the first MME 1520. The target eNB being an eNB, to which the RN 1508 is newly connected after moving, is the tenth eNB 1505, and the target MME being an MME to be connected to the target eNB is the second MME 1501.

The target MME to be connected to the tenth eNB 1505 being the target eNB of the RN 1508, namely the second MME 1501 cannot receive the TAU request from the UE 1509 and accordingly does not recognize the presence of the UE 1509. Thus, the second MME 1501 cannot perform the mobility management. The source MME to be connected to the fourth eNB 1525 being the source eNB for the RN 1508, namely the first MME 1520 attempts to communicate with the UE 1509 but cannot communicate with the UE 1509 because the UE 1509 is not located within the management range.

In a case where the MME cannot recognize the presence of the UE and thus cannot perform the mobility management, the UE in the RRC_Connected state cannot transmit/receive an NAS message to/from the target MME if attempting to communicate with the core network side. Also, routing to the S-GW/P-GW may not be allowed. Thus, communication between the UE and core network is not allowed.

Also for the UE in the RRC_Idle state, the source MME and target MME cannot recognize the TA to which the UE belongs. If they cannot recognize the TA to which the UE belongs, the source MME and target MME cannot notify the UE of a paging signal. Also, the UE cannot transmit a service request. Thus, communication is not allowed between the UE and core network.

This embodiment therefore discloses the method for solving those problems. In this embodiment, the TA to which the RN belongs is made identical to the TA to which the target DeNB belongs. In other words, the TAI of the RN is made identical to the TAI of the target DeNB.

Figure 16:
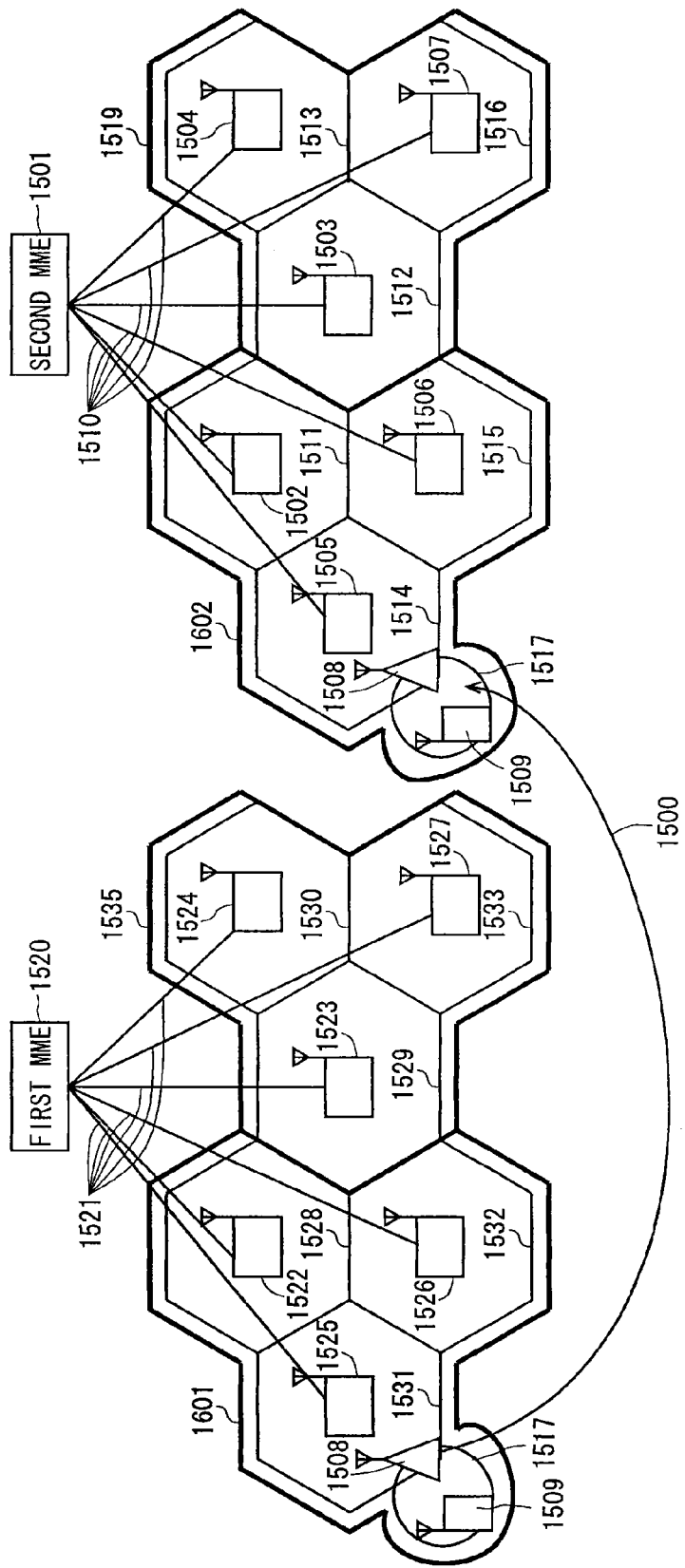
FIG. 16 is a diagram for describing a TA to which a UE belongs in a case where a TAI of the RN is made identical to a TAI of a target DeNB when the RN moves.

FIG. 16 is a diagram for describing the TA to which the UE belongs in a case where the TAI of the RN is made identical to the TAI of the target DeNB when the RN moves. The configuration shown in FIG. 16 is similar to the configuration shown in FIG. 15, and thus, the corresponding parts are denoted by the same reference symbols and common description is omitted.

FIG. 16 shows a case in which the RN 1508 moves along the arrow 1500. The TA to which the RN 1508 before moving belongs is the TA to which the fourth eNB 1525 being a source DeNB for the RN belongs. In other words, the TA to which the RN 1508 before moving belongs is a first TA 1601. The first TA 1601 is managed by the first MME 1520. The first, fourth, and fifth eNBs (cells) 1522, 1525, and 1526 belong to the first TA 1601.

After moving, the RN 1508 is connected to the tenth eNB 1505 being a DeNB. The TA to which the RN 1508 after moving belongs is the TA to which the tenth eNB 1505 being the target DeNB for the RN 1508 belongs. In other words, the TA to which the RN 1508 after moving belongs is a third TA 1602. The third TA 1602 is managed by the second MME 1501. The seventh, tenth, and eleventh eNBs (cells) 1502, 1505, and 1506 belong to the third TA 1602.

The RN 1508 moves from the fourth DeNB 1525 to the tenth DeNB 1505, whereby the HO process is activated in the RN 1508. After moving of the RN 1508, the TA to which the RN 1508 belongs changes from the first TA 1601 to the third TA 1602. Thus, the RN 1508 activates the TAU process during the HO process.

The UE 1509 being served by the RN 1508 that has moved continuously communicates with the same RN 1508 and thus does not activate the HO process. However, the TA to which the RN 1508 that has moved belongs is changed from the first TA 1601 to the third TA 1602, and thus, the UE 1509 also activates the TAU process.

As described above, the UE 1509 being served by the moving RN 1508 activates the TAU process such that the TAU process of the UE is performed, whereby the target MME 1501, to which the RN 1508 is connected via the target eNB 1505, can receive the TAU request from the UE 1509. As a result, the TAU process of the UE 1509 enables both of the target MME 1501 and source MME 1520 to recognize the presence of the UE 1509 and perform mobility management. Thus, communication is allowed between the UE and core network.

R3-091335 (hereinafter, referred to as "Reference 4") by 3GPP describes that the TAI of the RN is made identical to the TAI of the DeNB, which is for a fixed RN, but does not disclose the TAI in a case where the RN moves and further does not disclose a problem arising from the RN moving.

The method disclosed in this embodiment is aimed to solve the above-mentioned problem, and as the method therefor, the TAI of the RN is made identical to the TAI of a target DeNB when the RN has moved. Thus, for example, if the TAI of the target DeNB differs from the TAI of the source DeNB being a DeNB before moving, the TAI of the RN is also changed. In this point, the method disclosed in this embodiment differs greatly from the technique disclosed in Reference 4.

A specific example for making the TAI of the RN identical to the TAI of the target DeNB is disclosed. The RN receives the TAI of the DeNB from the DeNB and notifies a UE being served thereby of the TAI. The RN may make the TAI of the DeNB transparent to the UE. "Making transparent" means the transparent transmission, namely transmission without any change.

The RN receives the TAI of the DeNB from the DeNB. The RN may receive the TAC, not TAI. For the TAC, the RN may derive the TAI from the PLMN, MCC, or MNC to be separately received from the DeNB. The TAI can be associated with the TAC. The following three are disclosed as specific examples of the method in which the DeNB notifies the RN of the TAI.

(1) The DeNB broadcasts TAI of the TA to which the own DeNB belongs, by including it in the system information (SI). The RN receives the broadcast information broadcast from the DeNB and obtains the TAI.

(2) The DeNB notifies the RN being served thereby of the TAI of the TA to which the own DeNB belongs through dedicated signaling. The RN receives the dedicated signaling notified from the DeNB and obtains the TAI. The dedicated signaling may be RRC signaling. Alternatively, the system information of the DeNB may be notified through dedicated signaling. The TAI may be included in the system information.

(3) The source DeNB notifies the RN being served thereby of the TAI of the TA to which the target DeNB belongs through dedicated signaling. The specific example (3) is applicable to a case in which the TAI of the DeNB is notified in the HO process of the RN. The RN receives the dedicated signaling notified from the source DeNB and obtains the TAI of the target DeNB. The dedicated signaling may be RRC signaling. Alternatively, the system information of the target DeNB may be notified through dedicated signaling. The TAI may be included in the system information.

The RN sets the TAI that has been received from the DeNB as the TAI of the own RN and broadcasts the TAI as the system information.

FIG. 17 is a diagram showing an example of the sequence when an RN moves in a case where the TAI of the RN is made identical to the TAI of the target DeNB.

The RN turns on the power in the coverage of the source DeNB (s-DeNB) and then moves to Step ST1701. In Step ST1701, the RN performs the attach process among the source DeNB, source MME (s-MME), and home subscriber server (HSS). The HSS corresponds to the management unit. The HSS is included in the core network.

During the attach process of Step ST1701, in Step ST1702, the RN receives RRC signaling including the TAI of the source DeNB from the source DeNB and obtains the TAI.

In Step ST1703, the RN sets the TAI received from the source DeNB as the TAI of the own RN. Then, in Step ST1704, the RN broadcasts the set TAI as the system information to a UE being served by the own RN.

The UE being served by the RN receives the system information from the RN to recognize the TAI of the RN. The UE checks whether the TAI list of the UE includes the TAI of the RN, and performs the TAU process in a case where it is not included or does not perform the TAU process in a case where it is included. FIG. 17 shows the case in which the TAI list of the UE includes the TAI of the RN, namely a case in which the UE does not perform the TAU process.

In Step ST1705, the RN moves from the coverage of the source DeNB to the coverage of the target DeNB.

In Step ST1706, the RN activates the HO such that the HO process of the RN is performed among the source DeNB, target DeNB (t-DeNB), source MME, target MME (t-MME), and HSS.

During the HO process of Step ST1706, in Step ST1707, the RN receives the TAI from the target DeNB. Then, the RN checks whether or not the TAI received from the target DeNB is included in the TAI list of the own RN, and then performs the TAU process in a case where it is not included or does not perform the TAU process in a case where it is included. FIG. 17 shows the case in which the TAI list of the RN does not include the TAI received from the target DeNB. As described above, in the case where the TAI list of the RN does not include the TAI received from the target DeNB, the TAU process of the RN is performed among the RN, source DeNB, target DeNB, source MME, target MME, and HSS during the HO process of Step ST1706.

During the HO process and TAU process of Step ST1706, in Step ST1707, the RN receives RRC signaling including the TAI of the target DeNB from the target DeNB and obtains the TAI.

In Step ST1708, the RN changes the TAI of the own RN to the TAI received from the target DeNB.

In Step ST1709, the RN performs the system information modification (SI modification) process on the UE being served thereby. The RN notifies the UE being served thereby of the modification of the system information through paging. Then, in Step ST1710, the RN broadcasts the TAI changed in Step ST1708 to the UE being served thereby as the system information. The UE recognizes that the system information has been modified through paging and receives the system information broadcast. This enables the UE being served by the RN to receive the TAI changed if it is in the RRC_Connected state or RRC_Idle state.

The UE being served by the RN receives the system information from the RN to recognize the TAI of the RN. The UE checks whether or not the TAI of the RN is included in the TAI list of the UE, and then performs the TAU process in a case where it is not included or does not perform the TAU process in a case where it is included. FIG. 17 shows the case in which the TAI list of the UE does not include the TAI of the RN, namely a case in which the UE performs the TAU process.

In Step ST1711, the UE activates the TAU process and transmits a TAU request signal to the RN.

In Steps ST1712 and ST1714, the RN transmits the TAU request signal from UE to the target MME via the target DeNB.

At this time, in Step ST1713, the target DeNB proxies an S1 message from the RN by the S1 proxy functionality for the target MME.

In Step ST1715, the TAU process of the UE is performed among the UE, RN, source DeNB, target DeNB, source MME, target MME, and HSS.

In the TAU process of Step ST1715, the target MME updates the TAI list of the UE and notifies the UE of the updated TAI list. In the TAU process, the UE receives the updated TAI list from the target MME.

The method disclosed in this embodiment allows for, in a case where an RN has moved, the activation of the TAU process by the UE being served thereby that has moved together with the RN. As a result, the target MME and source MME can manage the TAI list of the UE, such as update and deletion thereof, allowing the UE and target MME to share the updated TAI list. This allows for communication between the UE and core network.

In the method disclosed in this embodiment, the RN broadcasts the TAI as the system information and performs the process of modifying the system information on the UE being served thereby when the TAI is changed. As a result, the UE being served by the RN activates the TAU process in any of the RRC_Connected state and RRC_Idle state, and thus can communicate with the core network.

The method disclosed in this embodiment is applicable not only to the case in which the RN performs an inter-MME HO but also to the case in which the RN performs an intra-MME HO. Also in the intra-MME HO, in a case where the TAI list does not include the TAI of the DeNB, the RN performs the TAU and changes the TAI of the own RN. Thus, the UE being served by the RN activates the TAU and performs the TAU process, allowing the MME to recognize the TA in which the UE is located.

The use of the method of this embodiment allows for the application of the same procedure irrespective of HO type, such as inter-MME HO and intra-MME HO. This can simplify the control of allowing the communication between the UE being served by the RN and the core network.

The processes of modifying and establishing a bearer for S-GW and P-GW may be performed in the attach process of the RN, the HO process and TAU process of the RN, and the TAU process of the UE, which are not shown in FIG. 17.

In a case where the RN operates as a UE, the S-GW and P-GW functionalities for RN are incorporated in the DeNB. In this case, signaling between the MME and S-GW and signaling between the MME and P-GW in the conventional HO sequence may be omitted. It suffices to perform the signaling in the DeNB, which does not require signaling between nodes. This results in a reduction in signaling load as a system.

Second Embodiment

In the method of making the TAI of the RN identical to the TAI of the DeNB, disclosed in the first embodiment, the UEs being served by the RN that have obtained the changed TAI simultaneously activate the TAU, causing a problem that a large number of TAU requests are issued. This results in a loss of the advantages of the mobile RN described above.

This embodiment discloses the method for solving this problem. In this embodiment, the TA to which the RN belongs remains unchanged as a result of moving. In other words, the TAI of the RN is not changed as a result of moving. The TAI of the RN may be fixed.

Figure 18:
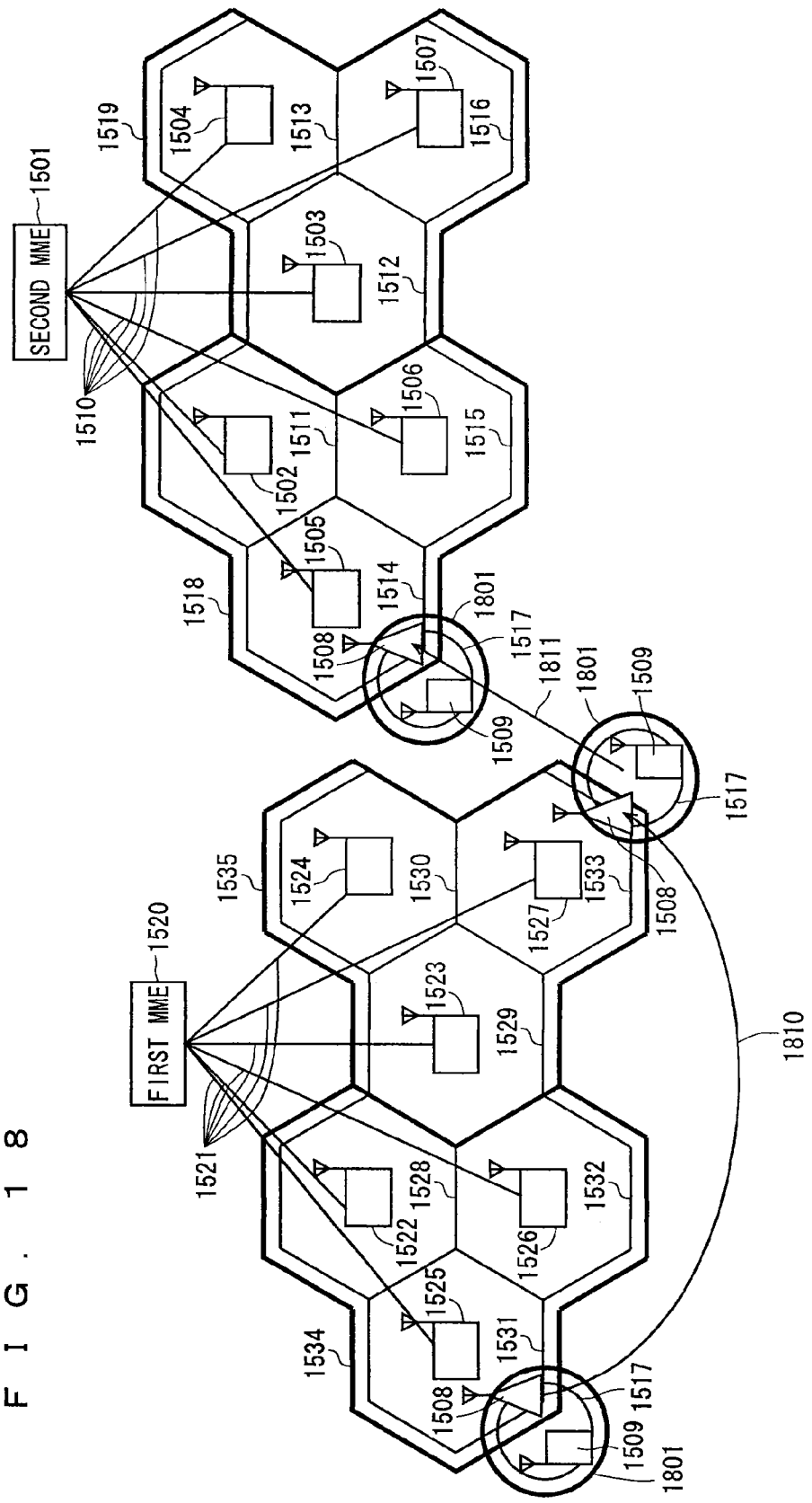
FIG. 18 is a diagram for describing a TA to which a UE belongs in a case where the TAI of the RN is fixed when the RN moves.

FIG. 18 is a diagram for describing the TA to which the UE belongs in a case where the TAT of the RN is fixed when the RN moves. The configuration shown in FIG. 18 is similar to the configuration shown in FIG. 15, and thus, the corresponding parts are denoted by the same reference symbols and common description is omitted.

FIG. 18 shows the case in which the RN 1508 moves along an arrow 1810. The TA to which the RN 1508 before moving belongs is a fifth TA 1801. The fifth TA 1801 is managed by the first MME 1520.

After moving, the RN 1508 is connected to the sixth DeNB 1527. The TA to which the RN 1508 after moving belongs remains unchanged, which is the fifth TA 1801. The fifth TA 1801 is managed by the first MME 1520.

The RN 1508 moves further and is then connected to the tenth DeNB 1505. The TA to which the RN 1508 after moving belongs remains unchanged, which is the fifth TA 1801. The fifth TA 1801 is managed by the second MME 1501.

As shown in FIG. 18, in this embodiment, if the RN 1508 moves from the fourth DeNB 1525 to the sixth DeNB 1527 within the same MME, namely within the first MME 1520, the TA to which the RN 1508 belongs is still the same. In other words, the TAI of the RN 1508 remains unchanged. Here, it is still the fifth TA 1801. If the RN 1508 moves from the sixth DeNB 1527 to the tenth DeNB 1505 between different MMEs, namely between the first MME 1520 and second MME 1501, the TA to which the RN 1508 belongs is the same. In other words, the TAI of the RN 1508 remains unchanged. Here, it is still the fifth TA 1801.

Through the above, if an RN moves between DeNBs or between MMEs, the TAI of the RN remains unchanged, and thus, a UE being served by the RN does not activate the TAU. As a result, UEs being served by the RN do not activate the TAU when the RN moves, solving the above-mentioned problem.

The following two are disclosed regarding the TA to which the RN belongs.

(1) The RN belongs to the TA dedicated thereto.
(2) The RN belongs to a specific TA.

In other words, (1) above means that the TAI of the RN is dedicated to the RN. In this case, one RN may belong to one TA or a plurality of RNs may belong to one TA.

As a result of (1) above, a base station (cell) not being an RN does not belong to the TA to which the RN belongs, making the management in the MME easier. Also, an MME dedicated to an RN can be provided.

The base station (cell) not being an RN does not belong to the TA to which the RN belongs, allowing for the distinction between a conventional TA configuration dependent on an area and a TA configuration dedicated to an RN. Thus, the TA specific to an RN can be managed easily even in a case where the RN supports mobility, namely in a case where the RN is movable.

In other words, (2) above means that an RN has a specific TAI. The specific TA is a TA to which a specific DeNB (hereinafter, also referred to as "P-DeNB") connectable with the RN. The P-DeNB may be, for example, the DeNB that is first RRC-connected with the RN. The P-DeNB may be a DeNB that is first RRC-connected after power-off/on of the RN.

The P-DeNB may be a DeNB that is first RRC-connected with the RN among the eNBs to be connected to a target MME in cell reselection in inter-MME HO or inter-MME. This does not change the TAI in a case where the RN moves within the same MME. As a result, UEs being served by an RN are less likely to simultaneously activate the TAU.

Through (2) above, in a case where, for example, a mobile RN is installed in a train, the RN of the train and the DeNBs of which coverages cover each station can be configured to belong to the same TA. Also, the DeNBs can be managed by the same MME. As a result, UEs used by train passengers can be managed easily.

The RN that supports mobility is a mobile RN, and the RN that does not support mobility is a fixed RN. The TA to which the fixed RN belongs and the TA to which the mobile RN belongs may differ from each other. For example, the mobile RN may have a fixed TAI, and the fixed RN may have the TAI identical to the TAI of the DeNB. This enables only the mobile RN to be managed in a specific TA, allowing for much easier TA management of the RN.

Mobile and fixed modes may be provided as RN modes. One RN may support both modes. In a case where one RN can support both modes, the RN operates in the mobile mode in one case and operates in the fixed mode in the other case. The mobile RN may operate in the mobile mode and the fixed RN may operate in the fixed mode. Alternatively, the mobile RN may operate in the mobile mode or the fixed mode. The TA to which the RN operating in the fixed mode belongs and the TA to which the RN operating in the mobile mode may differ from each other. This allows for TA management according to the operating mode of the RN.

The TAI of the RN and the TAI of the base station (cell) not being an RN may be distinguished from each other. For example, TAC parts of the TAIs are represented as integers of 0 to 65535. Distinction is made such that the TACs for RN are 0 to 32767 and the TACs for other base station are 32768 to 65535. The distinction method is not limited to this.

Distinction may be made among the TAIs for mobile RN, TAIs for fixed RN, and TAIs for other eNB. Alternatively, distinction may be made between the TAIs for mobile RN and TAIs for fixed RN and other eNB.

The eNB is fixed and the TA is divided geographically in conventional cases, and thus, a different TA is managed per MME. The RN, which supports mobility, is characterized in "moving", causing a problem that which MME can manage the TA to which the mobile RN belongs. There is no discussion in 3GPP about an MME that manages the TA of the mobile RN.

The following four are disclosed regarding the MME capable of managing the TA to which the RN supporting mobility belongs.

(1) The TA to which the mobile RN belongs can be managed by an appropriate MME, and the TAI of the mobile RN can be registered in the TAI list served by this MME.

(2) The TA to which the mobile RN belongs can be managed by the MME for the DeNB, and the TAI of the mobile RN can be registered in the TAI list served by this MME.

(3) The TA to which the mobile RN belongs can be managed by the MME for the P-DeNB, and the TAI of the mobile RN can be registered in the TAI list served by this MME.

(4) The TA to which the mobile RN belongs can be managed by the MME but the TAI of the mobile RN is not included in the TAI list managed by every MME.

Through (1) to (4) above, even if the TA to which the RN belongs and the TAI of the RN do not change as a result of moving, the target MME can manage the TA of this RN.

In a case where the TAI of the RN is not changed as a result of moving, a problem arises in the communication performed between a UE being served by the RN and a network. This is because if the RN moves, the UE being served by the moving RN is communicating with the RN and does not recognize that it has moved between cells. Thus, the UE being served by the moving RN does not perform the mobility process, and the MME cannot configure and manage the TAI list of the UE, so that the communication between the UE and core network is not allowed.

The method for solving those problems is therefore disclosed below. The MME for UE and the MME for RN transmit/receive the information regarding the TA. An interface (IF) may be newly provided between the MME for UE and the MME for RN for the transmission and reception of the information.

FIG. 19 is a diagram showing an architecture of a mobile communication system including an RN in a case where the transmission and reception of the information regarding the TA are performed between the MME for UE and the MME for RN. The configuration shown in FIG. 19 is similar to the configuration shown in FIG. 13, and thus, the corresponding parts are denoted by the same reference symbols and common description is omitted. In the configuration shown in FIG. 19, an IF 1901 is provided between the MME for RN 1301 and the MME for UE 1302. The MME for RN 1301 and the MME for UE 1302 transmit and receive the information regarding the TA via the IF 1901.

The method of managing the TAs in the MME for UE and the MME for RN are disclosed below. First, the TAs managed by the MME for UE are described. The TAs managed by the MME for UE are for mobility management of a UE being served by an RN. Thus, RNs operating as an eNB when viewed from a UE belong to the TA managed by the MME for UE.

FIG. 20 is a diagram for describing an example of the method of managing the TAs in the MME for UE. The table shown in FIG. 20 is a mapping table showing the correspondence between TAs managed by the MME for UE and RNs that belong thereto. The MME for UE manages the TAs by TAIs and manages the RNs by identifiers of the RNs. For example, the MME for UE manages the TAs having TAI#13 and TAI#14. TAI#n (n is an integer not less than zero) represents the TAI of each TA.

In the example shown in FIG. 20, RNs having RN#0, RN#1, and RN#2 belong to the TA having TAI#13. RNs having RN#3, RN#4, and RN#5 belong to the TA having TAI#14. RN#n (n is an integer not less than zero) represents the identity of each RN. RN#n may be a cell identity.

For example, if TAI#13 is included in the TAI list (TAI list_UE) of a certain UE, association is made in the MME for UE as follows.

TAI list_UE={TAI#13}={RN#0,RN#1,RN#2}

Next, the TAs managed by the MME for RN are described. The TAs managed by the MME for RN are for mobility management of the RN. Thus, the DeNBs that operate as an eNB when viewed from the RN belong to the TA managed by the MME for RN.

FIG. 21 is a diagram for describing an example of the method of managing the TAs in the MME for RN. The table shown in FIG. 21 is a mapping table showing the correspondence between the TAs managed by the MME for RN and the DeNBs that belong thereto. The MME for RN manages the TAs in accordance with TAIs and manages the DeNBs in accordance with identities of DeNBs. For example, the MME for RN manages the TAs having TAI#11 and TAI#12.

DeNBs having DeNB#0 and DeNB#1 belong to the TA having TAI#11. The DeNBs having DeNB#2 and DeNB#3 belong to the TA having TAI#12. DeNB#n (n is an integer not less than zero) is an identity of the DeNB. DeNB#n may be a cell identity. The MME for RN may manage DeNBs in accordance with eNB identities as the identities of the DeNBs.

For example, if TAI#11 and TAI#12 are included in the TAI list (TAI list_RN) of a certain RN, association is made in the MME for RN as follows.

TAI list_RN#0={TAI#11,TAI#12}={DeNB#0, DeNB#1,DeNB#2,DeNB#3}

Disclosed below is a method of allowing for communication between a UE being served by a moving RN and a core network if the UE does not perform a mobility process.

Association is made between the TAI list information (TAI list_UE) of the UE managed by the MME for UE and the TAI list information (TAI list_RN) of the RN managed by the MME for RN. The MME for RN notifies the MME for UE of the information regarding the TA of the UE.

This notification may be triggered by the TAU process when the RN moves or may be triggered by an incoming/outgoing call from/to the UE being served by the RN that has moved. The method in which an incoming/outgoing call from/to a UE is used as a trigger is suitable for the case in which a UE being served by an RN is in the RRC_Idle state.

Disclosed below is a specific example of the method of allowing for communication between a UE being served by a moving RN and a core network even if the UE does not perform the mobility process.

First, the HO process in a case where the RN has moved is described. FIG. 22 is a flowchart showing a processing procedure of the HO process of the RN.

In Step ST2201, the source DeNB issues, to the source MME, a HO request of the RN that has moved. Upon generation of the HO request, the process moves to Step ST2202.

In Step ST2202, the configuration for data forwarding from the source DeNB to the target DeNB is performed. After the configuration of data forwarding, the process moves to Step ST2203.

In Step ST2203, the source DeNB performs data forwarding to the target DeNB. After data forwarding, the source DeNB moves to Step ST2204. In Step ST2204, a UL opens. After that, the process moves to Step ST2205.

In Step ST2205, the path switch setting from the source DeNB to the target DeNB is performed. After the path switch setting, the process moves to Step ST2206. In Step ST2206, the DL opens. After that, the process moves to Step ST2207.

In Step ST2207, the TAU process of the RN is performed as required. The TAU process is performed in a case where the TAI of the target DeNB is not included in the TAI list of the RN. This TAU process enables the target MME to perform mobility management. After that, the process moves to Step ST2208.

In Step ST2208, the process of releasing an old path before path switching is performed. After the process of releasing an old path, the process moves to Step ST2209.

In Step ST2209, the HO process is completed. The source MME is identical to the target MME in a case where the MME is not changed in moving of the RN.

Not in the process for a TAU performed in the HO process but in the process for TAU alone, the TAU process includes the path switch process of Step ST2205, the TAU process of Step ST2207, and the process of releasing an old path of Step ST2208 shown in FIG. 22.

Figure 23:
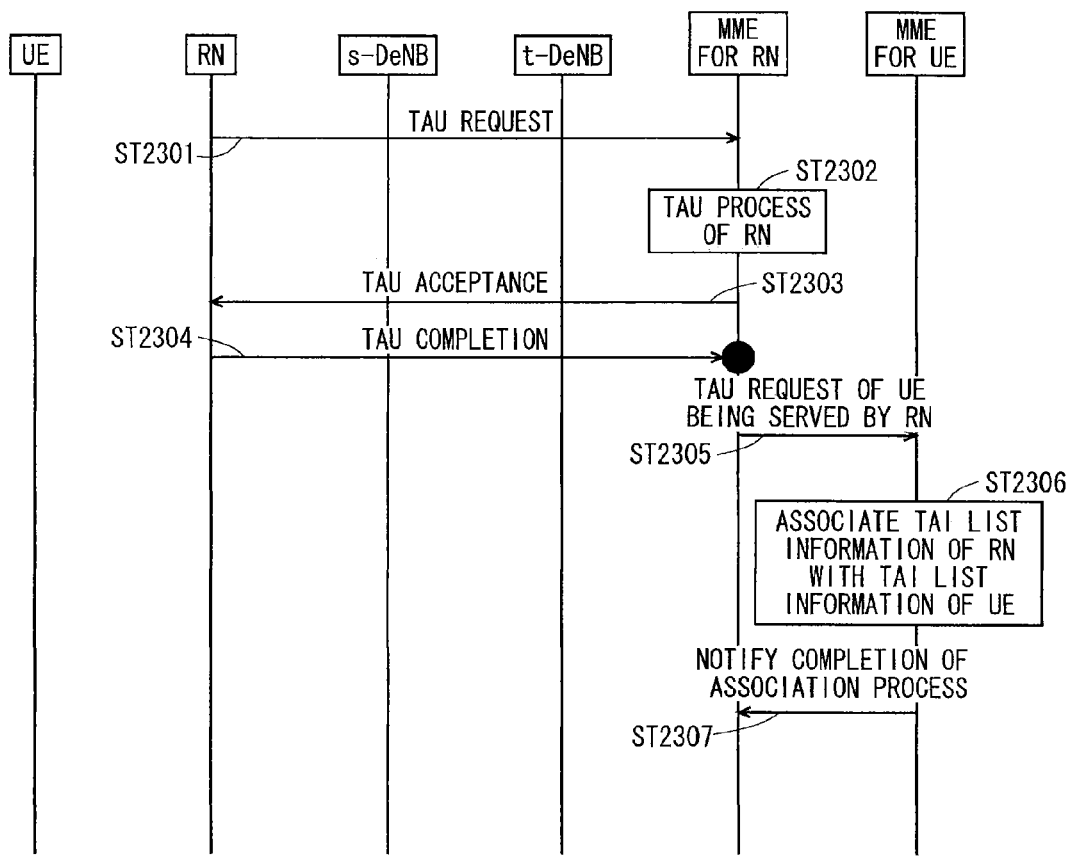
FIG. 23 is a diagram showing a sequence of notifying the information regarding a TA of a UE when triggered by a TAU process performed during the HO process by the RN.

FIG. 23 is a diagram showing a sequence of notifying the information regarding a TA of a UE, which is triggered by a TAU process performed during the HO process of the RN. FIG. 23 shows the case of intra-MME HO.

In the TAU process performed during the HO process by the RN, for example, in the process of Step ST2207 shown in FIG. 22, first, in Step ST2301, the RN transmits a TAU request signal to the MME for RN via the target DeNB. The TAU process of the RN in Step ST2207 is performed in a case where the TAI list of the RN does not include the TAI of the target DeNB, as described above. The fact that the TAI list of the RN does not include the TAI of the target DeNB means that the TA to which the eNB to be connected with the RN belongs has been changed. In other words, when judging that the TA to which the eNB to be connected with the own RN belongs has been changed, the RN transmits, to the MME for RN, a TAU request signal for updating the TA to which the own RN belongs.

In Step ST2302, the MME for RN performs the TAU process of the RN. Specifically, the MME for RN changes the TAI belongings to the TAI list, as the TAU process of the RN.

In Step ST2303, the MME for RN transmits a TAU acceptance signal to the RN via the target DeNB.

In Step ST2304, the RN transmits a TAU completion signal to the MME for RN via the target DeNB.

In Step ST2301 or ST2304, the RN transmits the identity of the UE being served by the RN together with the TAU request signal to be transmitted to the MME for RN. The identity of this UE may be an identity of a UE during communication. Further, the identity of this RN may be transmitted together.

In Step ST2305, triggered by the receipt of the TAU completion signal from the RN, the MME for RN transmits a TAU request signal of the UE being served by the RN to the MME for UE.

The MME for RN transmits the TAI list information after the TAU process of the RN, together with the TAU request signal. The identity of the UE being served by the RN may be transmitted together. The UE identity may be an identity of a UE during communication. Further, the identity of the RN may be transmitted. These may be transmitted to the MME for UE as another signal, not being included in the TAU request signal.

In Step ST2306, the MME for UE, which has received the TAU request signal of the UE being served by the RN in Step ST2305, associates the TAI list information of the RN with the TAI list information of the UE with the use of the identity of the UE being served by the RN that has been received together, and the TAI list information of the RN.

For example, the identity of the RN, which has moved from the coverage of the DeNB in the TAI#11 to the coverage of the DeNB in the TAI#12, is #0. Through the TAU process of RN#0, the TAI#12 is newly added to the TAI list. The TAI list after the TAU process is described below.

TAI list_RN#0={TAI#11,TAI#12}={DeNB#0, DeNB#1,DeNB#2,DeNB#3}

Here, the DeNB#0 and DeNB#1 belong to the TAI#11. The DeNB#2 and DeNB#3 belong to the TAI#12.

The TAI list (TAI list_UE) of the UE includes the TAI of the RN#0, and thus, the following is shown when this TAI is TAI#13. The RN#0, RN#1, and RN#2 belong to TAI#13.

TAI list_UE={TAI#13}={RN#0,RN#1,RN#2}

In Step ST2306, the MME for UE associates the TAI list information of the RN with the TAI list information of the UE. For example, the RN#0 is replaced with a DeNB identity in the TAI list_RN#0 as follows.

FIG. 24 is a diagram showing a mapping table after the process of associating the TAI list information of the RN with the TAI list information of the UE in the MME for UE. The DeNB#0, DeNB#1, DeNB#2, DeNB#3, RN#1, and RN#2 belong to the TAI#13.

Thus, the TAI list of the UE (TAI list_UE) is associated as follows.

TAI list_UE={TAI#13}={RN#0,RN#1,
RN#2}={DeNB#0,DeNB#1,DeNB#2,DeNB#3,
RN#1,RN#2}

Through the association of the TAI list information of the RN and the TAI list information of the UE as described above, a DeNB that belongs to the TAI of the RN after moving is added to the mapping table of the RNs, eNBs, or DeNBs belonging to the TAI list of the UE. The TAI list of UE is not changed, but the RN, eNB, or DeNB belonging to the TAI list of the UE is changed. In this manner, the MME for UE performs the process of updating a TA to which a UE belongs.

Thus, the MME for UE can recognize to which DeNB the RN to be connected with the UE is connected. This enables the MME for UE to perform mobility management of the UE being served by an RN, allowing for communication between the UE and core network.

Returning to FIG. 23, in Step ST2307, the MME for UE notifies the MME for RN of the completion of the process of associating the TAI list information of the RN and the TAI list information of the UE.

As described above, as to the MMES including the MME for RN and the MME for UE, the MME for RN receives the TAU request signal from the RN, whereby the MME for RN performs the TAU process of the RN and the MME for UE performs the TAU process of the UE. This allows for the mobility management of the RN and the UE being served by the RN even if the RN moves, allowing for communication between the UE and core network.

While the example above has described the case in which a TAI is added, the same holds true for a case in which a TAI is deleted or changed.

While the example above has disclosed that the RN notifies the MME for UE of the identity of the UE being served thereby in Step ST2305 of FIG. 23, not limited thereto. Alternatively, the MME for UE may derive the identity of the UE being served by this RN from the information regarding the RN received in Step ST2305.

Next, description is given of the method in which an ongoing call from a UE or an incoming call for a UE is used as a trigger.

Figure 25:
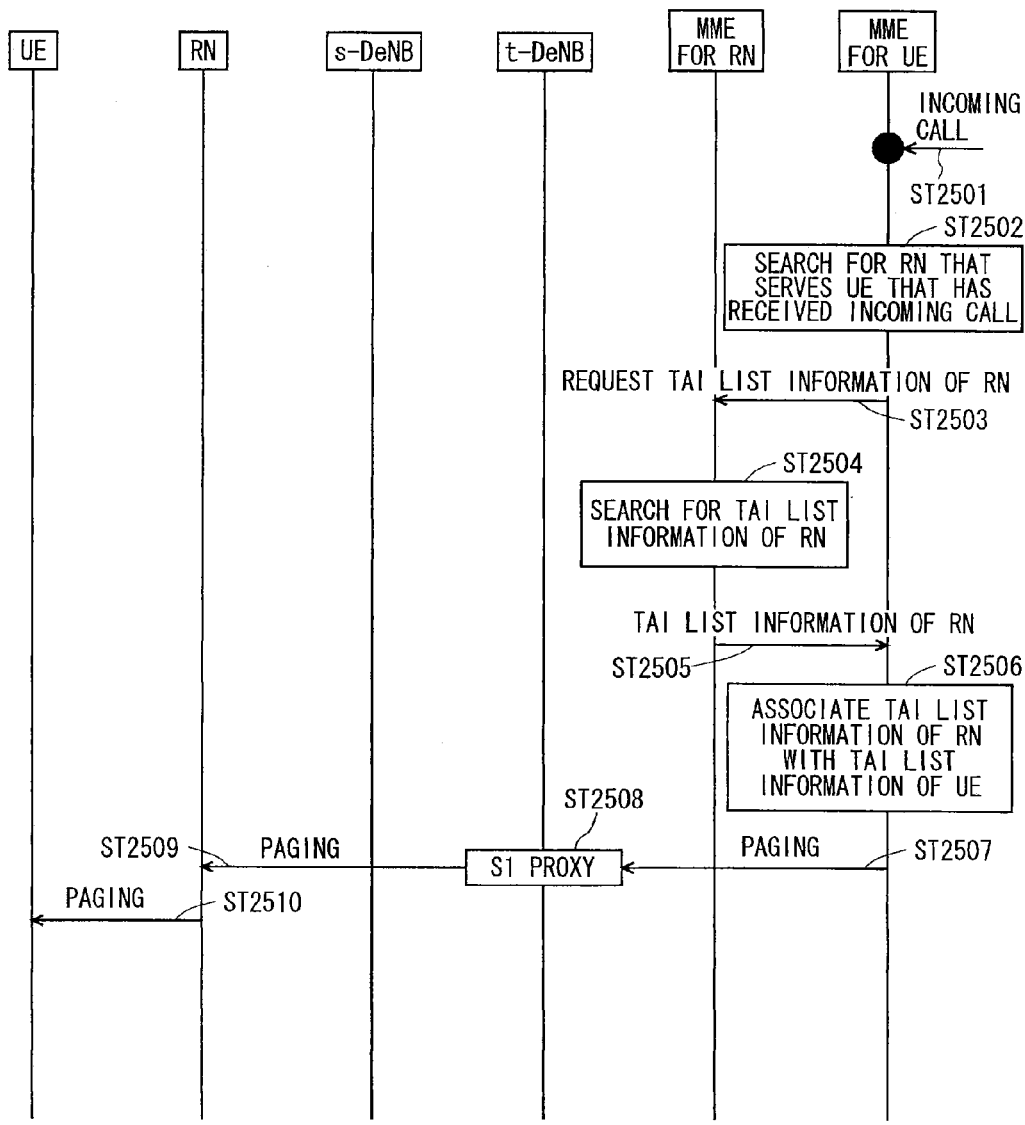
FIG. 25 is a diagram showing a sequence of notifying the information regarding a TA of a UE when triggered by an incoming call for a UE.

FIG. 25 is a diagram showing a sequence of notifying the information regarding a TA of a UE in the case where an incoming call for a UE is used as a trigger. In the case of the incoming call for the UE, an incoming call signal to be notified the MME for UE is used as a trigger.

When an incoming call is made for the UE, in Step ST2501, the MME for UE receives an incoming call signal.

Upon receipt of the incoming call signal, in Step ST2502, the MME for UE searches for the TAI in a TAI list (TAI list_UE) of the UE that has received the incoming call, and obtains an RN identity in the TAI.

Next, in Step ST2503, the MME for UE transmits, to the MME for RN, a signal for requesting the TAI list information of the RN having the RN identity.

In Step ST2504, the MME for RN searches for the TAI in the TAI list (TAI list_RN) of the RN having the RN identity, and obtains an eNB identity in the TAI.

In Step ST2505, the MME for RN notifies the MME for UE of the TAI list information of the RN. In this case, an eNB identity is included in the TAI list information.

In Step ST2506, the MME for UE associates the TAI list information of the RN with the TAI list information of the UE. The process of Step ST2506 is identical to the process of Step ST2306 shown in FIG. 23, which is not described here.

Through the processes above, the MME for UE can recognize to which DeNB the RN to be connected with the UE is connected and thus can perform the mobility management of the UE being served by the RN. This allows for communication between the UE and core network.

In Steps ST2507 and ST2509, the MME for UE transmits a paging message to the RN, eNB, and DeNB that belong to the TAI in the TAI list of the UE.

In Step ST2508, the DeNB proxies the paging message for the RN being served thereby through the S1 proxy functionality. In Step ST2510, the RN that has received this paging message transmits the paging message to the UE. This allows for communication between the UE and core network.

In the case of an ongoing call from the UE, in Step ST2501, a service request made by the ongoing call is transmitted from the UE to the MME for UE. The processes of Steps ST2502 to ST2506 are performed as in the case of an incoming call for a UE. Through the processes above, the MME for UE can recognize to which DeNB an RN to be connected with a UE is connected and thus can perform mobility management of the UE being served by the RN. This allows for communication between the UE and core network.

The method disclosed in this embodiment can solve a problem that a large number of UEs being served by a moving RN simultaneously generate the TAU and also allows for communication between the UEs being served by the moving RN and the core network even if the UEs do not perform the mobility process.

First Modification of Second Embodiment

The second embodiment above has disclosed the method in which with a TAI of an RN being fixed, the information regarding the TA is transmitted and received between the MME for UE and the MME for RN. This modification discloses the method of transmitting and receiving the information regarding a UE between a target MME and a source MME.

In this modification, in a case where an RN has performed the TAU, the information regarding the UE being served by the RN is transmitted and received between a source MME and a target MME. The information regarding the UE being served by the RN may be transmitted and received between a source MME and a target MME in the HO of the RN. The method disclosed in this modification may be applied to a case in which an RN has performed inter-MME HO.

As described above, an MME that manages a TAI of an RN characterized in "moving" has not been discussed in 3GPP.

This modification discloses an MME in a case where an RN performs inter-MME HO.

The TA for mobile RN belongs to an MME that manages a DeNB. In other words, an MME that manages a DeNB manages a TAI for mobile RN.

Through the above, even if a mobile RN moves to a different MME, a target MME can manage the mobile RN.

While the architecture involving the RN in this case may be identical to that of FIG. 13, the MME for UE is provided with a function of managing a TA to which a mobile RN belongs. Also, the MME for RN is provided with a function of managing a TAI list of a mobile RN.

Specifically, the TA managed by the MME for UE can be dynamically updated, for example, added or deleted. This allows the MME to add the TAI of the RN that has moved to a DeNB to be connected with the own MME such that the TAI is managed by the own MME. Meanwhile, the MME can delete the TAI of the RN that has moved from the DeNB connected to the own MME from the management by the own MME.

The method disclosed here allows different MMEs to manage the same TAI. The TAI of the mobile RN and the TAIs of the eNB and DeNB may be included in the same TAI list or may be included in different TAI lists. The UE being served by the mobile RN attaches to the MME to which the mobile RN has attached.

In a case where an RN has moved and performed inter-MME HO, the HO process and TAU process of the RN are required. The UE being served by this RN does not need the HO process but needs the TAU process.

In a case where a UE being served by this RN moves between the eNB and RN or between the DeNB and RN, the TAIs of the eNB and DeNB and the TAI of the mobile RN are prohibited from being included in the same TAI list, so that the UE activates the TAU process. Meanwhile, those TAIs are allowed to be included in the same TAI list, whereby the UE being served by the RN does not need to perform the TAU process.

The method disclosed here is also applicable to the first embodiment described above. It suffices that the MME to be connected with the target DeNB for the RN manages the TAI of this RN.

In a case where the RN has performed inter-MME HO, the RN activates the HO process shown in FIG. 22, and accordingly, the HO process is performed among the RN, DeNB, and MME. The TAU process is also performed in a case where the TAI of the DeNB is changed as a result of moving. In the case of the inter-MME HO, the MME that manages the TA is changed, whereby the TAI of the DeNB is changed and the TAU process is performed.

However, a UE being served by the RN continuously communicates with the RN and thus does not recognize that it has actually moved. Accordingly, the HO process is not activated in the UE being served by the RN. The TAU is also not activated, and accordingly, the UE does not transmit the TAU request message to the MME via the RN. As a result, the target MME does not transmit, to the source MME, a message for requesting the information regarding the UE, for example, a UE context request message. The target MME cannot recognize the UE being served by the RN that has moved and thus cannot manage this UE. Also, the source MME cannot recognize the UE being served by the RN that has moved and thus cannot manage this UE.

In order to solve this problem, in a case where an RN has performed inter-MME HO, the information regarding a UE being served by the RN is transmitted and received between the source MME and target MME.

The process of transmitting and receiving the information regarding a UE being served by the RN between the source MME and target MME may be performed during or following the TAU process of the RN. Alternatively, the above-mentioned process may be performed during or following the HO process of the RN.

In order to transmit and receive the information regarding a UE being served by the RN between the source MME and target MME, the TAU process of this UE may be activated. The information regarding a UE being served by the RN may be an identity of a UE during communication.

The following three methods are disclosed as specific examples of the method of activating the TAU process of a UE being served by an RN that has moved. In the methods below, a predetermined signal is used as a trigger for activating the TAU process of a UE being served by an RN that has moved. For example, the predetermined signal includes a message such as a TAU request message or a TAU completion message.

(1) The target MME activates the TAU process of a UE being served by an RN, triggered by the receipt of a TAU request message from the RN.

(2) The target MME activates the TAU process of a UE being served by an RN, triggered by the receipt of a TAU completion message from the RN.

(3) The target MME activates the TAU process of a UE being served by an RN, triggered by the detection of a HO completion of the RN.

The specific example (1) above is suitable for a case in which a related node has high capacity enough to simultaneously perform the TAU process of an RN and the TAU process of a UE being served by the RN. The TAU process of the RN and the TAU process of the UE being served by the RN are performed simultaneously, resulting in a reduction in process delay.

The specific example (2) is suitable for a case in which a related node cannot simultaneously perform the TAU process of an RN and the TAU process of a UE being served by the RN. The specific example (2) is also applicable to a case in which the related node has low processing capability.

The specific example (3) is also applicable to a case in which a related node has low processing capability because the TAU process of a UE being served by an RN is performed after the completion of the HO process by the RN, which further reduces malfunctions.

Disclosed below is a specific example of the method of transmitting and receiving the information regarding a UE being served by an RN between the source MME and target MME in the HO process and TAU process by the RN.

Figure 26:
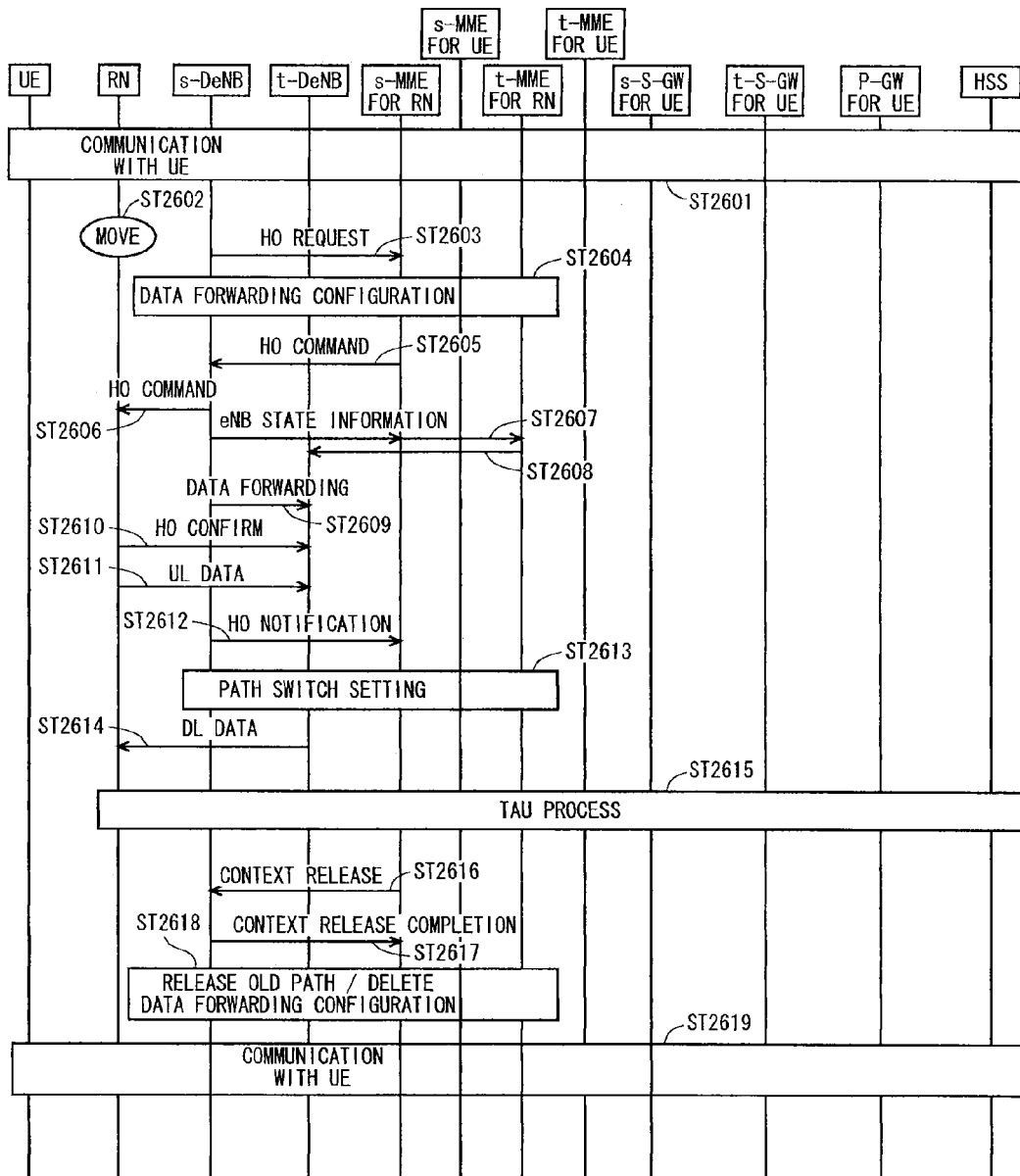
FIG. 26 is a diagram showing a sequence of a HO process and a TAU process in a case where an RN performs inter-MME HO.

FIG. 26 is a diagram showing a sequence of the HO process and TAU process in a case where an RN performs inter-MME HO. Described below is a case in which the TAU process of a UE being served by a mobile RN is activated, triggered by the receipt of a TAU request message from the RN by the target MME.

In Step ST2601, communications are performed between a UE being served by an RN and an RN, source DeNB (s-DeNB), source MME for UE (s-MME for UE) being a source MME for UE, source S-GW for UE (s-S-GW for UE) being a source S-GW for UE, P-GW for UE, and HSS.

In Step ST2602, the RN moves. As a result, the communication quality between the RN and DeNB deteriorates.

In Step ST2603, the source DeNB receives a measurement result report made by the RN to determine a target DeNB, and then transmits a HO request signal of the RN to an s-MME for RN being a source MME for RN.

In Step ST2604, the source MME for RN that has received the HO request signal in Step ST2603 configures data forwarding among the source DeNB, target DeNB (t-DeNB), source MME for RN, and t-MME for RN being a target MME for RN.

In Step ST2605, the source MME for RN transmits a HO command signal to the source DeNB. Then, in Step ST2606, the source DeNB transmits the HO command signal to the RN.

In Steps ST2607 and ST2608, the source DeNB transmits DeNB state information to the target DeNB via the source MME for RN and the target MME for RN.

In Step ST2609, the source DeNB performs data forwarding to the target DeNB.

In Step ST2610, the RN transmits a HO confirm signal to the target DeNB. In Step ST2611, then, the RN starts the transmission of UL data to the target DeNB.

In Step ST2612, the source DeNB transmits a HO notification signal to the source MME for RN.

In Step ST2613, path switch setting is performed among the source DeNB, target DeNB, source MME for RN, and target MME for RN.

In Step ST2614, the target DeNB starts the transmission of DL data to the RN.

In Step ST2615, the RN activates a TAU request process, and the TAU process is performed among the RN, source DeNB, target DeNB, source MME for RN, target MME for RN, and HSS. At this time, the information regarding a UE being served by an RN is transmitted and received between an s-MME for RN being the source MME for RN and a t-MME for RN being the target MME for RN.

After the TAU process of Step ST2615, in Step ST2616, the source MME for RN transmits a context release signal to the source DeNB. The source DeNB that has received the context release signal releases a context and, in Step ST2617, transmits a context release completion signal to the source MME for RN.

In Step ST2618, data forwarding configuration is deleted among the source MME for RN, source DeNB, target MME for RN, and target DeNB.

In Step ST2619, communications are performed between the UE being served by the RN and the RN, target DeNB, t-MME for UE being a target MME for UE, t-S-GW for UE being a target S-GW for UE, P-GW for UE, and HSS.

The TAU processing method of a UE being served by an RN is disclosed. FIG. 27 is a diagram showing a sequence in a case where the TAU process of a UE being served by an RN is activated, triggered by the receipt of a TAU request message from the RN by a target MME. Each process in the sequence shown in FIG. 27 is performed in Step ST2615 of FIG. 26.

In inter-MME HO, the TAI of the target DeNB is not included in the TAI list of the RN. Thus, in Step ST2701, the RN activates the TAU request process and transmits a TAU request signal to the target MME for RN (t-MME for RA). The RN transmits an identity of a UE being served by the RN together with a TAU request signal to the target MME for RN. Further, an identity of the RN may be transmitted together.

In Step ST2702, the target MME for RN activates a TAU process of a UE being served by the RN, triggered by the receipt of the TAU request signal from the RN in Step ST2701.

In Step ST2703, the target MME for RN transmits the TAU request signal of the UE being served by the RN to the target MME for UE (t-MME for UE). The target MME for RN transmits an identity of the UE being by the RN together with the TAU request signal to the target MME for UE. The identity of the UE being served by the RN may be transmitted to the target MME for UE as another signal, not being included in the TAU request signal. Alternatively, an identity of the RN may be transmitted together. The target MME for UE that has received the TAU request signal of the UE being served by the RN in Step ST2703 activates the TAU process of the UE that is represented by the identity of the UE being served by the RN, which has been received together.

In Step ST2704, the target MME for RN transmits a context request signal to the source MME for RN (s-MME for RN). In Step ST2705, the target MME for UE transmits the context request signal of the UE to the source MME for UE (s-MME for UE).

In Step ST2706, the source MME for RN transmits a context response signal to the target MME for RN. In Step ST2707, the source MME for UE transmits a UE context response signal to the target MME for UE.

In Step ST2708, the target MME for RN transmits, to the source MME for RN, a context Ack signal indicating that the context response signal transmitted from the source MME for RN in Step ST2706 has been successfully accepted. In Step ST2709, the target MME for UE transmits, to the source MME for UE, a UE context Ack signal indicating that the UE context response signal transmitted from the source MME for UE in Step ST2707 has been successfully accepted.

In Step ST2710, the target MME for RN transmits, to the HSS, a location update request signal for requesting location update of the RN. In Step ST2711, the target MME for UE transmits, to the HSS, a UE location update request signal for requesting location update of the UE.

In Step ST2712, the HSS transmits, to the source MME for RN, a location cancellation request signal for requesting a cancellation of the RN location. In Step ST2713, the HSS transmits, to the source MME for UE, a UE location cancellation request signal for requesting a cancellation of the UE location.

The source MME for RN that has received the location cancellation request signal of the RN in Step ST2712 cancels the location of the RN. In Step ST2714, then, the source MME for RN transmits, to the HSS, a location cancellation Ack signal indicating that the location of the RN has been successfully canceled.

The source MME for UE that has received the UE location cancellation request signal in Step ST2713 cancels the location of the UE. In Step ST2715, then, the source MME for UE transmits, to the HSS, a UE location cancellation Ack signal indicating that the location of the UE has been successfully canceled.

In Step ST2716, the HSS transmits, to the target MME for RN, a location update Ack signal indicating that the location has been updated. In Step ST2717, the HSS transmits, to the target MME for UE, a UE location update Ack signal indicating that the location of the UE has been updated.

In Step ST2718, the target MME for RN transmits a TAU acceptance signal to the RN. In Step ST2719, the target MME for UE transmits the TAU acceptance signal of the UE to the UE being served by the RN.

In Step ST2720, the RN transmits a TAU completion signal to the target MME for RN. Consequently, the TAU processes by the RN have been completed in order.

In Step ST2721, the UE being served by the RN transmits the TAU completion signal of the UE to the target MME for UE. In Step ST2722, the target MME for UE transmits, to the target MME for RN, the TAU completion signal of the UE indicating that the TAU process of the UE being served by the RN has been completed. As a result, the TAU process by the UE has been completed in order.

In a case where there is no information to be transmitted to the UE and in a case where there is no change in the information of the TAU acceptance signal, the process of transmitting the TAU acceptance signal to the UE in Step ST2719 and the process of transmitting the TAU completion signal from the UE in Step ST2721 may be omitted. In other words, in the case where there is no information to be transmitted to the UE and in the case where there is no change in the information of the TAU acceptance signal, the TAU acceptance message to the UE to be notified by the TAU acceptance signal in Step ST2719 and the TAU completion message from the UE notified by the TAU completion signal in Step ST2721 may be omitted.

In that case, the target MME for UE receives the location update Ack signal in Step ST2717 and then, in Step ST2722, transmits the TAU completion signal of the UE being served by the RN to the target MME for RN.

Through the above, the TAU process of the UE being served by the RN can be performed in association with the TAU process of the RN that is activated after moving of the RN. The TAU process of the UE being served by the RN is performed if the UE being served by the RN does not activate the TAU process. As a result, the source MME and target MME can recognize that the UE being served by the RN has moved and can perform mobility management. Also, the target MME can configure and manage the TAI list of the UE, allowing for communication between the UE and core network.

In the specific example disclosed in FIG. 27, the TAU process of the RN and the TAU process of the UE are performed simultaneously, triggered by the receipt of the TAU request signal from the RN by the target MME for RN in Step ST2701. This can reduce a period of time up to the end of the TAU processes by the RN and the UE being served by the RN, resulting in a reduction in process delay as a system.

The TAU request signal to be transmitted from the RN to the target MME for RN in Step ST2701 may include the information indicating whether or not to transmit and receive the information regarding the UE being served by the RN between the source MME and target MME. The information indicating whether or not to perform transmission and reception may be, for example, the information indicating whether or not to perform the TAU process of the UE. A parameter indicative of the above-mentioned information may be newly provided to be included in the request signal. This enables the RN to request the MME to perform the TAU process of the UE being served thereby.

As disclosed in this modification, the transmission and reception of the information regarding a UE being served by an RN are performed between the source MME and target MME, which enables the source and target MMEs to both perform the mobility management of the UE. As a result, the target MME can configure and manage the TAI list of the UE, allowing for communication between the UE and core network.

The UE being served by the RN does not need to transmit a TAU request signal by the method disclosed in this modification. This can solve a problem that when the RN moves so as to straddle TAs, UEs being served by this RN simultaneously generate a TAU request signal. Accordingly, signaling load can be reduced.

For the UEs being served by the RN that has moved, the information regarding the UEs may be transmitted and received per UE between the source MME and target MME, or the information regarding the UEs belonging to a predetermined group or all the UEs may be transmitted and received together therebetween.

The information dedicated to a UE and the information common to UEs may be differentiated so as to be transmitted and received by being included in a signal as one information element or as one parameter for the information common to UEs. This results in a reduction in signaling among between the MMES or between the HSS and the MME.

In a case where the TAU process of a UE being served by an RN is performed during the HO process being performed by the RN, the HO process of this RN is desirably performed continuously if the TAU process of the UE fails. Alternatively, the HO process may be completed.

In this case, the TAU process of the UE may be performed again. The number of times the TAU process is repeated may be limited. Alternatively, a time limit may be set for allowing the UE to perform the TAU process such that the TAU process can be performed again within the time limit. After the time limit has passed, it may be prohibited to perform the TAU process again such that the prohibited UE is notified that the TAU process has failed.

The UE that has been notified that the TAU process has failed may disconnect the communication with the RN to perform a cell reselection process. Alternatively, the UE activates the TAU process by itself and transmit a TAU request signal to the target MME via the RN. In other words, the UE performs a normal TAU process. This allows the UE to perform the process to be performed in a case where a normal TAU process fails, even if it fails again in connection with the target MME. This enables the UE to select other cell such as an eNB, DeNB, or RN, allowing for communication via the selected cell.

Disclosed below is a method in which a target MME notifies a UE via an RN. It suffices that UEs are notified individually, UEs belonging to a predetermined group are notified, or all UEs are notified together. Alternatively, the information regarding UEs belonging to a predetermined group may be notified together or the information regarding all the UEs may be notified together from the target MME to the RN, and the information may be notified individually from the RN to the UE. The information dedicated to a UE and the information common to UEs may be differentiated such that the information common to UEs is notified as one information element or one parameter.

As the means for notifying a UE by a target MME via an RN, a NAS message or paging message may be used. In a case where the paging message is used, communication is allowed if the UE in the RRC_Connected state or RRC_Idle state.

An S1 message may be used as the means for notifying an RN by a target MME, and RRC signaling or MAC signaling may be used as the means for notifying the UE from the RN. This allows for dedicated notification to a UE in the RRC_Connected state. Notification may be made in the system information as another method of notifying a UE from an RN. This allows for notification to a UE in the RRC_Idle state.

A parameter indicative of the information indicating that the TAU process of the UE has failed may be provided on the information of at least one of the NAS message, S1 signaling, RRC signaling, MAC signaling, system information, and paging message to be notified. This parameter may be represented as one bit so as to indicate that, for example, the TAU process has failed in a case of "1".

In some cases, a UE being served by an RN is restricted from accessing the target MME. In a case where access is restricted, the UE fails to recognize that it cannot access the target MME, and continues connection with the RN. As a result, the UE still cannot communicate with a network.

The method of solving this problem is disclosed. In a case where an RN has moved, the target MME restricts access of a UE being served by the RN. A target MME for UE may be used as the target MME. The target MME judges whether or not access it allowed due to access restriction per UE. In a case where access is allowed, the information regarding a UE being served by the RN is transmitted and received between the source MME and target MME, which has been disclosed in this modification. In a case where access is not allowed, the target MME notifies the UE being served by the RN that access is not allowed or access is prohibited.

The method described above may be applied as the operation of the UE notified that the TAU process has failed. The method described above may also be applied as the method of notifying a UE from an RN. This enables, also in a case where the UE being served by the RN that has moved is restricted from accessing a target MME, the UE to select other cell such as eNB, DeNB, or RN, allowing for communication via the selected cell such as eNB, DeNB, or RN.

It has been disclosed in FIG. 27 that in the case where there is no information to be transmitted to a UE being served by an RN from a target MME or in the case where there is no change in the information to be transmitted by a TAU acceptance signal, the TAU acceptance message to be notified the UE from the target MME for UE may be omitted in Step ST2719. Specific examples in a case where omission is allowed are disclosed below.

The above-mentioned specific examples include a case in which a TAI of an RN remains unchanged as a result of moving and the TAI can be managed by the target MME and a case in which a UE does not need to change a globally unique temporary identity (GUTI) and an evolved packet system (EPS) bearer.

In the case where there is no change in the TAI in the TAI list of the UE, the TAU acceptance message may be omitted. For example, a TAI of an RN remains unchanged if the RN moves and a TAI list of a UE being served by the RN includes only the TAI of the RN. This allows for omission of the TAI list of the UE.

Even if an RN moves between different MMEs, a GUTI to be allocated to a UE being served by an RN by a target MME is made identical to a GUTI allocated to a source MME. This allows for omission of the GUTI. A target EPS bearer is made identical to a source EPS bearer, which allows for omission of the EPS bearer information.

As a result of the omission of the TAU acceptance message to be notified the UE from the target MME, the UE is not related to the sequence in this modification. This allows the TAU process of the UE to be performed in the core network, resulting in a reduction in control delay, simplification in control, and reduction in signaling load.

Meanwhile, cases in which a target MME notifies a UE of a TAU acceptance message are disclosed, which include (a) a case in which the information regarding security is notified between a target MME and a UE, (b) a case in which a TAI of an RN cannot be managed also by a target MME, and (c) a case in which a TAI included in a source TAI list cannot be managed by a target MME. In the cases (a) to (c), the target MME may notify the UE of the information (herein-after, also referred to as "updated information") updated by the target MME in a TAU acceptance message.

A method similar to the above-mentioned method of notifying the information indicating that a TAU process has failed is applicable as the method of notifying a UE of the updated information from a target MME.

For only the GUTI provided as the updated information, "GUTI reallocation command" of the NAS message may be notified.

During the HO process being performed by the mobile RN, if the RN is in the RRC_Connected state with a UE being served thereby, communication between the UE and a core network is not allowed. This case causes a problem that the UE does not recognize that it is not allowed communication and keeps transmitting data to the RN.

The method of solving this problem is disclosed below. An adjustment is made through scheduling by the RN. It suffices that during the HO process being performed by the RN, scheduling is not made in DL as well as UL. The following three are disclosed as specific examples of the trigger for interrupting scheduling.

(1) The transmission of a measurement report to a DeNB from an RN is used as a trigger. It suffices that the interruption of scheduling is kept until the measurement report is not transmitted any more.

(2) The reception of a HO command by an RN from a DeNB is used as a trigger. The interruption of scheduling may continue until the RN transmits a HO confirm to a DeNB.

(3) The radio link failure (RLF) of the RN with the DeNB is used as a trigger. The interruption of scheduling may continue until the mobile RN returns to the RRC_Connected state.

The data subjected to scheduling and the data subjected to HARQ may be continuously communicated between the RN and the UE being served thereby, and the UL data may be held by the RN through buffering. The data may be transmitted to the core network side after the completion of the HO process by the RN.

In order to prevent the communication with a UE being served by an RN, a communication hold command may be provided such that the RN notifies the UE being served thereby of the communication hold command. The UE that has received the communication hold command does not communicate with the RN.

Through the above, during the HO process being performed by the RN, the buffer of the RN can be prevented from overflowing or the data can be prevented from being discarded due to the data from the UE being served by the RN. Also, the UE being served by the RN does not need to receive the PDCCH per subframe. This allows for a reduction in power consumption of the UE.

The method disclosed in this modification allows for the TAU process of the UE being served by an RN during the HO process being performed by the RN. However, the HO process of the UE being served by the RN is not performed, and accordingly, data forwarding that is performed in the normal HO process is not performed.

The data forwarding method is disclosed here. In X2 HO, data forwarding is performed between base stations. It suffices that even in a case where an RN performs X2 HO, the UE being served by the RN performs data forwarding within the RN that serves this UE. In other words, data forwarding outside of the RN becomes unnecessary.

In S1 HO, data forwarding is performed between base stations and between S-GWs. In the following description, the data forwarding performed between base stations is referred to as "direct forwarding" and the data forwarding performed between S-GWs is referred to as "indirect data forwarding".

The direct forwarding between base stations may be performed by the same method as that of the X2 HO described above. The source S-GW or source P-GW may activate the HO process of the UE to perform indirect forwarding to the target S-GW or target P-GW. The data forwarding configuration of the UE may be activated to perform only the indirect forwarding process. Alternatively, the indirect forwarding may be prohibited to perform only the direct forwarding.

The method of performing a data forwarding process of a UE is disclosed. The data forwarding process of the UE may be performed during the HO process of the RN. A specific example of the data forwarding process of the UE is described below.

FIG. 28 is a diagram showing a sequence of activating the data forwarding process of the UE. The data forwarding process of the UE being served by the RN may be started, triggered by the receipt of the HO request signal of the RN by the source MME from the source DeNB.

The data forwarding process of the UE is performed between the HO process and TAU process of the RN shown in FIG. 26. In Step ST2603 of FIG. 26, the source DeNB (s-DeNB) transmits the HO request signal of the RN to the source MME for RN (s-MME for RN).

In Step ST2801, the source MME for RN transmits a data forwarding request signal of the UE being served thereby to the source MME for UE (s-MME for UE), triggered by the receipt of the HO request signal from the source DeNB. A signal for requesting indirect forwarding may be transmitted in place of the data forwarding request signal.

In Step ST2802, the data forwarding configuration of the UE is performed among the RN, source MME for UE, target MME for UE (t-MME for UE), source S-GW for UE (s-S-GW for UE), and target S-GW for UE (t-S-GW for UE).

In Step ST2803, the source MME for UE transmits, to the RN, a data forwarding instruction signal for instructing UE data forwarding.

In Step ST2804, the RN performs the UE data forwarding to the target S-GW for UE via the source S-GW for UE. In Step ST2805, the target S-GW for UE performs the UE data forwarding to the RN. It suffices that through the data forwardings in Steps ST2804 and ST2805, the data of the UE located in the source S-GW for UE is forwarded to the RN via the target S-GW for UE. As a result, the UE data held in the source S-GW for UE is also forwarded to the RN.

In Step ST2806, the data forwarding configuration of the UE is deleted among the RN, source MME for UE, target MME for UE, source S-GW for UE, and target S-GW for UE. The data forwarding process of the UE may be performed simultaneously with the HO process and TAU process of the RN.

In activating the HO process of the UE, the source MME for RN transmits a signal for activating the HO process of the UE being served by the RN to the source MME for RN, triggered by the receipt of the HO request signal of the RN from the source DeNB by the source MME for RN. The source MME for UE may receive the signal for activating the HO process of the UE being served by the RN to perform the HO process of the UE being served by the RN.

The method in which a UE being served by an RN does not need to perform the data forwarding is disclosed. Upon activation of the HO process of the RN, the RN interrupts scheduling to the UE being served thereby. This does not require the data transmission and reception between the RN and a UE being served by this RN, whereby data forwarding of the UE becomes unnecessary. The method described above may be used as the method in which scheduling to a UE being served by the RN is interrupted during the HO process being performed by the RN. In a case where the data forwarding of the UE is necessary, the method described above may be used for, for example, VoIP.

The method disclosed in this modification allows the target MME and source MME to recognize a UE being served by the RN and configure and manage the TAI list of the UE. This allows for communication between the UE and core network.

In a case where the HO process of the UE being served by an RN is performed during the HO process being performed by the RN, the HO process of the RN is preferably continued if the HO process of the UE has failed. Alternatively, the HO process is preferably completed.

In this case, it suffices that the HO process of the UE is performed again. The number of times the HO process is repeated may be limited. Or, a time limit may be set for allowing the UE to perform the HO process such that the UE can perform the HO process again within the time limit. After the time limit has passed, the UE may be prohibited from performing the HO process again such that the prohibited UE is notified that the HO process has failed.

The UE notified that the HO process has failed may disconnect the communication with the RN to perform a cell reselection process. Alternatively, the UE may perform a HO failure process. This allows for the process performed in a case where a normal HO process has failed. This enables the UE to select other cell such as an eNB, DeNB, or RN, allowing for communication via the selected cell.

Third Embodiment

In order to solve a problem that an MME cannot recognize and manage a UE being served by an RN that has moved and accordingly the communication between the UE and a network is not allowed, the method disclosed in the first embodiment and the method disclosed in the second embodiment may be combined.

Specifically, in a case where the RN has performed intra-MME HO, the method disclosed in the second embodiment is applied such that the TAI of the RN is fixed and, only in a case where the RN has performed inter-MME HO, the method disclosed in the first embodiment is applied such that the TAI of the RN is made identical to the TAI of the target DeNB.

In other words, the method disclosed in the second embodiment is applied when it is judged that the RN has performed intra-MME HO, that is, it is judged that the TA to which an eNB to be connected with the RN belongs has been changed and when it is judged that no change has been made to the MME that manages the TA to which an eNB to be connected with the RN belongs. The method disclosed in the first embodiment is applied when it is judged that an RN has performed inter-MME HO, that is, it is judged that the TA to which an eNB to be connected with the RN belongs has been changed and when it is judged that a change has been made to the MME that manages the TA to which the eNB to be connected with the RN belongs.

The fixed TAI may be a predetermined TAI managed by the MME to be connected with the DeNB that serves the RN. The predetermined TAI may be the TAI to which the P-DeNB belongs.

In a case where the RN has performed inter-MME HO, the RN needs to make the TAI of the own RN identical to the TAI of the target DeNB. The following two are disclosed as the method of judging whether the RN has performed intra-MME HO or inter-MME HO per se.

(1) The RN judges based on the identity indicating whether or not HO is inter-MME HO notified from the MME.

(2) The RN judges based on the GUTI notified from the target MME when it performs HO.

In the method (1) above, the MME may be a source MME or target MME. The identity indicating whether or not HO is inter-MME HO is provided, and the MME notifies the RN that performs the HO process of this identity.

A specific example in which a source MME notifies an RN of the identity is disclosed. In a case where the RN has moved and HO has been activated, the source MME notifies the RN of a HO command via the source DeNB. This HO command may include the identity indicating whether or not HO is inter-MME HO. Alternatively, a signal including the identity indicating whether or not HO is inter-MME HO may be notified separately.

A specific example in which a target MME notifies an RN of the identity is disclosed. In a case where the RN has moved and HO between different MMEs has been activated, the TAU process of the RN is performed. In the TAU process of the RN, the target MME may notify the RN of the identity indicating whether or not HO is inter-MME HO. For example, the target MME notifies the RN of a TAU acceptance signal via the target DeNB. The TAU acceptance signal may include the identity indicating whether or not HO is inter-MME HO. Alternatively, a signal including the identity indicating whether or not HO is inter-MME HO may be notified separately.

The RN judges whether it has performed intra-MME HO or inter-MME HO by the identity indicating whether or not HO is the inter-MME HO notified from the MME. The RN can apply the method disclosed in the second embodiment described above for intra-MME HO and apply the method disclosed in the first embodiment described above for inter-MME HO.

A specific example of the method (2) above is disclosed.

When the RN has performed HO, in the HO process or TAU process of the RN, a target MME allocates the GUTI for RN and notifies the RN of the GUTI. The target MME may be a target MME for RN. The RN judges whether it has performed intra-MME HO or inter-MME HO based on the notified GUTI.

As described above, the GUTI is also allocated to the RN similarly to the user equipment device (UE), allowing the MME to manage the RN identity by the same identity management method as that in a case where the UE identity is managed. This results in simplification of the MME control.

The GUTI has the number structure described below (see TS23.003 V9.0.0 (hereinafter, referred to as "Reference 5") by 3GPP).

<GUTI>=<GUMMEI><M-TMSI>

The globally unique MME identifier (GUMMEI) is an MME number being an MME identity. The M-temporary mobile subscriber identity (M-TMSI) is an equipment number being a user equipment (UE) identity provided in the MME. The M-TMSI is also allocated to the RN.

FIG. 29 is a flowchart showing a processing procedure of the process in which the RN judges whether HO is intra-MME HO or inter-MME HO. The HO process or TAU process of the RN is started. For example, in the TAU process of Step ST2615 disclosed in FIG. 26, the target MME for RN (t-MME for RN) allocates the GUTI to the RN, and then transmits the TAU acceptance signal, by including the GUTI of the RN in the TAU acceptance signal, to the RN.

In Step ST2901, the RN receives the GUTI allocated and transmitted to the own RN by the target MME.

In Step ST2902, the RN derives the GUMMEI from the GUTI transmitted from the target MME using the above-mentioned number structure of the GUTI.

In Step ST2903, the RN judges whether or not the GUMMEI derived in Step ST2902 is identical to the already obtained GUMMEI of the source MME for RN, which has been transmitted from the source MME for RN. The RN moves to Step ST2904 in a case of judging that the derived GUMMEI is identical to the GUMMEI of the source MME for RN in Step ST2903 or moves to Step ST2905 in a case of judging that the derived GUMMEI is not identical to the GUMMEI of the source MME for RN in Step ST2903.

In Step ST2904, the RN judges that the target MME is identical to the source MME and that intra-MME HO has been performed. After the process of Step ST2904, the RN moves to Step ST2906.

In Step ST2906, the RN does not change the TAI of the own RN but follows the method of the second embodiment described above. In this case, it suffices that in Step ST2701 shown in FIG. 27 described above, the TAU request signal to be transmitted from the RN to the target MME for RN includes the information indicating whether or not to transmit and receive the information regarding a UE being served by an RN between the source MME and target MME. This allows the RN to request the MME to perform the TAU process of the UE being served thereby.

In Step ST2905, the RN judges that the target MME is different from the source MME and inter-MME HO has been performed. After the process of Step ST2905, the RN moves to Step ST2907.

In Step ST2907, the RN makes the TAI of the own RN identical to the TAI of the target DeNB. Then, the RN follows the method of the first embodiment described above. This enables the RN to judge whether HO is intra-MME HO or inter-MME HO. As a result, the RN can apply the method disclosed in the second embodiment described above for intra-MME HO or apply the method disclosed in the first embodiment described above for inter-MME HO.

In a case where the RN has performed intra-MME HO, the MME may not notify the RN of the GUTI. The MME is not changed, and thus, the GUTI does not need to be changed.

In this case, in the HO process or TAU process, the RN may judge whether HO is inter-MME HO or intra-MME HO based on whether or not it has been newly notified the GUTI from the target MME.

The RN judges that HO is inter-MME HO in a case where it has been newly notified the GUTI from the target MME or judges that HO is intra-MME HO in a case where it has not been newly notified the GUTI from the target MME. This results in a reduction in information to be notified the RN from the MME.

The method disclosed in the first embodiment described above does not need a new scheme for the TAU process to be performed by a UE but has a problem that a large number of TAUs occur simultaneously because UEs being served by an RN activate the TAU simultaneously. Meanwhile, the methods disclosed in the second embodiment and the first modification of the second embodiment described above can solve the problem that a large number of TAUs occur simultaneously but need to exchange the information regarding a UE between the target MME and source MME especially in the case of inter-MME HO. This complicates the TAU process of the UE being served by the RN.

Application of the method disclosed in this embodiment can reduce those problems. The application of the method disclosed in the second embodiment described above for intra-MME HO does not need to exchange the information between different MMEs and does not complicate the TAU process. Also, the application of the method disclosed in the first embodiment only for inter-MME HO can limit the situation where a large number of TAUs occur simultaneously to the case of inter-MME HO, reducing a signaling load.

The method disclosed in this embodiment can prevent the control from becoming complicated, reducing a signaling load. Further, the target MME and source MME can recognize a UE being served by an RN and configure and manage the TAI list of the UE, allowing for communication between the UE and core network.

Fourth Embodiment

The first to third embodiments above are configured such that the MME that manages the TAI of the mobile RN is an MME to be connected with a DeNB. This embodiment discloses another configuration of the MME that manages the TAI of the mobile RN.

The MME that manages only the TA to which the mobile RN belongs is provided. The MME manages the TAI of the mobile RN. The MME manages the mobility of the UE being served by the mobile RN.

The following four are disclosed as functions of the MME for mobile RN:

(1) function of managing the TA to which a mobile RN belongs;
(2) function of managing the TAI of a mobile RN;
(3) function of managing the TAs to which a UE being served by a mobile RN belongs and TAIs thereof; and
(4) function of managing the TAI list of a UE being served by a mobile RN.

The MME for mobile RN may have at least one of the above-mentioned functions. The MME for mobile RN may have the above-mentioned functions in addition to the normal functions of the MME.

FIG. 30 is a diagram showing an architecture of a mobile communication system in a case where an MME that manages only a TA to which a mobile RN belongs is provided. The configuration shown in FIG. 30 is similar to the configuration shown in FIG. 13, and thus, the corresponding parts are denoted by the same reference symbols and common description is omitted.

An m-MME for UE 3003 is an MME that manages only a TA to which an RN belongs. The DeNB 1305 and m-MME for UE 3003 are connected by an S1 interface 3001. The m-MME for UE 3003 and S-GW for UE 1307 are connected by an S11 interface 3002.

As shown in FIG. 30, the m-MME for UE 3003 that manages the mobility of the UE being served by a mobile RN is provided separately from the MME for UE 1302 that manages the mobility of the UE being served by a normal eNB or fixed RN.

In a case where the RN 1304 is a fixed RN, the operation is as described with reference to FIG. 13. The operation in the case where the RN 1304 is a mobile RN is disclosed below.

In a case where the mobile RN 1304 operates as a UE, the operation is as described with reference to FIG. 13. In other words, communications are performed among the mobile RN 1304, DeNB 1305, MME for RN 1301, and S-GW/P-GW functionality of the DeNB 1305. This is because the MME that manages the TAI of the DeNB is an MME for RN, and thus, the MME for RN suitably manages the mobility of the mobile RN.

Meanwhile, in a case where the mobile RN 1304 operates as an eNB for a UE, communications are performed among the UE 1303, mobile RN 1304, S1/X2 proxy functionality of the DeNB 1305, m-MME for UE 3003, S-GW for UE 1307, and P-GW for UE 1306.

The Uu interface 1314 is used in the communication between the UE 1303 and mobile RN 1304. The S1 interface 3001 is used in the communication between the mobile RN 1304 and m-MME for UE 3003 via the S1 proxy functionality of the DeNB 1305. The S11 interface 3002 is used in the communication between the m-MME for UE 3003 and S-GW for UE 1307.

In a case where an X2 interface is used, the X2 interface is used in the communication between the mobile RN 1304 and a neighbour eNB via the X2 proxy functionality of the DeNB 1305. This is because the MME that manages the TAI of the mobile RN is an m-MME, and thus, the m-MME suitably manages the mobility of the UE being served by the mobile RN. The m-MME that manages a UE being served by a mobile RN is referred to as an m-MME for UE.

In the method disclosed in this embodiment, the TAI of the mobile RN and TAIs of other cells such as an eNB, DeNB, and fixed RN are not included in the same TAI list. Even if the TA to which the DeNB belongs is identical to the TA to which the mobile RN belongs, they are not included in the same TAI list. For example, this is a case in which the TAI of the mobile RN is made identical to the TAI of the target DeNB, which has been disclosed in the first embodiment above.

Figure 31:
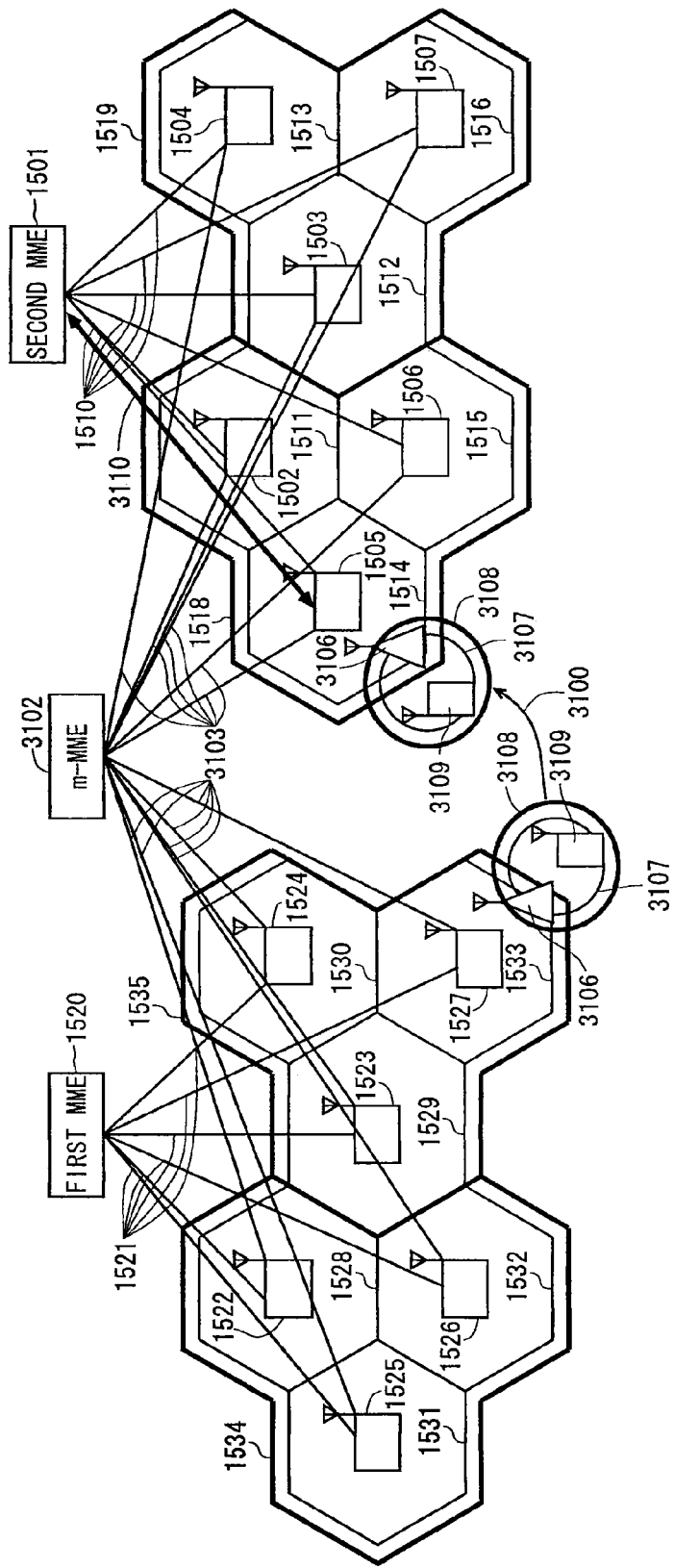
FIG. 31 is a diagram for describing a TA to which a mobile RN belongs and a TA to which a UE being served by the mobile RN belongs.

FIG. 31 is a diagram for describing the TA to which a mobile RN belongs and the TA to which a UE being served by the mobile RN belongs. The configuration shown in FIG. 31 is similar to the configuration shown in FIG. 15, and thus, the corresponding parts are denoted by the same reference symbols and common description is omitted.

FIG. 31 shows a case in which an RN 3106 moves along an arrow 3100. The RN 3106 is located in a coverage 3107 provided by the RN 3106. The TA to which the RN 3106 before moving belongs is a fifth TA 3108. A UE 3109 being served by the RN 3106 moves as the RN 3106 moves. The RN 3106 before moving is connected to the sixth DeNB 1527. The sixth DeNB 1527 is connected to the first MME 1520.

After the RN 3106 moves along the arrow 3100, the RN 3106 is connected to the tenth DeNB 1505. The tenth DeNB 1505 is connected to the second MME 1501. The TA to which the RN 3106 after moving belongs remains unchanged, which is the fifth TA 3108. The fifth TA 3108 being a TA to which the RN 3106 belongs is managed by an m-MME 3102. The m-MME is connected to all the DeNBs that support the mobile RN. In the example shown in FIG. 31, the m-MME 3102 is connected to the DeNBs 1522 to 1527 and 1502 to 1507.

As shown in FIG. 31, the mobile RN 3106 moves between different MMEs from the sixth DeNB 1527 to the tenth DeNB 1505. In this case, the mobile RN still belongs the same TA. In other words, the TAI of the RN remains unchanged. Here, the TAI is still the TAI of the fifth TA 3108.

A DeNB to be connected with the mobile RN is changed, and thus, the HO process of the mobile RN is activated. The TA to which a DeNB belongs varies, that is, the TAI of the DeNB varies, and thus, the mobile RN activates the TAU in the HO.

Meanwhile, if a mobile RN moves between different DeNBs, the TAI of the RN remains unchanged. Thus, the HO process of the UE being served by the mobile RN is not activated, and accordingly, the TAU process thereof is not activated.

Unlike the first to third embodiments described above, the method disclosed in this embodiment causes no problem if the TAU process of the UE is not performed. In this embodiment, an m-MME that manages only the TA to which the mobile RN belongs is provided. This allows the m-MME to manage the TAI of the mobile RN, to thereby manage the mobility of the UE being served by the mobile RN. In other words, if the mobile RN moves between different DeNBs, the m-MME being the MME that manages the mobility of the UE being served by the mobile RN remains unchanged. Therefore, if the TAU process of the UE being served by the mobile RN is not performed, the m-MME can continuously manage the mobility of the UE, without any problem.

The functions of the MME for RN may be divided into the management function for fixed RN and the management function for mobile RN. The MME for RN may have the management function for fixed RN, and may be provided with an m-MME for RN that has the management function for mobile RN. The m-MME for UE and m-MME for RN may be configured in the same MME. This allows the mobility as a mobile RN to be managed separately from other cells (eNB, DeNB, and fixed RN). The MME for only a mobile RN can be configured, allowing for flexible additional installation and operation. As a result, investment and operation costs can be reduced.

The method disclosed in this embodiment enables the m-MME to configure and manage the TAI list of the UE if, for example, the TAU process of the UE being served by the RN is not performed as disclosed in the first to the third embodiments. This allows for communication between the UE and core network.

An enormous number of mobile RNs makes it difficult to manage the TAIs of the mobile RNs by one m-MME. The number of DeNBs that support the enormous number of mobile RNs also becomes enormous, which particularly makes it difficult for one m-MME to be connected to all the DeNBs. The method of solving this problem is disclosed below.

The mobile RNs are subjected to grouping. The DeNBs that support the mobile RNs are limited for each of the group. An m-MME that manages the TAI of the mobile RN is provided for each of the groups.

The provision of an m-MME for each group of the mobile RNs can limit the DeNBs to be connected with each m-MME. This eliminates the need for connecting one m-MME with an enormous number of DeNBs.

Grouping of mobile RNs may be performed, for example, per service, such as a group to be installed in a car of XX bullet train and a group to be installed in a car of YY bullet train.

If the DeNB that supports a mobile RN is not connected to the m-MME, the mobility of the UE being served by the RN is not managed by the m-MME. The following three are disclosed as the methods of solving this problem.

(1) The UE is not allowed to communicate.
(2) The management of the TAI of the mobile RN is moved to the MME on which the mobile RN has performed the TAU.
(3) The TAI of the mobile RN is changed to the TAI of the DeNB.

The method (1) above is suitable for a case in which the access of a mobile RN is limited to a desired m-MME. For example, in a case where after moving, a group of a certain mobile RN is connected to a DeNB connected to an m-MME that manages a TAI of another mobile RN, the UE being served by this mobile RN is not allowed to communicate. This allows for communication of only a UE being served by a mobile RN in a group.

The management of the TAI of the mobile RN is moved to the MME on which the mobile RN has performed the TAU, as in the method (2) above, allowing for communication of a UE being served by this RN.

The method (3) above is the method disclosed in the first embodiment described above, achieving effects of the first embodiment above.

In the method disclosed in this embodiment, if a mobile RN performs inter-MME HO, the MME that manages the TAI of the UE being served by this RN is an m-MME and is not changed. This eliminates the need for performing the TAU process of the UE. As a result, the problem that a large number of TAUs occur simultaneously, which is caused in the methods disclosed in the first to third embodiments above, can be solved. Further, it is not required to exchange information between the source MME and target MME. This can prevent the TAU process from becoming complicated and reduce a signaling load.

First Modification of Fourth Embodiment

This modification discloses another configuration of the MME that manages the TAI of the mobile RN.

A plurality of MMEs for mobile RN are provided. An MME for mobile RN may be configured in a normal MME or a normal MME may be caused to function also as the MME for mobile RN. The functions of the MME for mobile RN may be the functions disclosed in the fourth embodiment described above.

Figure 32:
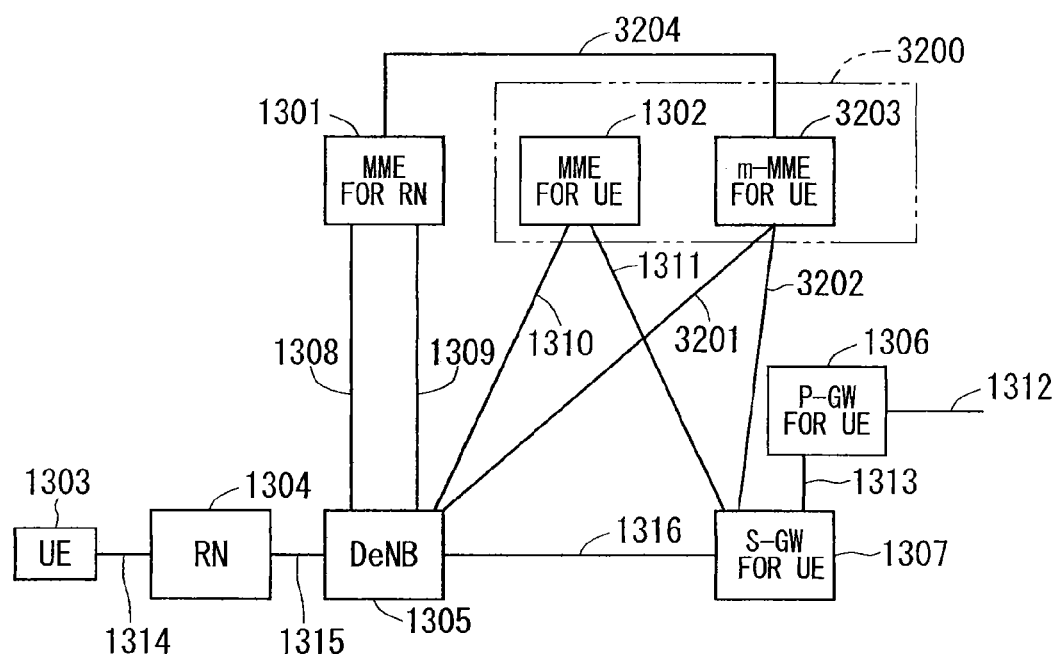
FIG. 32 is a diagram showing an architecture in a case where an MME for mobile RN is configured in a normal MME.

FIG. 32 is a diagram showing an architecture in a case where an MME for mobile RN is configured in a normal MME. The configuration shown in FIG. 32 is similar to the configuration shown in FIG. 13, and thus, the corresponding parts are denoted by the same reference symbols and common description is omitted.

An m-MME for UE 3203 manages only a TA to which a mobile RN belongs. The DeNB 1305 and m-MME for UE 3203 are connected by an S1 interface 3201. The m-MME for UE 3203 and S-GW for UE 1307 are connected by an S1 interface 3202.

In this modification, the MME for UE 1302 and m-MME for UE 3203 are configured in the same MME 3200. Though different from the example shown in FIG. 32, the MME for RN 1301, MME for UE 1302, and m-MME for UE 3203 may be configured in the same MME. In other words, there may be configured an MME that has the mobility management function of the RN, the mobility management function of the UE being served by the eNB, DeNB, or fixed RN, and the mobility function of the UE being served by the mobile RN.

The MME for RN 1301 and m-MME for UE 3203 are connected by an interface 3204. As a result, in a case where the RN has performed the TAU process, the MME for RN 1301 and m-MME for UE 3203 can exchange information.

In a case where the RN 1304 is a fixed RN and in a case where the RN 1304 is a mobile RN and operates as a UE, the RN 1304 operates as described with reference to FIG. 30.

In a case where the mobile RN 1304 operates as an eNB for UE, communications are performed among the UE 1303, mobile RN 1304, S1/X2 proxy functionality of the DeNB 1305, m-MME for UE 3203, S-GW for UE 1307, and P-GW for UE 1306. The operation in this case is also identical to the operation described with reference to FIG. 30.

In the method disclosed in this modification, the TAI of the mobile RN and the TAIs of other cells such as eNB, DeNB, and fixed RN are not included in the same TAI list. If the TA to which the DeNB belongs is identical to the TA to which the mobile RN belongs, they are not included in the same TAI list. An example of the above is a case in which the TAI of the mobile RN is made identical to the TAI of the target DeNB, which has been disclosed in the first embodiment.

Figure 33:
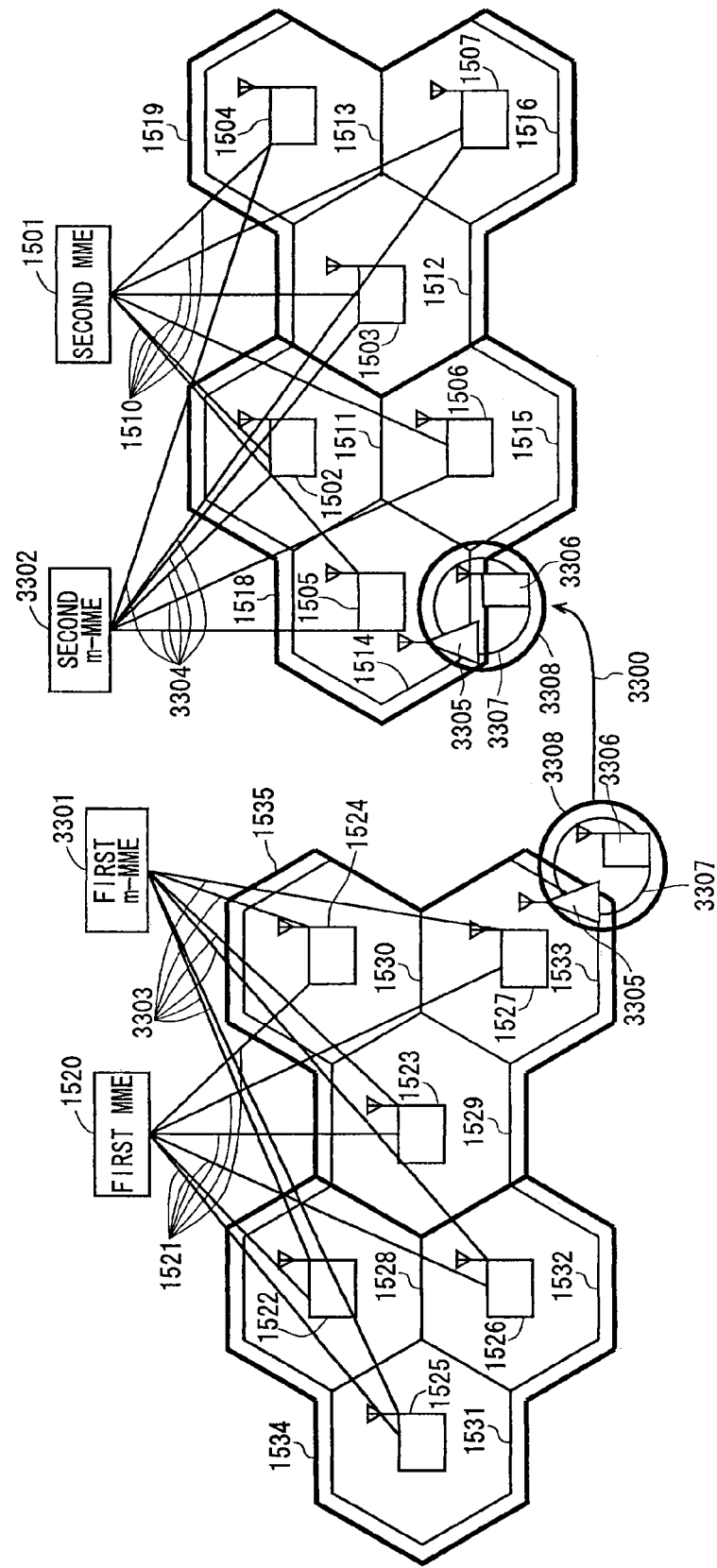
FIG. 33 is a diagram for describing a TA to which a mobile RN belongs and a TA to which a UE being served by the mobile RN belongs in a first modification of a fourth embodiment.

FIG. 33 is a diagram for describing a TA to which a mobile RN belongs and a TA to which a UE being the mobile RN belongs in the first modification of the fourth embodiment. The configuration shown in FIG. 33 is similar to the configuration shown in FIG. 15, and thus, the corresponding parts are denoted by the same reference symbols and common description is omitted.

FIG. 33 shows a case in which an RN 3305 moves along an arrow 3300. A first m-MME 3301 is connected to all the DeNBs 1522 to 1527 connected to the first MME 1520 by S1 interfaces 3303. A second m-MME 3302 is connected to all the DeNBs 1502 to 1507 connected to the second MME 1501 by S1 interfaces 3304.

The RN 3305 is located in a coverage 3307 provided by the RN 3305. A TA to which the RN 3305 before moving belongs is a fifth TA 3308. A UE 3306 being served by the RN 3305 moves as the RN 3305 moves.

The RN 3305 before moving is connected to the sixth DeNB 1527. The sixth DeNB 1527 is connected to the first MME 1520 and the first m-MME 3301. The TA to which the RN 3305 before moving belongs is the fifth TA 3308. The fifth TA 3308 is managed by the first m-MME 3301.

After moving along the arrow 3300, the RN 3305 is connected to the tenth DeNB 1505. The tenth DeNB 1505 is connected to the second MME 1501 and the second m-MME 3302. The TA to which the RN 3305 after moving belongs remains unchanged, which is the fifth TA 3308. The fifth TA 3308 after moving is managed by the second m-MME 3302.

The TAI list of the UE being served by the mobile RN and the TAI list of the UE being served by the fixed RN, eNB, or DeNB are managed by different MMEs. The TAI list of the UE being served by the mobile RN is managed by the m-MME for UE. The TAI list of the UE being served by the fixed RN, eNB, or DeNB is managed by the MME for UE. Specific description is given with reference to FIG. 33.

The TAI list of the UE 3306 being served by the mobile RN 3305 before moving and the TAI lists of the UEs being served by first to sixth DeNBs 1522 to 1527 are managed by different MMEs. Specifically, the TAI list of the TIE 3306 being served by the mobile RN 3305 is managed by the first m-MME 3301 being an m-MME for UE. The TAI lists of the UEs being served by the first to sixth DeNBs 1522 to 1527 are managed by the first MME 1520 being an MME for UE.

The TAI list of the UE 3306 being served by the mobile RN 3305 after moving and the TAI lists of the UEs being served by the seventh to twelfth DeNBs 1502 to 1507 are managed by different MMEs. Specifically, the TAI list of the UE 3306 being served by the mobile RN 3305 is managed by the second m-MIME 3302 being an m-MME for UE. The TAI lists of the UEs being served by the seventh to twelfth DeNBs 1502 to 1507 are managed by the second MME 1501 being an MME for UE.

The TAI of the mobile RN and the TAI of the fixed RN, eNB, or DeNB are not included in the same TAI list. The UE being served by the mobile RN attaches to the MME for mobile RN provided in the MME to which the mobile RN has attached.

In a case where the mobile RN has performed inter-MME HO, the HO process and TAU process of the mobile RN are performed. The HO process and TAU process of the UE being served by the mobile RN are not performed. However, the TAU process of the UE is necessary. This is because the MME is changed, and accordingly, the TA managed by the target MME differs from the TA managed by the source MME.

The methods disclosed in the first to third embodiments above can be used as the method of performing the TAU process of the UE. In this case, it suffices that the information is exchanged between the MME for RN and the m-MME for UE by means of the interface 3204 shown in FIG. 32. In a case where the UE manages the mobility between the mobile RN and the eNB or DeNB, the TAU process is activated from the UE.

The method disclosed in this modification can avoid a situation in which an m-MME needs to be connected to all DeNBs that support the mobile RN. It suffices that the m-MME is configured in a conventional MME to be connected only to the DeNB that has been conventionally connected to the MME. Physical installation of an MME and connection of the MME to a DeNB are not newly required, making it easier to construct a communication system, resulting in a reduction in the cost of constructing the communication system.

Second Modification of Fourth Embodiment

This modification discloses another configuration of the MME that manages the TAI of the mobile RN. The MME for mobile RN is configured in a predetermined DeNB, specifically, an MME to which a P-DeNB belongs. The MME to which the P-DeNB belongs may also function as the MME for mobile RN.

The architecture in a case where the MME for mobile RN is included in the MME to which the P-DeNB belongs can be configured similarly to the architecture shown in FIG. 13. However, the MME for UE 1302 in the MME to which the P-DeNB belongs is provided with the function of the MME for mobile RN. If all DeNBs can serve as a P-DeNB, it suffices to provide the function of the MME for mobile RN to the MMEs for UE in the MME to which all the DeNBs belong.

In a case where the RN 1304 is a fixed RN and in a case where the RN 1304 is a mobile RN and operates as a UE, the RN 1304 operates as described with reference to FIG. 13.

In a case where the mobile RN 1304 operates as an eNB for a UE, communications are performed among the UE 1303, mobile RN 1304, S1/X2 proxy functionality of the DeNB 1305, MME for UE 1302 to which the functions of the MME for mobile RN are added, S-GW for UE 1307, and P-GW for UE 1306.

A Uu interface is used in the communication between the UE and mobile RN. An S1 interface is used in the communication between the mobile RN and m-MME for UE via the S1 proxy functionality of the DeNB. An S11 interface is used in the communication between the m-MME for UE and S-GW for UE. In a case where an X2 interface is used, the X2 interface is used in the communication between the mobile RN and neighbour eNB via the X2 proxy functionality of the DeNB.

In the method disclosed in this modification, the TAI of the mobile RN and the TAI of the eNB or DeNB that belongs to the MME for the P-DeNB may be included in the same TAI list.

Figure 34:
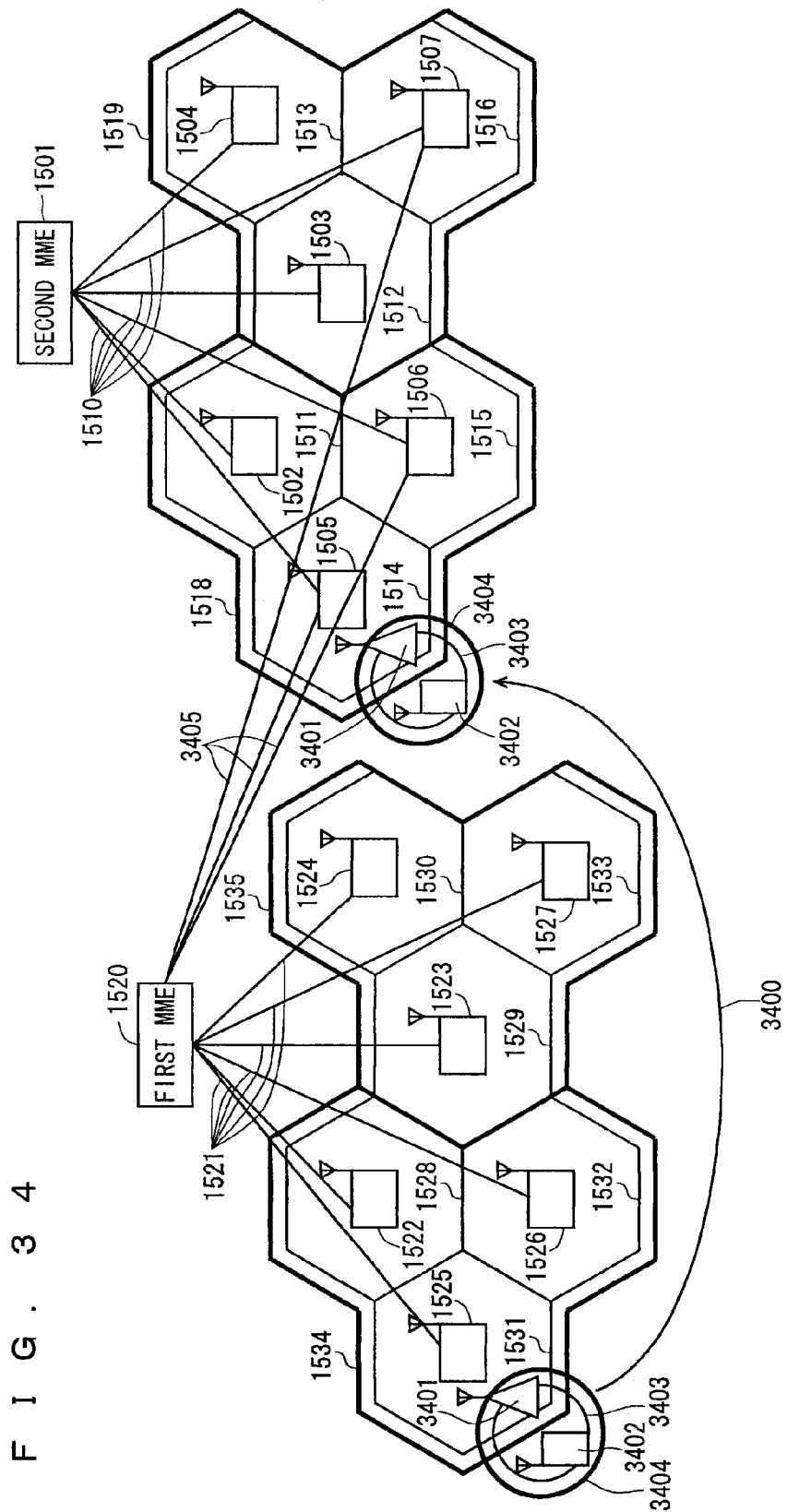
FIG. 34 is a diagram for describing a TA to which a mobile RN belongs and a TA to which a UE being served by the mobile RN belongs in a second modification of the fourth embodiment.

FIG. 34 is a diagram for describing a TA to which a mobile RN belongs and a TA to which a UE being served by the mobile RN belongs in the second modification of the fourth embodiment. The configuration shown in FIG. 34 is similar to the configuration shown in FIG. 15, and thus, the corresponding parts are denoted by the same reference symbols and common description is omitted.

The fourth DeNB 1525 is a P-DeNB. The first to twelfth DeNBs 1522 to 1527 and 1505 to 1507 are DeNBs that support a mobile RN. The first MME 1520 to which the P-DeNB 1525 belongs is connected to all the DeNBs 1522 to 1527 and 1505 to 1507 by the S1 interfaces 1521 and S1 interfaces 3405.

FIG. 34 shows a case in which an RN 3401 moves along an arrow 3400. The RN 3401 is located in a coverage 3403 provided by the RN 3401. The TA to which the RN 3401 before moving belongs is a fifth TA 3404. A UE 3402 being served by the RN 3401 moves as the RN 3401 moves.

The RN 3401 before moving is connected to the P-DeNB 1525. The P-DeNB 1525 is connected to the first MME 1520.

The RN 3401 moves along the arrow 3400 and is then connected to the tenth DeNB 1505. The tenth DeNB 1505 is connected to the first MME 1520 and the second MME 1501. The TA to which the RN 3401 after moving belongs remains unchanged, which is the fifth TA 3404. The fifth TA 3404 is managed by the first MME 1520.

The TAI list of the UE being served by the mobile RN and the TAI list of the UE being served by the fixed RN, eNB, or DeNB may be managed by the same MME. Specifically, the TAI list of the UE being served by the mobile RN and the TAI list of the UE being served by the fixed RN, eNB, or DeNB are managed by the MME for UE 1520 to be connected to the P-DeNB.

The TAI of the mobile RN and the TAI of the fixed RN, eNB, or DeNB may be included in the same TAI list. The UE being served by the mobile RN attaches to the MME to be connected to the P-DeNB to which the mobile RN has attached.

In a case where the mobile RN 3401 has performed inter-MME HO from the P-DeNB 1525 to the DeNB 1505, the HO process and TAU process of the mobile RN 3401 are performed. However, the HO process and TAU process of the UE 3402 being served by the mobile RN 3401 are not performed. The method disclosed in this modification does not need the TAU process of the UE 3402 being served by the mobile RN.

This is because if the mobile RN 3401 performs inter-MME HO, the MME that manages the TAI of the UE 3402 being served by the RN 3401 is still the first MME 1520 and is not changed.

In a case where the UE has managed the mobility between the mobile RN and the fixed RN, eNB, or DeNB that has the same TAI as that of the RN, the TAU process from the UE is not activated.

The first MME 1520 for the P-DeNB 1525 for the mobile RN 3401 is connected to all the DeNBs 1522 to 1527 and 1505 to 1507 that support the RN 3401. If the number of mobile RNs becomes enormous and each P-DeNB is connected to a specific MME, the MME has difficulty in connection with all the DeNBs that support the enormous number of mobile RNs. The method of solving this problem is disclosed below.

The mobile RNs are subjected to grouping. The DeNBs to be supported per group are limited. As a result, the DeNBs to be connected with the MME can be limited. Alternatively, a P-DeNB may be set for each of the groups. The P-DeNB may be determined in advance per group. One or a plurality of P-DeNBs may be provided. Accordingly, the management of the TAIs can be unified for each of the groups, making it easy to maintain and manage the TAIs as a network, not limited to the MME.

Grouping of mobile RNs may be performed, for example, per service, such as a group to be installed in a car of XX bullet train and a group to be installed in a car of YY bullet train.

The method disclosed in the fourth embodiment described above is applicable as the method of taking a measure against the case in which a DeNB that supports a mobile RN is not connected to an MME to be connected to a P-DeNB.

In the method disclosed in this modification, if a mobile RN performs inter-MME HO, the MME that manages the TAI of a UE being served by this RN is not changed, whereby the UE does not need to perform the TAU. This can solve the problem that a large number of TAUs occur simultaneously, which is caused by the methods disclosed in the first to third embodiments described above, eliminating the need for exchanging the information between the source MME and target MME. Thus, the TAU process can be prevented from becoming complicated and a signaling load can be reduced.

The method disclosed in this modification can avoid a situation in which the MME needs to be connected to all DeNBs. It suffices that the MME to be connected to the P-DeNB is connected to the DeNB within the moving range of the mobile RN having the TAI of the P-DeNB. This makes it easy to construct a communication system, resulting in the cost of constructing the communication system.

Fifth Embodiment

When an RN has moved, some of the UEs being served by the RN move together with the RN and the others remain at the original locations. The MME has to recognize the UEs that have moved together with the RN. For example, in the method disclosed in the second embodiment described above, the RN notifies the MME for RN of the identity of the UE being served by the RN. Alternatively, in the method disclosed in the first modification of the second embodiment described above, the RN notifies the target MME for RN of the identity of the UE being served by the RN. The MME for RN notifies the MME for UE of the identity of this UE. For this notification, the RN or MME needs to recognize which UE has moved together with the RN. Specifically, the RN or MME needs to recognize the identity of the UE that has moved together with the RN.

The RN recognizes the UE in the RRC_Connected state that is being served by the own cell. The MME for UE recognizes a cell identity being an identity of a serving cell for the UE in the RRC_Connected state, specifically, GCI or E-UTRAN global cell identifier (EGCI). In other words, the RN and MME for UE can recognize by which cell the UE in the RRC_Connected state is served.

In a case where the UE in the RRC_Connected state has moved, the RN and MME for UE can both judge whether the UE has moved outside of the cell through the HO process or remains in the cell. As a result, the RN can notify the MME for RN of the identity of the UE being served by the RN, which has been disclosed in the second embodiment and the first modification of the second embodiment described above. Alternatively, the MME for UE may recognize and judge the identity of the UE being served by the RN.

However, the RN does not recognize the UE in the RRC_Idle state that is being served by the own cell. The MME cannot recognize by which cell the UE in the RRC_Idle state is served and can only recognize the above within the range of the cell in the TAI list of the UE.

In a case where the UE in the RRC_Idle state has moved, the RN and MME both cannot judge whether the UE has moved outside of the cell or remains in the cell if the UE has moved within the cell range of the TAI list of the UE.

In a case where the UE in the RRC_Idle state has moved together with the RN, the RN and MME cannot recognize this UE as described above. In other words, the RN and MME cannot recognize which UE in the RRC_Idle being served by the RN has moved together with this RN. Not only the target MME but also the source MME cannot recognize which UE in the RRC_Idle state being served by the RN has moved together with this RN.

Thus, the MME cannot notify the UE in the RRC_Idle state, which has moved together with the RN, of a paging signal, so that communication between the UE and core network is not allowed.

This embodiment discloses the method of solving these problems. The TAI of the RN and the TAI of other type of cell, such as eNB and DeNB, are prohibited from being included in the same TAI list for UE. Even in a case where the same MME is connected to the eNB or DeNB and the RN, the TAI of the RN and the TAI of other type of cell are prohibited from being included in the same TAI list.

FIG. 35 is a diagram for describing cases in which a UE in the RRC_Idle state moves and does not move together with a mobile RN. FIG. 35 shows a case in which an RN 3511 moves along an arrow 3500. Part (a) of FIG. 35 is a diagram showing a state of a mobile communication system before the RN 3511 moves, and part (b) of FIG. 35 is a diagram showing a state of the mobile communication system after the RN 3511 has moved.

A DeNB 3507 is located in a coverage 3514 provided by a first DeNB 3507. A first TA 3505 to which the first DeNB 3507 belongs is managed by a first MME 3501. A second DeNB 3508 is located in a coverage 3516 provided by the second DeNB 3508. A second TA 3506 to which the second DeNB 3508 belongs is managed by a second MME 3502.

The first MME 3501 and first DeNB 3507 are connected by an S1 interface 3503. The second MME 3502 and second DeNB 3508 are connected by an S1 interface 3504. The RN 3511 is located in a coverage 3510 provided by the RN 3511.

With reference to part (a) of FIG. 35, a third TA 3509 to which the RN 3511 before moving belongs is managed by the first MME 3501. A first UE 3512 and a second UE 3513, which are both in the RRC_Idle state, are served by the RN 3511.

With reference to part (b) of FIG. 35, the TA to which the RN 3511 after moving belongs is not changed from that before moving and is the third TA 3509. The third TA 3509 to which the RN 3511 after moving belongs is managed by the second MME 3502. The second UE 3513 remains at an original location and is in the RRC_Idle state to be served by the first DeNB 3507. The first UE 3512 moves together with the RN 3511 and is in the RRC_Idle state to be served by the RN 3511.

The first UE 3512 that moves together with the RN 3511 is still being served by the RN 3511. Thus, the first UE 3512 judges that the TAI of the RN 3511 has already been located in the TAI of the own TA list and does not activate the TAU process. As a result, the first MME 3501 recognizes that the UE is located in the cell within the TAI list of the UE.

Meanwhile, the second UE 3513 that does not move together with the RN 3511 gets out of the coverage 3510 of the RN 3511, moves to the coverage 3514 of the first DeNB 3507, and reselects the first DeNB 3507 as a cell. The TAI of the DeNB and the TAI of the RN are prohibited from being included in the same TAI list, and thus, the TAI list of the second UE 3513 has no TAI of the first TA 3505 to which the first DeNB 3507 belongs. The second UE 3513 accordingly activates the TAU process for the first MME 3501. The TAU process of the second UE 3513 is performed by the first MME 3501.

Thus, the first MME 3501 can recognize whether or not the second UE 3513 that has not moved together with the RN 3511 and remained at its location is located in the TA managed by the own MME. Even if the DeNB to which the UE is connected varies and a cell is reselected between the different MMEs, similarly, the target MME and source MME can both recognize whether or not this UE is located in the TA managed by the own MME. The source MME and target MME can accordingly both recognize which UE has remained at an original location or moved together with an RN. This allows for the UE to communicate with the core network.

Disclosed below is a specific example of the method in which an MME avoids including the TAI of the RN and the TAI of other type of cell in the same TAI list of the UE.

FIG. 36 is a diagram showing a sequence when an RN moves in a case where the TAI of the RN and the TAI of other type of cell are prohibited from being included in the same TAI list.

In Step ST3601, a first UE#1 is in the RRC_Idle state to be served by the RN. In Step ST3602, a second UE#2 is in the RRC_Idle state to be served by the RN.

In Step ST3603, the RN is RRC-connected to the first DeNB#1.

In Step ST3605, the MME for UE manages a TAI list_UE#1 being the TAI list of the first UE#1 and a TAI list_UE#2 being the TAT list of the second UE#2. The TAI list_UE#1 includes a third TAI#3 being the TAI of the TA to which the RN belongs. Similarly, the TAI list_UE#2 includes the third TAI#3. In Step ST3604, accordingly, the TAI list of the first UE#1 includes the third TAI#3. In Step ST3606, the TAI list of the second UE#2 includes the third TAI#3.

In Step ST3607, the second UE#2 moves together with the RN. In Step ST3608, the RN moves from being served by the first DeNB#1 to being served by the second DeNB#2. The first UE#1 remains at an original location.

In Step ST3609, the HO/TAU process is performed among the RN, first DeNB#1, second DeNB#2, and MME for RN. In Step ST3610, the RN is RRC-connected to the second DeNB#2.

The first UE#1 remaining at the original location is being served by the first DeNB#1, and thus compares the first TAI#1 to which the first DeNB#1 belongs and the TAI in the own TAI list and judges that the first TAI#1 is not located.

In Step ST3611, the first UE#1 activates the TAU, whereby the TAU process of is performed among the first UE#1, first DeNB#1, and MME for UE. As a result, the MME for UE changes the TAI list_UE#1 of the first UE#1. The TAI of the RN and the TAI of other type of cell are prohibited from being included in the same TAI list, so that the MME for UE deletes the third TAI#3 from the TAI list_UE#1 and includes the first TAI#1 therein.

In Step ST3611, the MME for UE includes the updated TAI list_UE#1 in the TAU acceptance signal and then notifies the first UE #1 of the TAU acceptance signal. As a result, the first UE#1 updates the TAI list.

In Step ST3612, the TAI list of the first UE#1 includes only the first TAI#1. In Step ST3613, the TAI list_UE#1 of the first UE#1 managed by the MME for UE includes only the first TAI#1. Meanwhile, the TA to which the second ITE#2 belongs remains unchanged, which is the third TAI#3, and thus, the MIME for UE does not change the TAI list_UE#2.

In a case where the first UE#1 receives an incoming call in Step ST3614 after moving of the RN, in Step ST3615, the MME for UE transmits a paging signal to the first DeNB#1 belonging to the first TAI#1 with the use of the TAI list_#UE1 of Step ST3613.

The first DeNB#1 checks the TAI list_UE#1 in the paging message. The TAI list_UE#1 includes the first TAI#1 of the own cell, and thus, in Step ST3616, the first DeNB#1 transmits the paging signal to the first UE#1 being served thereby.

In a case where the second UE#2 receives an incoming call in Step ST3614 after moving of the RN, the MME for UE transmits the paging signal to the RN belonging to the third TAI#3 with the use of the TAI list_#UE2 in Step ST3613. At that time, the RN is connected to the second DeNB#2, and thus, the MME for UE transmits the paging signal to the RN via the second DeNB#2 in Steps ST3617 and ST3618. When the RN moves, the DeNB to be connected with the RN is changed in the HO/TAU process of the RN in Step ST3609. It suffices that the MME for UE obtains from the MME for RN the information of the DeNB connected with the RN.

In Step ST3618, the second DeNB#2 that has received the paging message from the MME for UE in Step ST3617 transmits this paging message to the RN by the proxy functionality. The RN that has received the paging message checks the TAI list_UE#2 in the paging message. The TAI list_UE#2 includes the third TAI#3 of the own cell, and thus, in Step ST3619, transmits the paging signal to the second UE#2 being served thereby.

In a case where the TAI list of the UE includes the TAI of the RN before the TAU process of the UE, if the TAI in which the UE is newly located is the TAI of the RN, the MME may add this TAI to the TAI list in the TAU process of the UE. In the TAU process of the UE, if the TAI which newly includes the UE is the TAI of other type of cell, the MME deletes the TAI in the TAI list of the UE and includes the TAI of the other type of cell in the TAI list.

Meanwhile, in a case where the TAI list of the UE includes the TAI of other cell before the TAU process of the UE, if the TAI in which the UE is newly located is the TAI of the other cell, the MME may add this TAI to the TAI list in the TAU process of the UE. If the TAI in which the UE is newly located is the TAI of the RN in the TAU process of the UE, the MME deletes the TAI in the TAI list of the UE and includes the TAI of the RN in the TAI list.

Through the above, the MME can perform the incoming call process via the target DeNB for the UE or the RN even if the UE is in the RRC_Idle state. The UE accordingly can communicate with the core network.

The MME is configured so as to judge whether the TAI is the TAI of the RN or the TAI of other cell. A specific example is disclosed below.

For example, in attach of the RN, the RN may notify the MME of the information indicating that the own cell is an RN. An operation administration and maintenance (OAM) may notify the cell and the MME of the information indicating that the cell is an RN. The MME associates the information indicating that the cell is an RN with the identity of the cell being a target for this information, and manages the associated ones. The MME may notify the HSS of the information indicating that the cell is an RN. The HSS associates the information indicating that the cell is an RN and the identity of the cell being a target for the information and manages the associated ones. This enables the MME and HSS to recognize whether or not the cell is an RN, allowing for management as the RN.

The TAU request signal from the UE is notified the MME via the RN. The RN notifies the MME of the TAU request signal from the UE, by including a cell identity and TAI in the TAU request signal from the UE therein, or notifies the cell identity and TAI together with the TAU request signal. The MME can recognize whether or not the TAI belongs to the RN based on the cell identity and the information indicating whether or not a cell to be associated with the cell identity is an RN. The MME notifies the HSS of the cell identity and the TAI, similarly, allowing the HSS to recognize whether or not the TAI belongs to the RN.

As another example, the RN notifies the MME of the TAU request signal from the UE, by including the information indicating that the own cell is an RN, a cell identity, and TAI therein, or notifies the MME of the information above, a cell identity, and TAI together with the TAU request. This enables the MME to recognize whether or not the TAI belongs to an RN. Not limited to the RN, but all the cells may transmit the TAU request signal from the UE, by including the information indicating whether the own cell is an RN or other type of cell, the cell identity, and TA therein. This enables the MME to recognize whether the TAI belongs to the RN or belongs to other type of cell. Alternatively, the MME may notify the HSS of the cell identity and the TAI. Similarly, this enables the HSS to recognize whether or not the TAI belongs to the RN.

As another example, an RN notifies a UE being served thereby of the information indicating that the own cell is an RN. As the notification method, the information may be notified a UE in dedicated signaling, for example, RRC message or MAC message or may be broadcast as the system information. The UE, which has received the information indicating whether or not the own cell is an RN, notifies the MME of the TAI request signal, by including the information indicating whether or not the own cell is an RN therein, or notifies the MME of this information together with a TAI request signal. This allows the MME to recognize whether or not the TAI belongs to the RN, together with the cell identity and TAI received from the RN. Not only the RN but also all the cells may notify UEs being served thereby of the information indicating whether or not the own cell is an RN or other type of cell. This allows the MME to recognize whether the TAI belongs to the RN or other type of cell. Alternatively, the MME may notify the HSS of the cell identity and the TAI. Similarly, this allows the HSS to recognize whether or not the TAI belongs to the RN.

The fixed RN and mobile RN may be operated separately such that only the mobile RN is prohibited from being included in the same TAI list as other type of cell such as an eNB, DeNB, or fixed RN. Fixed and mobile modes may be provided as RN modes. These modes allow the MME or HSS to judge whether to forbid or permit to include the RN in the same TAI list as that of the other type of cell. The above-mentioned method is applicable as the method in which the MME or HSS can recognize whether or not the TAI is a TAI of a mobile RN or the TAI of other cell, or whether the TAI is the TAI of the RN in the mobile mode or the TAI of other cell. The information indicating whether or not an RN is a mobile RN or the information indicative of an RN mode may be used in place of the information indicating that the own cell is an RN.

In a case where TAIs of a plurality of mobile RNs are included in the TAI list of the UE, the MME cannot judge with which mobile RN the UE in the RRC_Idle state has moved. Thus, TAIs of a plurality of mobile RNs may be prohibited from being included in the same TAI list. As a result, the MME can recognize the UE even in a case where the UE in the RRC Idle state moves together with other mobile RN and is not served by the original mobile RN.

First Modification of Fifth Embodiment

This modification discloses another method for solving the problem described in the fifth embodiment. The MME manages two TAI lists for one UE. The two TAI lists may be the TAI list for mobile RN and the TAI list for other cell. A specific example thereof is disclosed below.

Figure 37:
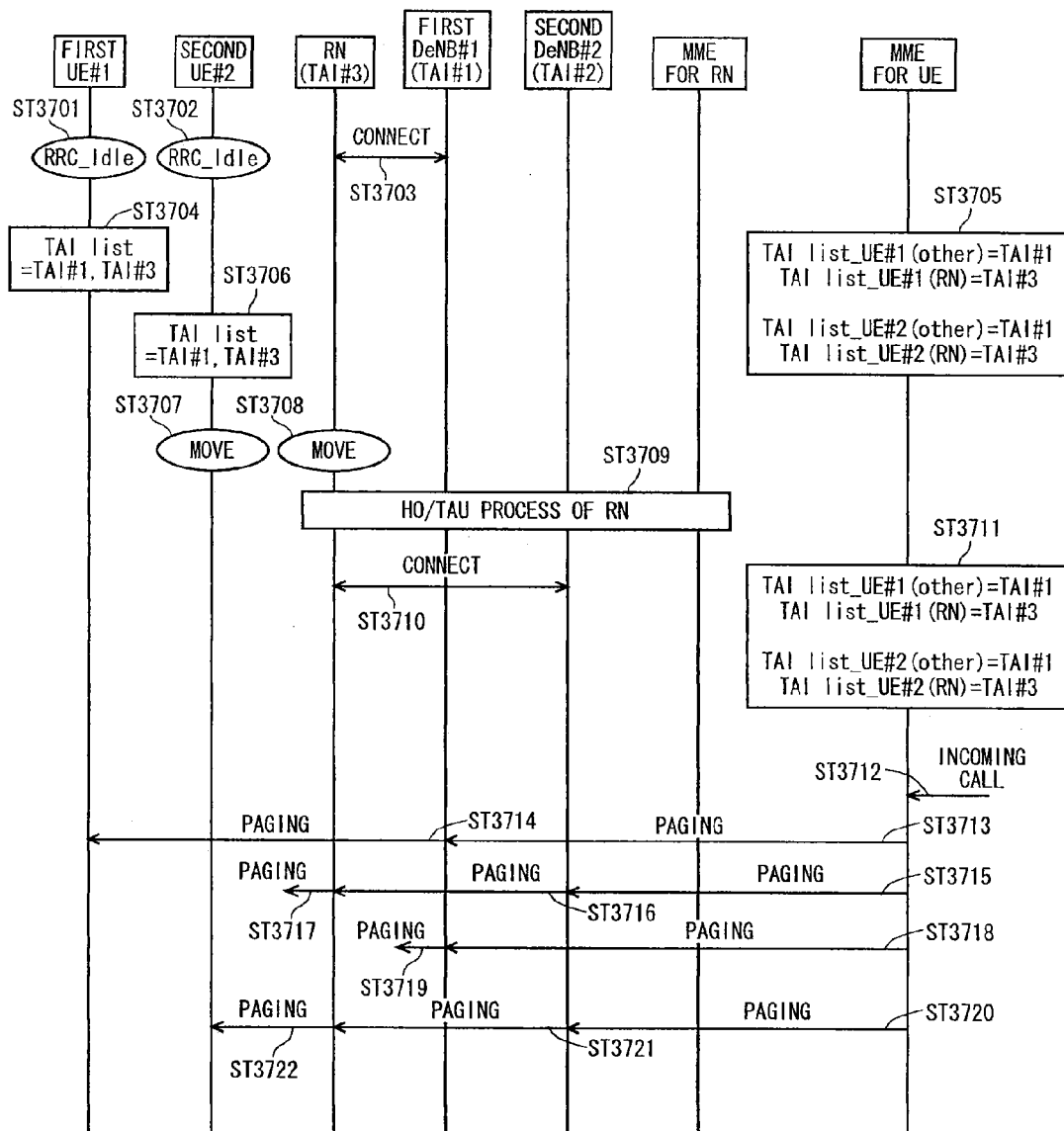
FIG. 37 is a diagram showing a sequence when an RN moves in a case where an MME manages two TAI lists for one UE.

FIG. 37 is a diagram showing a sequence when the RN moves in a case where the MME manages two TAI lists for one UE.

In Step ST3701, a first UE#1 is in the RRC_Idle state to be served by the RN. In Step ST3702, a second UE#2 is in the RRC_Idle state to be served by the RN.

In Step ST3703, the RN is RRC-connected to the first DeNB#1.

In Step ST3705, an MME for UE manages two TAI lists for the first UE#1, specifically, a TAI list_UE#1 (RN) and a TAI list_UE#1 (other). Similarly, the MME for UE manages two TAI lists for the second UE#2, specifically, a TAI list_UE#2 (RN) and a TAI list_UE#2 (other).

The TAI list_UE#1 (RN) includes a third TAI#3 of a TA to which the RN belongs. The TAI list_UE#1 (other) includes a first TAI#1 of a TA to which a DeNB to be connected with the RN belongs.

Similarly, the TAI list_UE#2 (RN) includes the third TAI#3 of the TA to which the RN belongs. The TAI list_UE#2 (other) includes the first TAI#1 of the TA to which the DeNB to be connected with the RN belongs.

Thus, in Step ST3704, the TAI list_UE#1 of the first UE#1 includes the first TAI#1 and the third TAI#3. Similarly, in Step ST3706, the TAI list_UE#2 of the second UE#2 includes the first TAI#1 and the third TAI#3.

In Step ST3707, the second UE#2 moves together with the RN. In Step ST3708, the RN moves from being served by the first DeNB#1 to being served by the second DeNB#2. The first UE#1 remains at the original location.

In Step ST3709, the HO/TAU process is performed among the RN, first DeNB#1, second DeNB#2, and MME for RN. In Step ST3710, the RN is RRC-connected to the second DeNB#2.

The first UE#1 remaining at the original location is being served by the first DeNB#1, and thus, compares the first TAI#1 to which the first DeNB#1 belongs with the TAI in the own TAI list and judges that the first TAM is located. The first UE#1 accordingly does not activate the TAU.

The TAU process of the first UE#1 is not performed, and thus, the MME for UE does not change the TAI list_UE#1 (RN) and the TAI list_UE#1 (other).

Meanwhile, the TA to which the second UE#2 belongs remains unchanged, which is the third TAI#3, and accordingly, the MME for UE does not change the TAI list_UE#2 (RN) and the TAI list_UE#2 (other).

In a case where an incoming call is made to the first UE#1 in Step ST3712 after moving of the RN, the MME for UE transmits a paging signal using two TAI lists of the first UE#1 in Step ST3711, specifically, the TAI list_UE#1 (other) and TAI list_UE#1 (RN).

In Step ST3713, the MME for UE transmits the paging signal to the first DeNB#1 belonging to the first TAI#1 included in the TAI list_UE#1 (other).

In this case, the TAI in the TAI list_UE#1 (other) and the TAI in the TAI list_UE#1 (RN) are included together as the TAI list of the first UE#1 in the paging message. Alternatively, two including the TAI list_UE#1 (other) and TAI list_UE#1 (RN) may be included as the TAI list of the first UE#1 in the paging message. Still alternatively, the MME may judge to which cell being served thereby, which belongs to the TAI in the TAI list, the paging message is sent and may include only this TAI list in a paging message to be transmitted to this cell.

Here, for example, in Step ST3713, a paging signal is transmitted to the first DeNB#1 that belongs to the first TAI#1 included in the TAI list_UE#1 (other), and thus, only the TAI list_UE#1 (other) is included in the paging message to be transmitted in Step ST3713.

The first DeNB#1 checks the TAI list of the first UE#1 in the paging message. The TAI list of the first UE#1 includes the first TAI#1 of the own cell, and thus, the first DeNB#1 transmits the paging signal to the first UE#1 in Step ST3714.

In Steps ST3715 and ST3716, the MME for UE further transmits the paging signal also to the third TAI#3 included in the TAI list_UE#1 (RN). In this case, the TAI list to be included in the paging message is similar to the above.

The RN checks the TAI list of the first UE#1 in the paging message. The TAI list of the first UE#1 includes the third TAI#3 of the own cell, and thus, the RN transmits the paging signal to the first UE#1 in Step ST3717.

The second DeNB#2 proxies the paging message by the method disclosed in the fifth embodiment described above. The first UE#1 is served by the first DeNB#1 and is not served by the RN, and accordingly, the first UE#1 does not receive the paging signal from the RN in Step ST3717 but can receive the paging signal from the first DeNB#1 in Step ST3714.

Meanwhile, in a case where an incoming call is made to the second UE#2 in Step ST3712 after moving of the RN, the MME for UE transmits the paging signal using two TAI lists of the second UE#2 in Step ST3711, the TAI list_UE#2 (other) and TAI list_UE#2 (RN).

As in the case of the first UE#1, in Step ST3718, the MME for UE transmits the paging signal to the first DeNB#1 that belongs to the first TAM included in the TAI list_UE#2 (other). The first DeNB#1 checks the TAI list of the second UE#2 in the paging message. The TAI list of the second UE#2 includes the first TAI#1 of the own cell, and accordingly, the first DeNB#1 transmits the paging signal to the second UE#2 in Step ST3719.

In Steps ST3720 and ST3721, the MME for UE further transmits the paging signal also to the RN that belongs to the third TAI#3 included in the TAI list_UE#2 (RN).

The RN checks the TAI list of the second UE#2 in the paging message. The TAI list of the second UE#2 includes the third TAI#3 of the own cell, and accordingly, the RN transmits the paging signal to the second UE#2 in Step ST3722.

The second DeNB#2 proxies the paging message by the method disclosed in the fifth embodiment described above. The second UE#2 is served by the RN and is not served by the first DeNB#1, and accordingly, the second UE#2 does not receive the paging signal from the first DeNB#1 in Step ST3719 but can receive the paging signal from the RN in Step ST3722.

As described above, the MME manages two TAI lists for one UE, specifically, the TAI list for mobile RN and the TAI list for other cell, and accordingly, the MME can perform an incoming call process via the DeNB or RN to which the UE is connected even if the UE is in the RRC_Idle state. Thus, the UE can communicate with the core network.

Even if the TAI of the RN and the TAI of other cell are included in the same TAI list, the MME is capable of performing an incoming call process via the DeNB or RN to which the UE is connected. Thus, the UE can communicate with the core network.

The TAI of the RN and the TAI of other cell can be accordingly included in the same TAI list, preventing a situation in which the UE repeatedly moves between the RN and DeNB or between the neighbour eNBs and TAUs repeatedly occur. This results in a reduction in signaling load.

As disclosed in FIG. 37, the UE does not need to recognize that there are two TAI lists. Therefore, the operation of the UE does not need to be changed from the conventional one. This can avoid control from becoming complicated.

In the method disclosed in this modification, the MME always holds two TAI lists for one UE and thus transmits a paging signal also to a cell in the TA including no UE. This results in an increase in signaling load as a communication system.

Here, the method of deleting an unnecessary TAI list is disclosed. One of the TAI lists is deleted when a TAU occurs next or when the UE changes to the RRC_Connected state. A specific example thereof is disclosed below.

FIG. 38 is a diagram showing a sequence in which an MME deletes one of the TAI lists when a UE changes to the RRC_Connected state.

In Step ST3701, the first UE#1 is in the RRC_Idle state to be served by the RN. In Step ST3702, the second UE#2 is in the RRC_Idle state to be served by the RN.

In Step ST3710, the RN is RRC-connected to the second DeNB#2.

In Step ST3711, the MME for UE manages two TAI lists for the first UE#1, specifically, the TAI list_UE#1 (RN) and TAI list_UE#1 (other). Similarly, in Step ST3711, the MME for UE manages two TAI lists for the second UE#2, specifically, the TAI list_UE#2 (RN) and TAI list_UE#2 (other).

The TAI list_UE#1 (RN) includes a third TAI#3 of a TA to which the RN belongs. The TAI list_UE#1 (other) includes a first TAI#1 of a TA to which the DeNB to be connected with the RN belongs.

Similarly, the TAI list_UE#2 (RN) includes the third TAI#3 of the TA to which the RN belongs. The TAI list_UE#2 (other) includes the first TAM of the TA to which the DeNB to be connected with the RN belongs.

Thus, in Step ST3704, the TAI list_UE#1 of the first UE#1 includes the first TAI#1 and third TAI#3. Similarly, in Step ST3706, the TAI list_UE#2 of the second UE#2 includes the first TAI#1 and third TAI#3.

When starting communication, in order to notify the MME for UE of a service request, in Step ST3802, the first UE#1 performs the process of establishing the RRC connection with the first DeNB#1, to thereby being RRC-connected therewith. Then, the first UE#1 shifts to the RRC_connected state.

In Step ST3802, the first UE#1 that has changed to the RRC_connected state in Step ST3802 transmits a service request to the first DeNB#1. In Step ST3803, the first DeNB#1 transmits the service request to the MME for UE.

In Step ST3803, the first DeNB#1 includes at least any one of the cell identity of the own cell and the TAI of the own cell in the service request of the first UE#1. The MME for UE that has received the service request recognizes that the first UE#1 is served by the first DeNB#1. This allows the MME for UE to recognize that the first UE#1 is not served by the RN.

In Step ST3813, the MME for UE deletes or empties the TAI list_UE#1 (RN) of the first UE#1.

The TAI list of the first UE#1 has been changed, and accordingly, in Steps ST3805 and ST3804, the MME for UE transmits a TAI list update message indicative of the updated TAI list to the first UE#1 via the first DeNB#1. In Steps ST3805 and ST3804, the MME for UE transmits the TAI list update message, by including the updated TAI list_UE#1 therein. The TAI list_UE#1 includes only the first TAI#1. This TAI list update message may be S1 signaling.

The first UE#1 receives the TAI list update message in Step ST3804 and, in Step ST3806, updates the TAI included in the TAI list. Here, the third TAI#3 is deleted and the first TAI#1 is left in the TAI list.

The case of the second UE#2 is disclosed, which is performed by a method similar to that of the first UE#1.

When starting communication, in order to notify the MME for UE of a service request, in Step ST3807, the second UE#2 performs the process of establishing RRC connection with the RN, to thereby being RRC_connected therewith. Then, the second UE#2 changes to the RRC_Co-nnected state.

In Step ST3807, the second UE#2 that has changed to the RRC_connected state in Step ST3807 transmits a service request to the RN. In Step ST3808, the RN transmits the service request to the MME for UE.

In Step ST3808, the RN includes at least any one of the cell identity of the own cell and the TAI of the own cell in the service request of the second UE#2. The transmission from the RN to the MME for UE is performed via the second DeNB#2, and the second DeNB#2 serves as a proxy to the MME for UE. The MME for UE that has received the service request recognizes that the second UE#2 is served by the RN. This allows the MME for UE to recognize that the second UE#2 is not served by the first DeNB#1.

In Step ST3809, the MME for UE deletes or empties the TAI list_UE#2 (other) of the second UE#2.

The TAI list of the first UE#2 has been changed, and accordingly, in Steps ST3810 and ST3811, the MME for UE transmits a TAI list update message indicative of the updated TAI list to the second UE#2 via the RN. In Steps ST3810 and ST3811, the MME for UE transmits the TAI list update message, by including the updated TAI list_UE#2 therein. The TAI list_UE#2 includes only the third TAI#3. This TAI list update message may be S1 signaling.

The transmission from the MME for UE to the RN is performed via the second DeNB#2, and the second DeNB#2 serves as a proxy to the RN. In Step ST3811, the second UE#2 receives a TAI list update message. In ST3812, then, the second UE#2 updates the TAI included in the TAI list. In Step ST3812, the first TAM is deleted and the third TAI#3 is left in the TAI list.

As a result, the MME does not always hold two TAI lists for one UE and thus can prevent from transmitting a paging signal also to the cell in the TA including no UE. This can prevent an increase in signaling load as a communication system.

The TAI lists held by the MME for UE can be reduced as well, resulting in a reduction in storage capacity of the MME. This can reduce a manufacturing cost of an MME.

FIG. 38 shows the case in which the UE changes to the RRC_connected state, which may be a case in which the UE activates the TAU, and similar effects can be achieved.

In Step ST3709 of FIG. 37, the MME for UE may recognize the TAI of the DeNB to be connected with the RN. In Step ST3709, the RN that has moved from the first DeNB#1 to the second DeNB#2 is subjected to the HO process and the TAU process. These processes allow the MME for RN to recognize that the RN has been connected to the second DeNB#2. The MME for RN and MME for UE are configured to exchange the information regarding the DeNB connected with the RN, for example, the cell identity and a TAI to which the cell belong. This enables the MME for UE to recognize the TAI of the DeNB to be connected with the RN.

In Step ST3711, the MME for UE may update the TAI list of the UE. In Step ST3711, the MME for UE that has recognized the TAI of the DeNB to be connected with the RN updates the TAI lists of the first UE#1 and second UE#2. The second TAI#2 is added to the TAI list_UE#1 (other) of the first UE#1. Also, the second TAI#2 is added to the TAI list_UE#2 (other) of the second UE#2. The TAI list has been changed, and accordingly, the MME for UE notifies the first UE#1 and the second UE#2 of the updated TAI lists. The TAI list update method disclosed in FIG. 38 may be used as the notification method.

As a result, as to the first UE#1 and second UE#2, the TAI list includes the TAI of the second DeNB#2 to be connected with the RN. Thus, the UE that has moved together with the RN does not need to generate a TAU process if it has moved between the DeNB and RN. This results in a further reduction in signaling load.

In the method described above, the UE is required to have only one TAI list and not required to have two TAI lists. However, the UE may have two TAI lists similarly to the TAI lists of the MME. In this case, the UE and MME can manage those as the same TAI list, reducing malfunctions as much as possible in the operation of the TAI list.

Second Modification of Fifth Embodiment

This modification discloses another method for solving the problem described in the fifth embodiment. The source MME and target MME both have or manage the TAI list for one UE. In a case where the source MME is identical to the target MME, the MME may have and manage one TAI list of the UE.

Through the above, if the MME does not recognize whether or not a UE in the RRC_Idle state has moved together with an RN, the source MME and target MME can both page the UE when an incoming call is made to the UE. Consequently, the UE can communicate with the core network. A specific example thereof is disclosed below.

Figure 39:
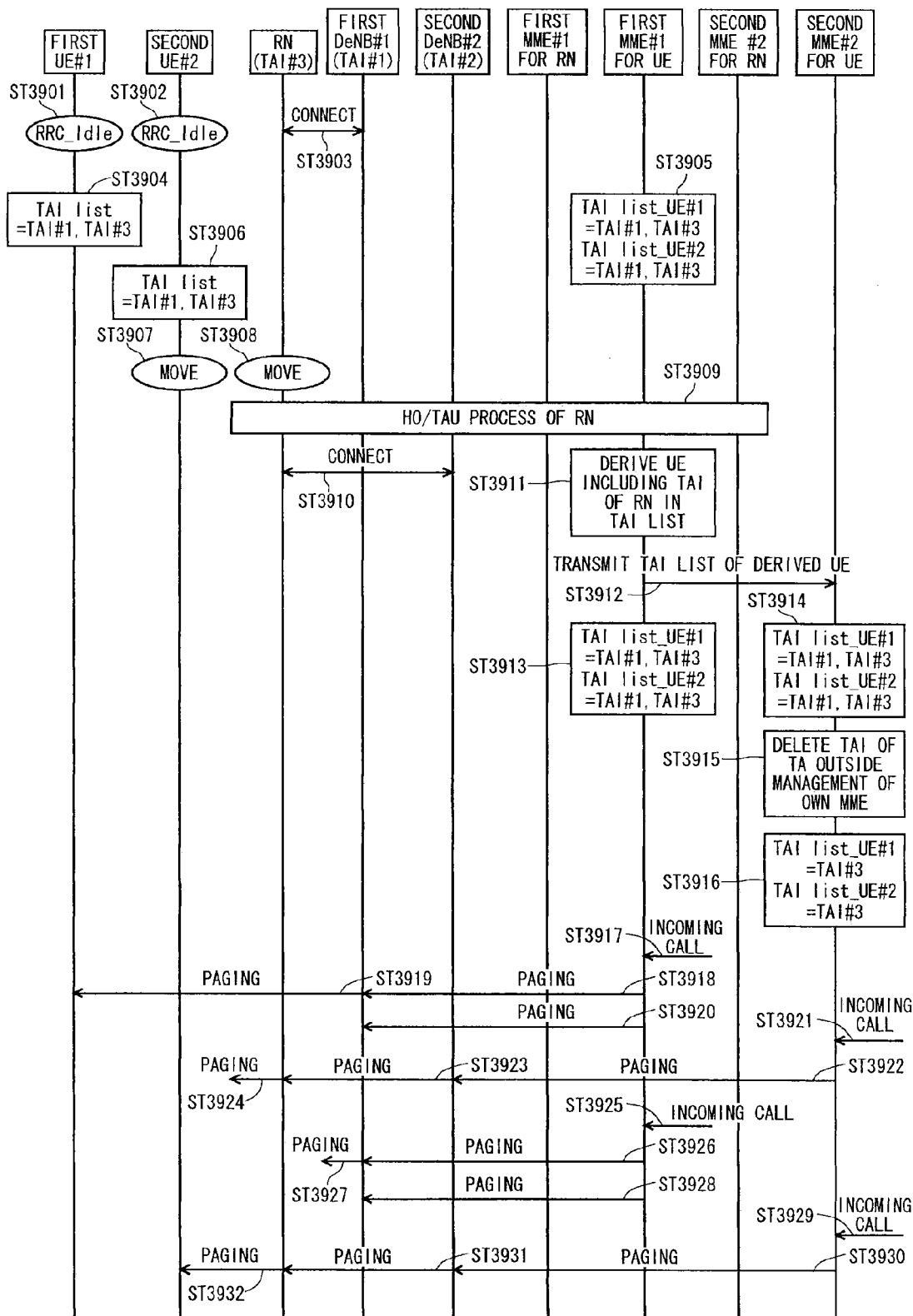
FIG. 39 is a diagram showing a sequence when an RN moves in a case where a source MME and a target MME both manage TAI lists for one UE.

FIG. 39 is a diagram showing a sequence when an RN moves in a case where the source MME and target MME both manage the TAI list for one UE. FIG. 39 shows the case in which the RN has performed inter-MME HO.

In Step ST3901, the first UE#1 is in the RRC_Idle state to be served by the RN. In Step ST3902, the second UE#2 is in the RRC_Idle state to be served by the RN.

In Step ST3903, the RN is RRC-connected to the first DeNB#1. In Step ST3905, the first MME for UE is connected to the first DeNB#1. In Step ST3905, the first MME for UE manages the TAI lists of the first UE#1 and second UE#2. The TAI list_UE#1 includes the third TAI#3 of a TA to which the RN belongs and a first TAI#1 of a TA to which the first DeNB#1 belongs. Similarly, the TAI list_UE#2 includes the third TAI#3 of the TA to which the RN belongs and first TAI#1 of the TA to which the first DeNB#1 belongs.

Thus, in Step ST3904, the TAI list_UE#1 of the first UE#1 includes the first TAI#1 and third TAI#3. Similarly, in Step ST3906, the TAI list_UE#2 of the second UE#2 includes the first TAI#1 and third TAI#3.

In Step ST3907, the second UE#2 moves together with the RN. In Step ST3908, the RN moves from being served by the first DeNB#1 to being served by the second DeNB#2. The first UE#1 remains at an original location.

In Step ST3909, the HO/TAU process is performed among the RN, first DeNB#1, second DeNB#2, first MME#1 for RN, and second MME#2 for RN. In Step ST3910, the RN is RRC-connected to the second DeNB#2.

The first UE#1 remaining at the original location is served by the first DeNB#1, and thus compares the first TAI#1 to which the first DeNB#1 belongs with the TAI of the own TAI list and judges that the first TAI#1 is located. The first UE#1 accordingly does not activate the TAU.

The TAU process of the first UE#1 is not performed, and thus, the first MME#1 for UE does not change the TAI list_UE#1.

Meanwhile, the TA to which the second UE#2 belongs remains unchanged, which is the third TAI#3, and thus, the first MME#1 for UE does not change the TAI list_UE#2.

In Step ST3911, the first MME#1 for UE derives the UE including the TAI of the RN that has moved in the TAI list.

It suffices that before performing the process of Step ST3911, the first MME#1 for RN notifies the first MME#1 for UE of the TAI of the RN that has moved.

Here, in Step ST3909, the first MME#1 for RN notifies the first MME#1 for UE of the TAI of the RN that has moved. This enables the first MME#1 for UE to recognize the TAI of the RN that has moved and to derive the UE including the TAI of the RN that has moved in the TAI list.

It suffices that in Step ST3909, the first MME#1 for RN notifies the first MME#1 for UE of the identity of the MME being the target for the RN that has moved. This allows the first MME#1 for UE to recognize the MME being the target for the RN that has moved.

The first MME#1 for UE detects that the TAI list_UE#1 and TAI list_UE#2 include the third TAI#3 of the RN using the TAI list. The first MME#1 for UE accordingly judges that the first UE#1 and second UE#2 include the third TAI#3 of the RN.

In Step ST3912, the first MME#1 for UE notifies the second MME#2 for UE being the target for the RN of the TAI list of the UE together with the identity of the derived UE. The first MME#1 for UE may notify the target second MME#2 for RN of the TAI list of the UE together with the identity of the derived UE. It suffices that in that case, the target second MME#2 for RN notifies the target second MME#2 for UE of this information.

In Step ST3914, the second MME#2 for UE creates the TAI lists of the first UE#1 and second UE#2, specifically, the TAI list_UE#1 and TAI list_UE#2. As a result, the TAI lists same as the TAI lists of the first UE#1 and second UE#2 in the first MME#1 for UE are created on the second MME#2 for UE.

In Step ST3913, the first MME#1 for UE continuously holds the TAI lists of the first UE#1 and second UE#2. As a result, the TAI lists of the first UE#1 and second UE#2 are possessed by both of the first MME#1 for UE and second MME#2 for UE.

Here, the first MME#1 for UE notifies the second MME#2 for UE being the target for the RN of the TAI list of the UE together with the identity of the derived UE. Alternatively, the second MME#2 for UE being the target for the RN may notify the source first MME#1 for UE of the information indicating that the notification of the TAI list of the UE is requested together with the identity of the derived UE. The first MME#1 for UE that has received this information may notify the target second MME#2 for UE of the TAI list of the UE together with the identity of the derived UE. In this case, the first MME#1 for UE may make a notification via the source first MME#1 for RN and the target second MME#2 for RN.

The target MME may delete the TAI ineffective in the own MME from the TAI list of the UE. For example, in a case where the RN has performed inter-MME HO, in some cases, the target MME cannot manage the TA managed by the source MME. In such cases, the target MME deletes the TAI ineffective in the own MME, and then, updates the TAI list of the UE with the left TAI. Meanwhile, the TAI list of the UE in the source MME is not changed and is left as it is.

Through the above, the TAI list of the UE that is managed by the target MME is appropriately updated and does not include an unnecessary TA. This prevents the transmission of a paging signal also to an unnecessary cell, resulting in a reduction in signaling load.

FIG. 39 shows a case in which the second MME #2 deletes the TAI of the TA outside management of the own MME. In Step ST3915, the second MME#2 for UE deletes the TAI of the TA outside management of the own MME. The second MME#2 for UE deletes the first TAI#1 that is not managed by the second MME#2 for UE from the TAI lists of the first UE#1 and second UE#2.

Consequently, in Step ST3916, the TAI list_UE#1 of the first UE#1 includes only the third TAI#3 and the TAI list_UE#2 of the second UE#2 includes only the third TAI#3. Here, the TAI lists of the first UE#1 and second UE#2 are changed in the second MME #2, which may be managed only in the MME and may be not notified to the UEs.

The UEs may be managed between the MME and HSS by the source MME and target MME. For example, the HSS has information per UE. The identity of the MME in which the UE is located is included in the information. A plurality of identities may be included as the identity of the MME. The identity of the source MME and the identity of the target MME are both held (recorded) in the HSS as the identity of the MME in which the UE is located, so that the HSS that has been requested the information of the UE can notify the identities of both of the source and target MMEs. As a result, the source and target MMEs are both notified of an incoming call signal when, for example, an incoming call is made. The source and target MMEs that have received the incoming call signal can both page the UE.

The UE does not recognize that the source MME and target MME each include the TAI list. Therefore, only one TAI list is required in the UE.

In a case where an incoming call is made to the first UE#1 after moving of the RN, the HSS that has been requested the information of the first UE#1 notifies the source node of the identities of the first MME #1 and second MME #2. Consequently, the MMEs of the first MME #1 and second MME #2 are notified of the incoming call signal to the first UE#1.

The first MME#1 for UE that has received the incoming call signal in Step ST3917 transmits a paging signal using the TAI list_UE#1 of the first UE#1 in Step ST3913. Specifically, in Step ST3918, the first MME#1 for UE transmits the paging signal to the first DeNB#1 that belongs to the first TAI included in the TAI list_UE#1. The first DeNB#1 checks the TAI list of the first UE#1 in the paging message. The TAI list of the first UE#1 includes the first TAM of the own cell, and thus, in Step ST3919, the first DeNB#1 transmits the paging signal to the first UE#1.

In Step ST3920, the first MME#1 for UE further transmits the paging signal also to the RN that belongs to the third TAI#3 included in the TAI list_UE#1. However, the RN has moved, and is thus not connected to the first DeNB#1. Accordingly, the first DeNB#1 cannot proxy the paging signal to the RN. Therefore, the paging signal is not transmitted to the RN.

Meanwhile, the second MME#2 for UE that has received the incoming call signal in Step ST3921 transmits the paging signal using the TAI list_UE#1 of the first UE#1 in Step ST3916. Specifically, in Step ST3922, the second MME#2 for UE transmits the paging signal to the second DeNB#2. In Step ST3923, the second DeNB#2 transmits the paging signal to the RN that belongs to the third TAI#3 included in the TAI list_UE#1. The second DeNB#2 proxies the paging signal to the RN.

The RN checks the TAI list of the first UE#1 in the paging message. The TAI list of the first UE#1 includes the third TAI#3 of the own cell, and thus, in Step ST3924, the RN transmits the paging signal to the first UE#1.

The first UE#1 is served by the first DeNB#1 but is not served by the RN, and thus, the first UE#1 does not receive the paging signal from the RN in Step ST3924. The first UE#1 can receive the paging signal from the first DeNB#1 in Step ST3919.

Also in a case where an incoming call is made to the second UE#2 after moving of the RN, the HSS that has been requested the information of the second UE#2 notifies the source node of the identities of the first MME #1 and second MME #2, as in the case where an incoming call is made to the first UE#1. As a result, the MMEs, the first MME #1 and second MME #2, are both notified of the incoming call signal to the second UE#2.

The first MME#1 for UE that has received the incoming call signal in Step ST3925 transmits a paging signal using the TAI list_UE#2 of the second UE#2 in Step ST3913. Specifically, in Step ST3926, the first MME#1 for UE transmits a paging signal to the first DeNB#1 that belongs to the first TAI#1 included in the TAI list_UE#2. The first DeNB#1 checks the TAI list of the second UE#2 in the paging message. The TAI list of the second UE#2 includes the first TAI#1 of the own cell, and thus, the first DeNB#1 transmits the paging signal to the second UE#2 in Step ST3927.

In Step ST3928, the first MME#1 for UE further transmits the paging signal also to the RN that belongs to the third TAI#3 included in the TAI list_UE#2. However, the RN has been moved and is not connected to the first DeNB#1, and thus, the first DeNB#1 cannot proxy the paging signal to the RN. Thus, the paging signal is not transmitted to the RN.

Meanwhile, the second MME#2 for UE that has received an incoming call signal in Step ST3929 transmits a paging signal using the TAI list_UE#2 of the second UE#2 in Step ST3916. Specifically, in Step ST3930, the second MME#2 for UE transmits the paging signal to the second DeNB#2. In Step ST3931, the second DeNB#2 transmits the paging signal to the RN that belongs to the third TAI#3 included in the TAI list_UE#2. The second DeNB#2 proxies the paging signal to the RN. The RN checks the TAI list of the second UE#2 in the paging message. The TAI list of the second UE#2 includes the third TAI#3 of the own cell, and thus, in Step ST3932, the second DeNB#2 transmits the paging signal to the second UE#2.

The second UE#2 is served by the RN but is not served by the first DeNB#1, and thus, the second UE#2 does not receive the paging signal from the first DeNB#1 in Step ST3927. The second UE#2 can receive the paging signal from the RN in Step ST3932.

The method disclosed in this modification allows the MME to perform the incoming call process via a DeNB or RN to be connected with the UE even if the UE is in the RRC_Idle state. The UE can accordingly communicate with the core network.

Even if the TAI of the RN and the TAI of other cell are included in the same TAI list, the MME can perform the incoming call process via the DeNB or RN to be connected with the UE. The UE can accordingly communicate with the core network.

The TAI of the RN and the TAI of other cell can be included in the same TAI list, thereby preventing a situation in which the UE repeatedly moves between the RN and DeNB or between neighbour eNBs and the TAU repeatedly occurs. This results in a reduction in signaling load.

The UE does not need to recognize that there are two TAI lists. Thus, the operation of the UE is not required to be changed from the conventional one, avoiding control from becoming complicated. Also in a case where the RN performs inter-MME HO, the UE can communicate with the core network.

The process of deleting the unnecessary TAI list of the MME is provided. In a case where the TAI list of the UE of any one of the source MME and target MME becomes unnecessary, the unnecessary TAI list of the UE of one MME is deleted. The other TAI list is deleted when the TAU occurs next or when the UE next changes to the RRC_Connected state. The unnecessary location information of the UE in the HSS may be deleted. A specific example thereof is disclosed below.

FIG. 40 is a diagram showing a sequence in which an MME deletes one TAI list when the UE changes to the RRC_Connected state.

In Step ST3901, the first UE#1 is in the RRC_Idle state to be served by the RN. In Step ST3902, the second UE#2 is in the RRC_Idle state to be served by the RN.

In Step ST3910, the RN is RRC-connected to the second DeNB#2.

In Step ST3905, the first MME#1 for UE manages the TAI list_UE#1 of the first UE#1 and the TAI list_UE#2 of the second UE#2. The TAI list_UE#1 includes a third TAI#3 of a TA to which the RN belongs and a first TAI#1 of a TA to which the first DeNB#1 belongs. Similarly, the TAI list_UE#2 includes the third TAI#3 and first TAI#1.

In Step ST3916, the second MME#2 for UE manages the TAI list_UE#1 of the first UE#1 and the TAI list_UE#2 of the second UE#2. The TAI list_UE#1 includes the third TAI#3 of the TA to which the RN belongs. Similarly, the TAI list_UE#2 includes the third TAI#3.

In Step ST3904, the TAI list_UE#1 of the first UE#1 includes the first TAM and third TAI#3. Similarly, in Step ST3906, the TAI list_UE#2 of the second UE#2 includes the first TAI#1 and third TAI#3.

When starting communication, in order to notify the MME for UE of a service request, in Step ST4003, the second UE#2 performs the process of establishing RRC connection with the RN, to thereby being RRC-connected therewith. Then, the second UE#2 changes to the RRC_Connected state.

In Step ST4003, the second UE#2 that has changed to the RRC_connected state in Step ST4003 transmits a service request to the RN. In Step ST4004, the RN transmits a service request to the second MME#2 for UE.

In Step ST4004, the RN includes at least any one of the cell identity of the own cell and the TAI of the own cell in the service request of the second UE#2. The transmission from the RN to the second MME#2 for UE is performed via the second DeNB#2, and the second DeNB#2 serves as a proxy to the second MME#2 for UE.

In Step ST4005, the second MME#2 for UE that has received the service request judges that the second UE#2 is served by the RN. The second MME#2 for UE accordingly recognizes that the second UE#2 is not served by the first DeNB#1.

In Step ST4006, the second MME#2 for UE transmits, to the first MME#1 for UE, a TAI list deletion request signal, specifically, a signal for requesting the deletion of the TAI list_UE#2 of the second UE#2. The information for requesting the deletion of a TAI list is included in the TAI list deletion request signal together with the identity (UE-ID) of the UE whose TAI list is deleted.

In Step ST4007, the first MME#1 for UE that has received the signal for requesting the deletion of the TAI list_UE#2 deletes the TAI list_UE#2 of the second UE#2. As a result, the TAI list of the second UE#2 is deleted from the TAI lists in the first MME#1 for UE.

In Step ST4008, the TAI list_UE#1 of the first UE#1 is managed as it is in the first MME#1 for UE.

Next, the case of the first UE#1 is disclosed. A method similar to that in the case of the second UE#2 is performed for the first UE#1.

When starting communication, in order to notify the first MME#1 for UE of a service request, in Step ST4010, the first UE#1 performs the process of establishing the RRC connection with the first DeNB#1, to thereby being RRC-connected therewith. Then, the first UE#1 changes to the RRC_Connected state.

In Step ST4010, the first UE#1 that has changed to the RRC_connected state in Step ST4010 transmits a service request to the first DeNB#1. In Step ST4009, the first DeNB#1 transmits the service request to the first MME#1 for UE.

In Step ST4009, the first DeNB#1 includes at least any one of the cell identity of the own cell and the TAI of the own cell in the service request of the first UE#1. In Step ST4011, the first MME#1 for UE that has received the service request judges that the first UE#1 is served by the first DeNB#1. The first MME#1 for UE accordingly recognizes that the first UE#1 is not served by the RN.

In Step ST4012, the first MME#1 for UE transmits, to the second MME#2 for UE, a TAI list deletion request signal, specifically, a signal for requesting the deletion of the TAI list_UE#1 of the first UE#1. The information for requesting the deletion of a TAI list is included in the TAI list deletion request signal together with the identity (UE-ID) of the UE whose TAI list is deleted.

In Step ST4013, the second MME#2 for UE that has received the signal for requesting the deletion of the TAI list_UE#1 deletes the TAI list_UE#1 of the first UE#1. As a result, the TAI list of the first UE#1 is deleted from the TAI lists in the second MME#2 for UE.

In Step ST4014, the TAI list_UE#2 of the second UE#2 is managed as it is in the second MME#2 for UE.

The TAI list of the first UE#1 is not changed in the first MME#1 for UE, and thus, the first MME#1 for UE does not need to transmit the updated TAI list to the first UE#1.

The TAI list of the second UE#2 is changed in the second MME#2 for UE, and thus, in Step ST4015, the second MME#2 for UE transmits the updated TAI list to the RN via the second DeNB#2.

In Step ST4016, the RN transmits the updated TAI list to the second UE#2. In the sequence shown in FIG. 40, in Steps ST4015 and ST4016, the updated TAI list_UE#2 is included in a TAI list update message and then is transmitted. The TAI list_UE#2 includes only the third TAI#3. The TAI list update message may be S1 signaling.

In Step ST4017, the second UE#2 that has received the TAI list update message in Step ST4016 updates a TAI included in the TAI list. In Step ST4017, the first TAM is deleted and the third TAI#3 is left in the TAI list.

The method of deleting the unnecessary location information of the UE in the HSS is disclosed.

With reference to FIG. 40, the first MME#1 for UE notifies the HSS of the identity of the own MME, the identity of the second UE#2 whose location information is deleted, and the information indicating that the first MME #1 is deleted from the location information of the second UE#2 in the HSS for the UE. The HSS that has received this information deletes the location information of the first MME #1 from the location information of the second UE#2.

Similarly, the second MME#2 for UE notifies the HSS of the identity of the own MME, the identity of the first UE#1 whose location information is deleted, and the information indicating that the second MME #2 is deleted from the location information of the first UE#1 in the HSS for the UE. The HSS that has received this information deletes the location information of the second MME #2 from the location information of the first UE#1.

The unnecessary TAI list of the MME and location information in the HSS are deleted, which avoids the MME and HSS from continuously holding the unnecessary information, resulting in a reduction in unnecessary paging to a cell. This can reduce a signaling load. Also, the storage capacities of the MME and HSS can be reduced. This results in reductions in manufacturing costs of the MME and HSS.

Third Modification of Fifth Embodiment

This modification discloses another method for solving the problem described in the fifth embodiment. After moving, the RN performs polling on the UEs to be served thereby, which are in the RRC_Idle state. The information for polling may be provided to the system information. The information for polling may be a minimum information amount, one bit. For example, polling is necessary when the information for polling is "1" or polling is not necessary when the information for polling is "0".

The RN sets the information for polling in the system information to "1" and broadcasts this. In a case where the information for polling is changed from "0" to "1", the RN performs, on the UE being served thereby, the process of correcting the system information. The RN notifies the UE being served thereby that the system information has been corrected through paging. Then, the RN broadcasts, to the UE being served thereby, the changed information for polling "1" as the system information. The UE recognizes that the system information has been corrected through paging and receives the system information to be broadcast. As a result, the UE in the RRC_Idle state can receive the changed information for polling.

In the case where the information for polling is "1", the UE that has received the broadcast information and obtained the information for polling recognizes that polling is necessary and transmits a signal indicative of its presence to the RN. In the case where the information for polling is "0", the UE does nothing. A random access procedure may be activated as the method in which a UE transmits a signal indicative of its presence to the RN. The RN that has received a random access signal through the random access procedure recognizes that the UE is served thereby.

In finishing polling, the RN sets the information for polling to "0" and broadcasts this. The method of notifying the UEs being served thereby is similar to that in a case where the RN performs polling.

The RN may perform polling on the UEs to be served thereby, which are in the RRC_Connected state. Polling may be performed for connection confirmation. For example, it can be checked whether or not an equipment or the like performing the DRX operation has not moved to other cell during DRX. The method disclosed in this modification is also applicable to the polling on the UEs in the RRC_Connected state.

Examples of the case in which the RN activates polling may include a case in which the RN has completed the HO process, a case in which the RN has completed the connection with a target DeNB, a case in which the RN has transmitted a HO confirm signal to the target MME, a case in which the RN transmits a TAU request signal to a target MME, and a case in which the RN transmits a TAU completion signal to a target MME.

As the case in which the RN ends polling, it suffices that a predetermined period has elapsed after the activation of polling. Alternatively, it suffices that a predetermined period has elapsed after the execution of the process of correcting the system information by the RN. The predetermined period may be determined in advance. The predetermined period may be managed by a timer.

As another method in which an RN performs polling, the information for polling may be included in the paging message. Paging allows the RN to notify the UE being served thereby of the information for polling. The system information does not need to be changed unlike the above-mentioned method, simplifying control of the RN and UE.

After moving of the RN, the target MME for RN or target MME for UE may perform polling on UEs being served by the RN, which are in the RRC_Idle state, via the RN that has moved. Alternatively, the source MME for RN or source MME for UE may perform polling on UEs being served by the DeNB, which are in the RRC_Idle state, via the DeNB to which the RN has been connected before moving.

As the method in which the MME performs polling, a paging message may be used. The information for polling may be provided in the paging message. The information for polling may be a minimum information amount, one bit. For example, polling is necessary in a case where the information for polling is "1", or polling is not necessary in a case where the information for polling is "0".

The MME sets the information for polling in the paging message to "1" and notifies the UE of this via the RN. In the case where the information for polling is "1", the UE that has received the paging message and obtained the information for polling recognizes that polling is necessary, and transmits a signal indicative of its presence to the MME via the RN. In the case where the information for polling is "0", the UE does nothing. As the method in which the UE transmits a signal indicative of its presence to the MME, the UE may transmit an initial UE message. In this case, the RN may include the cell identity of the own RN in the initial UE message and then transmits the initial UE message to the MME. The MME that has received the initial UE message via the RN recognizes that a UE is served by the RN.

As a result, the RN or MME can recognize whether or not the UE in the RRC_Idle state has moved together with the RN. Accordingly, in a case where an incoming call is made to the UE, the source MME and target MME can both page the UE. This allows the UE to communicate with the core network.

The methods disclosed in the fifth embodiment to the third modification of the fifth embodiment described above and the method disclosed in the second embodiment or the first modification of the second embodiment described above may be used in combination. The MME can manage the mobility of the UE being served by the RN if the UE being served by the RN is in the RRC_Connected state or RRC_Idle state. The communication between the UE and core network is accordingly allowed.

For example, in a case where the method disclosed in the fifth embodiment described above and the method disclosed in the second embodiment or the first modification of the second embodiment described above are used in combination, as to the UE being served by the RN, which is in the RRC_Connected state, the method disclosed in the second embodiment or the first modification of the second embodiment described above may be applied in the HO/TAU process of the RN in Step ST3609 of FIG. 36.

Sixth Embodiment

The first modification of the second embodiment above has disclosed the method of transmitting and receiving the information regarding a UE between a target MME and a source MME. The information regarding a UE being served by the RN is transmitted and received between the source MME and target MME, and thus, the method of activating the TAU process of the UE is disclosed.

Here, another method is disclosed.

In the TAU process of the RN, the transmission and reception of the information regarding a UE being served by an RN as well as the transmission and reception of the information regarding the RN are performed between the source MME and target MME. A specific example of the TAU process of the RN in this embodiment is disclosed below.

Figure 41:
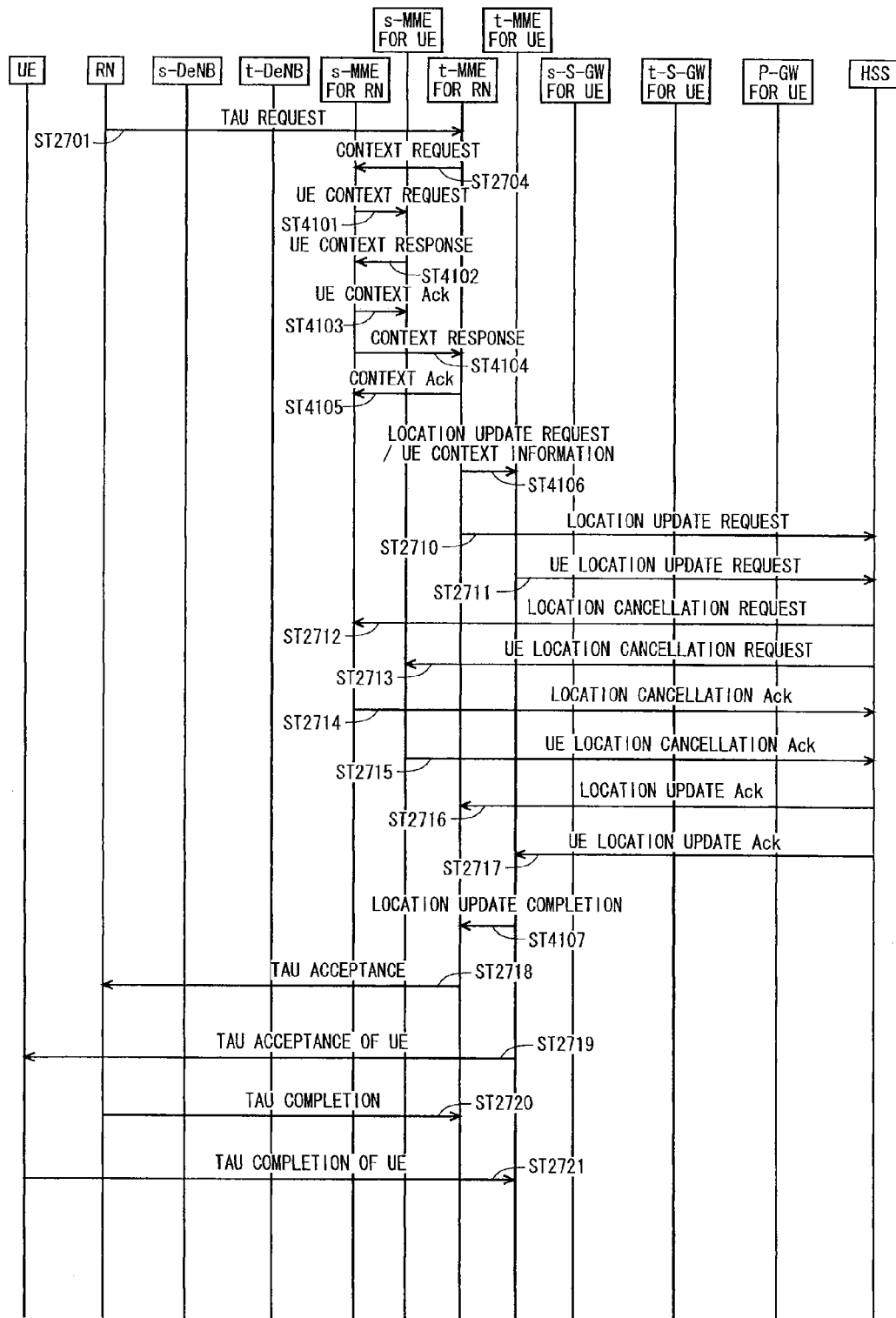
FIG. 41 is a diagram showing a sequence in a case where, in a TAU process of an RN, the transmission and reception of the information regarding a UE being served by the RN as well as the transmission and reception of the information regarding the RN are performed between a source MME and a target MME.

FIG. 41 is a diagram showing a sequence in a case where in the TAU process of the RN, the transmission and reception of the information regarding a UE being served by an RN as well as the transmission and reception of the information regarding the RN are performed between the source MME and target MME. The sequence shown in FIG. 41 is similar to the sequence shown in FIG. 27, and thus, the same steps are denoted by the same step numbers, and common description is omitted.

In Step ST2701, the RN activates the TAU and transmits a TAU request signal to the target MME for RN.

The RN transmits the identity of a UE being served by the RN to the target MME for RN together with the TAU request signal. Further, the RN may transmit the identity of the RN together.

After receiving the TAU request signal from the RN in Step ST2701, the target MME for RN performs the TAU process of the RN.

In Step ST2704, the target MME for RN transmits a context request signal to the source MME for RN. At this time, the target MME for RN transmits the identity of the UE being served by the RN, and further, the identity of the RN together.

Upon receipt of the context request signal in Step ST2704, in Step ST4101, the source MME for RN transmits the context request signal of the UE being served by the RN to the source MME for UE. At this time, the source MME for RN transmits the identity of the UE being served by the RN, and further, the identity of the RN together.

In Step ST4102, the source MME for UE transmits the context information of the UE being served by the RN to the source MME for RN in response to the context request signal of the UE being served by the RN that has been received in Step ST4101.

In Step ST4103, the source MME for RN that has received the context information of the UE being served by the RN transmits a context information acceptance success signal of a UE being served by an RN to the source MME for UE.

In Step ST4104, the source MME for RN that has received the context information of the UE being served by the RN transmits, to the target MME for RN, the context information of the UE being served by the RN together with the context information of the RN.

In Step ST4105, the target MME for RN, which has received the context information of the UE being served by the RN together with the context information of the RN, transmits the context information acceptance success signal of the RN and the UE being served by the RN to the source MME for RN.

In Step ST4106, the target MME for RN, which has received the context information of the UE being served by the RN together with the context information of the RN, transmits the context information of the UE being served by the RN to the target MME for UE. The target MME for RN transmits location update activation request information of a UE being served by an RN, together with the context information. At this time, the identity of the UE being served by the RN may be transmitted together. The RN identity may be transmitted together.

In Steps ST2710, ST2712, ST2714, and ST2716, the target MME for RN that has transmitted the context information acceptance success signal of the RN and the UE being served by the RN in Step ST4105 performs the process of updating the location of the RN.

In Steps ST2711, ST2713, ST2715, and ST2717, the target MME for UE that has received the location update activation request signal of the UE being served by the RN in Step ST4106 performs the process of updating the location of the UE being served by the RN.

After the process of updating the location of the UE being served by the RN, in Step ST4107, the target MME for UE notifies the target MME for RN that the process of updating the location of the UE being served by the RN has been completed.

In Step ST2718, the target MME for RN transmits a TAU acceptance signal to the RN. In Step ST2720, the RN transmits a TAU completion signal to the target MME for RN. Through the above, the TAU processes of the RN have been completed in order.

The transmission of the TAU acceptance signal and the transmission of the TAU completion signal in Steps ST2719 and ST2721 are performed only in a case where there is information to be transmitted to the UE. Not the TAU acceptance signal but other S1 signaling may be used.

As disclosed in this embodiment, in the TAU process of the RN, the transmission and reception of the information regarding the UE being served by the RN as well as the transmission and reception of the information regarding the RN are performed between the source MME and target MME, so that the process equal to the TAU process of the UE being served by the RN is performed.

The source MME and target MME can accordingly recognize that the UE being served by the RN has moved, and can manage the mobility. This allows the target MME to configure and manage the TAI list of the UE, allowing for communication between the UE and core network.

The transmission and reception of the information regarding the UE being served by the RN as well as the transmission and reception of the information regarding the RN are performed, resulting in a reduction in signaling load between the source MME and target MME.

First Modification of Sixth Embodiment

The sixth embodiment above has disclosed that the transmission and reception of information regarding a UE being served by an RN as well as the transmission and reception of the information regarding the RN are performed between the source MME and target MME in the TAU process of the RN. In this modification, the process of updating the location of the UE being served by the RN as well as the process of updating the location of the RN is performed. A specific example of the TAU process of the RN in this modification is disclosed below.

Figure 42:
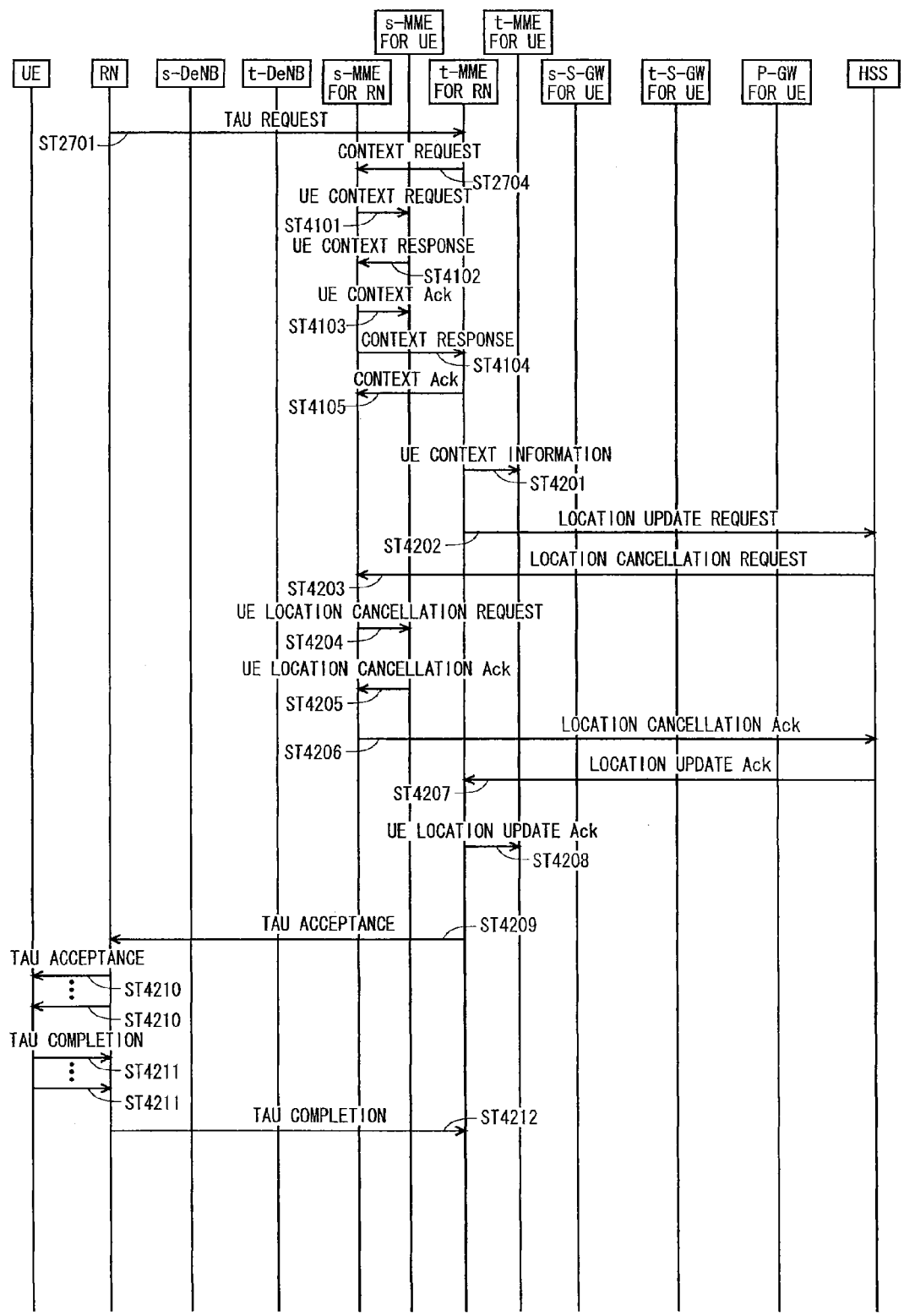
FIG. 42 is a diagram showing a sequence in a case where in a TAU process by an RN, a location update process of the RN and a location update process of a UE being served by the RN are both performed.

FIG. 42 is a diagram showing a sequence in a case where the location update process of the RN and the location update process of the UE being served by the RN are both performed in the TAU process of the RN. The sequence shown in FIG. 42 is similar to the sequence shown in FIG. 41, and thus, the same steps are denoted by the same step numbers and common description is omitted.

In Step ST4201, the target MME for RN that has received the context information of the UE being served by the RN together with the context information of the RN in Step ST4104 transmits the context information of the UE being served by the RN to the target MME for UE. At this time, the identity of the UE being served by the RN is transmitted together. The identity of the RN may be transmitted together.

In Step ST4202, the target MME for RN, which has transmitted the context information acceptance success signal of the RN and the UE being served by the RN in Step ST4105, transmits a location update request signal to the HSS. The information for requesting location update of the RN and the information for requesting location update of the UE being served by the RN are included in the location update request signal. At this time, the identity of the RN and the identity of the UE being served by the RN are transmitted together.

The HSS that has received the location update request signal in Step ST4202 performs the process of updating the location of the RN and the process of updating the location of the UE being served by the RN.

In Step ST4203, the HSS transmits, to the source MME for RN, a location cancellation request signal for requesting a location cancellation. The information for requesting a location cancellation of the RN and the information for requesting a location cancellation of the UE being served by the RN are included in the location cancellation request signal. At this time, the identity of the RN and the identity of the UE being served by the RN may be transmitted together.

The source MME for RN that has received the location cancellation request signal cancels the location of the RN. In Step ST4204, the source MME for RN further transmits a signal for requesting the location cancellation of a UE being served by the RN to the source MME for UE. At this time, the identity of the HE being served by the RN may be transmitted together. The RN identity may be transmitted together.

The source MME for UE that has received the location cancellation request signal of the UE being served by the RN cancels the location of the UE being served by the RN.

In Step ST4205, the source MME for UE transmits a location cancellation completion signal of the UE being served by the RN to the source MME for RN.

In Step ST4206, the source MME for RN, which has recognized that the location of the RN had been cancelled and the location of the UE being served by the RN had been cancelled, notifies the HSS that the cancellations of the locations of the RN and the UE being served by the RN have been completed.

The HSS performs the process of updating the location of the RN and the process of updating the location of the UE being served by the RN. In Step ST4207, the HSS, which has recognized that the locations of the RN and the UE being served by the RN had been canceled, notifies the target MME for RN of a location update completion signal of the RN and the UE being served by the RN.

In Step ST4208, the target MME for RN that has received the location update completion signal notifies the target MME for UE that the location update of the UE being served by the RN has been completed.

Through the above, the location update process of the RN and the location update process of the UE being served by the RN can be performed in the TAU process of the RN.

As a result, signalings can be reduced between the HSS and the source MME and between the HSS and the target MME. The signaling load in the mobility management of the UE being served by the RN can be prevented from increasing.

In Step ST4209, the target MME for RN transmits a TAU acceptance signal to the RN. Included in the TAU acceptance signal are the information indicative of the TAU accept of the RN and the information indicating that the TAU process of the UE being served by the RN has been performed, namely indicating that the context has been forwarded and the location information has been updated and the old location information has been canceled. At this time, the identity of the UE being served by the RN is transmitted together.

In Step ST4210, the RN transmits, to the UE being served thereby, the information indicating that the TAU process of the UE has been performed. FIG. 42 shows this transmitted signal as a TAU acceptance signal.

In Step ST4211, the UE being served by the RN receives the information indicating that the TAU process has been performed and notifies the RN that the TAU process, for example, a change of the TAI list, has been completed in the UE.

In Step ST4212, the RN transmits the information indicating that the TAU process of the UE being served thereby has been completed to the target MME for RN, together with the completion of the TAU process of the RN.

The processes of Steps ST4210 and ST4211 may be performed only in a case where there is information to be transmitted to the UE. The method of making a notification from the RN to the UE, which has been disclosed in the first modification of the second embodiment described above, is applicable to the notification from the RN to the UE. The notification from the UE to the RN may be performed through dedicated signaling. For the UE in the RRC_Idle state, it suffices that the process of establishing the RRC connection with the RN is performed and a notification is made through dedicated signaling after the UE shifts to the RRC_connected state.

As described above, a part of the process in a case where there is information to be transmitted to the UE is included in the TAU acceptance signal of the RN, resulting in a simplification of the process. This reduces a signaling amount on the core network side with respect to the RN.

The method disclosed in this modification can suppress an increase in signaling load in the mobility management of a UE being served by an RN.

Seventh Embodiment

This embodiment discloses another method for solving a problem that when an RN moves, a source MME and a target MME cannot recognize a UE being served by the RN and the communication between the UE and core network is not allowed.

In a case where the RN has performed the HO process, the RN transmits, to the UE being served thereby, a signal to request the activation of the TAU.

The following two methods are disclosed as specific examples of the case in which an RN notifies a UE being served thereby of a TAU activation request signal.

(1) Case in which an RN transmits a TAU request.
(2) Case in which an RN receives a TAU accept.

The method (1) above is suitable for a case in which a related node has a high capability enough to simultaneously perform the TAU process of an RN and the TAU process of a UE being served by the RN. The TAU process of the RN and the TAU process of the UE being served by the RN are simultaneously performed, resulting in a reduction in process delay.

The method (2) above is suitable for a case in which a related node cannot simultaneously perform the TAU process of an RN and the TAU process of a UE being served by the RN. The method (2) above is also applicable to a case in which a related node has low processing capability.

Disclosed below is a specific example of the method in which an RN requests a UE being served thereby to activate the TAU in a case where the RN has performed the HO process.

FIG. 43 is a diagram showing a sequence in which an RN notifies a UE being served thereby of a TAU activation request signal in a case where the RN performs the HO process. The sequence shown in FIG. 43 is similar to the sequence shown in FIG. 26, and thus, the same steps are denoted by the same step numbers and common description is omitted. FIG. 43 shows a case of inter-MME HO.

In Step ST4301, the RN that has moved transmits a TAU request signal to the target MME for RN. In Step ST4303, accordingly, the TAU process of the RN is performed among the RN, source DeNB, target DeNB, source MME for RN, target MME for RN, and HSS.

In Step ST4302, the RN transmits a TAU activation request signal to the UE being served thereby, triggered by the TAU request signal transmitted from the RN to the target MME for RN. The method of making a notification from the RN to the UE, which has been disclosed in the first modification of the second embodiment described above, is applicable to the transmission of the TAU activation request signal.

In Step ST4304, the UE that has received the TAU activation request signal from the RN activates the TAU process. In Step ST4304, the UE transmits the TAU request signal to an MIME to be connected to a DeNB that serves the RN after moving, specifically, the target MME for UE. Upon this, the TAU process of the UE is performed among the UE, RN, source DeNB, target DeNB, source MME for UE, target MME for UE, source S-GW for UE, target S-GW for UE, P-GW for UE, and HSS.

The method disclosed in this embodiment causes the RN to move and then perform the TAU process and causes the UE being served by the RN that has moved together therewith to activate the TAU process as well. The target MME and source MME can accordingly manage the UE mobility, allowing for communication between the UE and core network.

The method disclosed in this embodiment is applicable not only to a case in which the RN performs inter-MME HO but also to a case in which the RN performs intra-MME HO. The use of the method of this embodiment allows for application of the same procedure irrespective of whether HO is inter-MME HO or intra-MME HO. This can simplify the control for allowing communication between a UE being served by an RN and a core network.

Eighth Embodiment

This embodiment discloses another method for solving a problem that when an RN moves, a source MME and a target MME cannot recognize a UE being served by the RN and communication between the UE and core network is not allowed.

The seventh embodiment described above is configured such that when an RN performs a HO process, the RN transmits, to a UE being served thereby, a signal to request the activation of the TAU. In this embodiment, meanwhile, the core network transmits, to the UE being served by the RN that has moved, a signal to request the activation of the TAU. The core network may be an MME for RN. The core network may be an MME for UE, S-GW for UE, or HSS, not limited to the MME for RN. Alternatively, the core network may be an S-GW functionality of a source DeNB. In a case where the RN performs inter-MME HO, it suffices that the core network is a target MME.

The following two methods are disclosed as specific examples of the case in which an MME for RN notifies a UE being served by an RN of a TAU activation request signal.

(1) Case in which the MME for RN receives a TAU request from the RN.
(2) Case in which the MME for RN transmits a TAU accept to the RN.

The method (1) above is suitable for a case in which a related node has a high capability enough to simultaneously perform the TAU process of an RN and the TAU process of a UE being served by the RN. The TAU process of the RN and the TAU process of the UE being served by the RN are simultaneously performed, resulting in a reduction in process delay.

The method (2) above is suitable for a case in which a related node cannot simultaneously perform the TAU process of an RN and the TAU process of a UE being served by the RN. The method (2) above is also applicable to a case in which a related node has low processing capability.

Disclosed below is a specific example of the method in which an MME for RN requests a UE being served by an RN to activate the TAU in a case where the RN performs the HO process.

Figure 44:
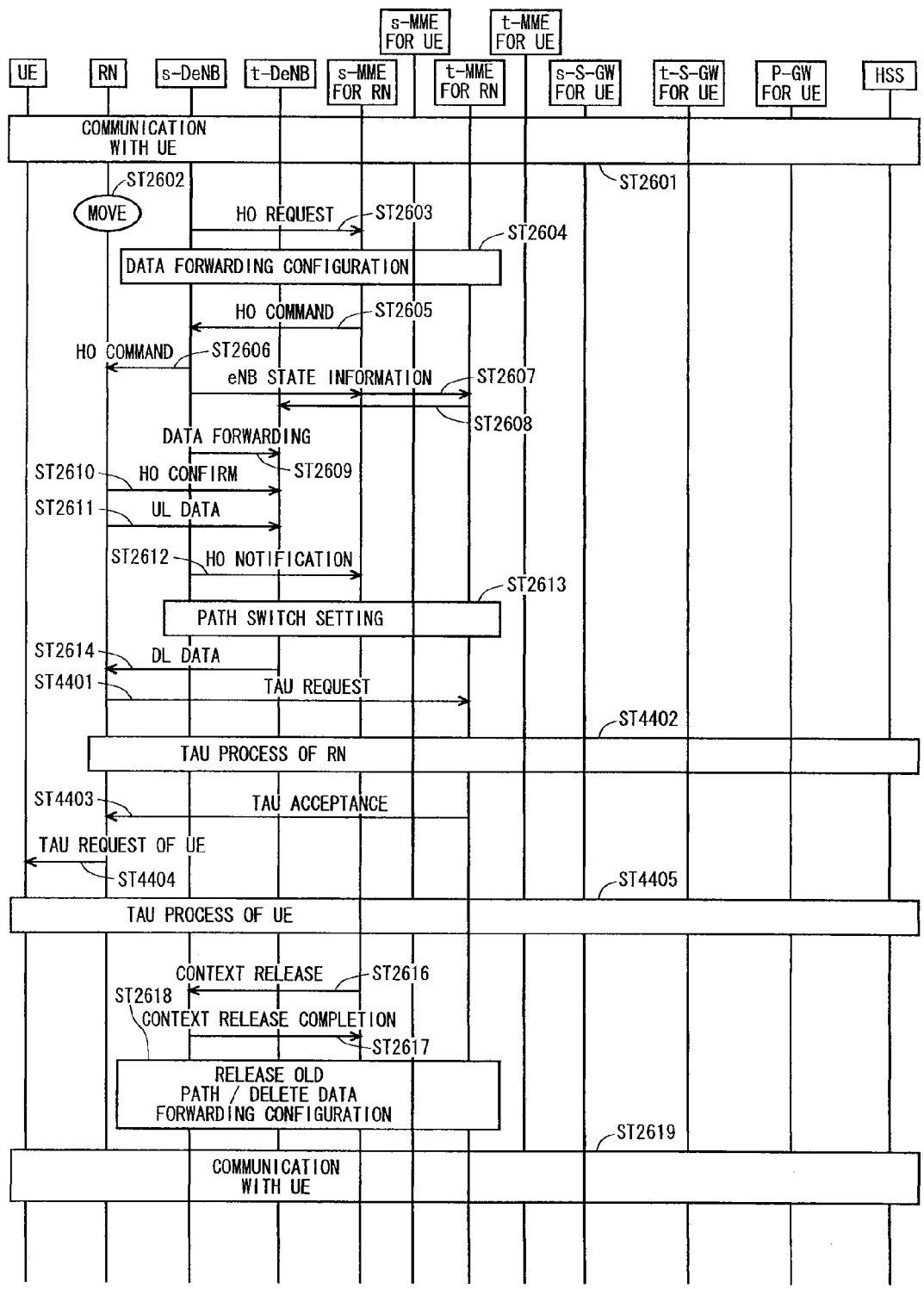
FIG. 44 is a diagram showing a sequence in which an MME for RN notifies a UE being served by an RN of a TAU activation request signal when the RN has performed the HO process.

FIG. 44 is a diagram showing a sequence in which an MME for RN notifies a UE being served by an RN of a TAU activation request signal in a case where the RN performs the HO process. The sequence shown in FIG. 44 is similar to the sequence shown in FIG. 26, and thus, the same steps are denoted by the same step numbers and common description is omitted. FIG. 44 shows a case of inter-MME HO.

In Step ST4401, the RN that has moved transmits a TAU request signal to the target MME for RN. Upon this, in Step ST4402, the TAU process of the RN is performed among the RN, source DeNB, target DeNB, source MME for RN, target MME for RN, and HSS.

In Step ST4403, the target MME for RN transmits a TAU acceptance signal to the RN. The target MME for RN includes the information to request the UE being served by the RN to activate the TAU in the TAU acceptance signal. At this time, the identity of the UE being served by the RN is transmitted together.

The TAU acceptance signal, which includes the information to request the UE being served by the RN to activate the TAU, is transmitted in Step ST4403, not limited to the above. Alternatively, other S1 signaling may be used or a signal for requesting a UE being served by the RN to activate the TAU may be newly provided and transmitted.

In Step ST4404, the RN transmits a TAU activation request signal to a UE being served thereby based on the information to request the UE being served by the RN to activate the TAU, which has been received from the target MME for RN. The method of making a notification from the RN to the UE, which has been disclosed in the first modification of the second embodiment described above, is applicable to the transmission of the TAU activation request signal.

The target MME for RN may transmit, to the RN via the target MME for UE, a signal on which the information to request a UE being served by the RN to activate the TAU is mapped. Alternatively, the target MIME for RN may transmit, to the target MME for UE and to a UE being served by an RN via the RN, a signal on which the information to request the activation of the TAU is mapped.

In Step ST4405, the UE that has received the TAU activation request signal from the RN activates the TAU process. In Step ST4405, the UE transmits a TAU request signal to an MME to be connected to a DeNB that serves the RN after moving, specifically, the target MME for UE. Upon this, the TAU process of the UE is performed among the UE, RN, source DeNB, target DeNB, source MME for UE, target MME for UE, source S-GW for UE, target S-GW for UE, P-GW for UE, and HSS.

The method disclosed in this embodiment causes the RN to move and then perform the TAU process and causes the UE being served by the RN that has moved together therewith to activate the TAU process. The target MME and source MME can accordingly manage the UE mobility, allowing for communication between the UE and core network.

The method disclosed in this embodiment is applicable not only to the case in which the RN performs inter-MME HO but also to the case in which the RN performs intra-MME HO. The use of the method of this embodiment allows for application of the same procedure irrespective of whether HO is inter-MME HO or intra-MME HO. This can simplify the control for allowing communication between a UE being served by an RN and a core network.

Ninth Embodiment

In a case where a large number of UEs being served by an RN simultaneously activate the TAU and the TAU processes of the large number of UEs are performed simultaneously, signaling loads may concentrate on the core network side with respect to the RN, and thus, a control delay and a TAU process failure may occur. Examples of the above are the cases disclosed in the first embodiment, seventh embodiment, and eighth embodiment described above. Examples of the above include a case in which the TAI of the RN is changed and a case in which the RN or the core network side requests the TAU from the UE being served by the RN. In order to solve such a problem, the TAU processes of the UEs being served by the RN are performed together.

A specific example of the TAU process in a case where the TAU processes of the UEs being served by the RN are performed together is disclosed.

Figure 45:
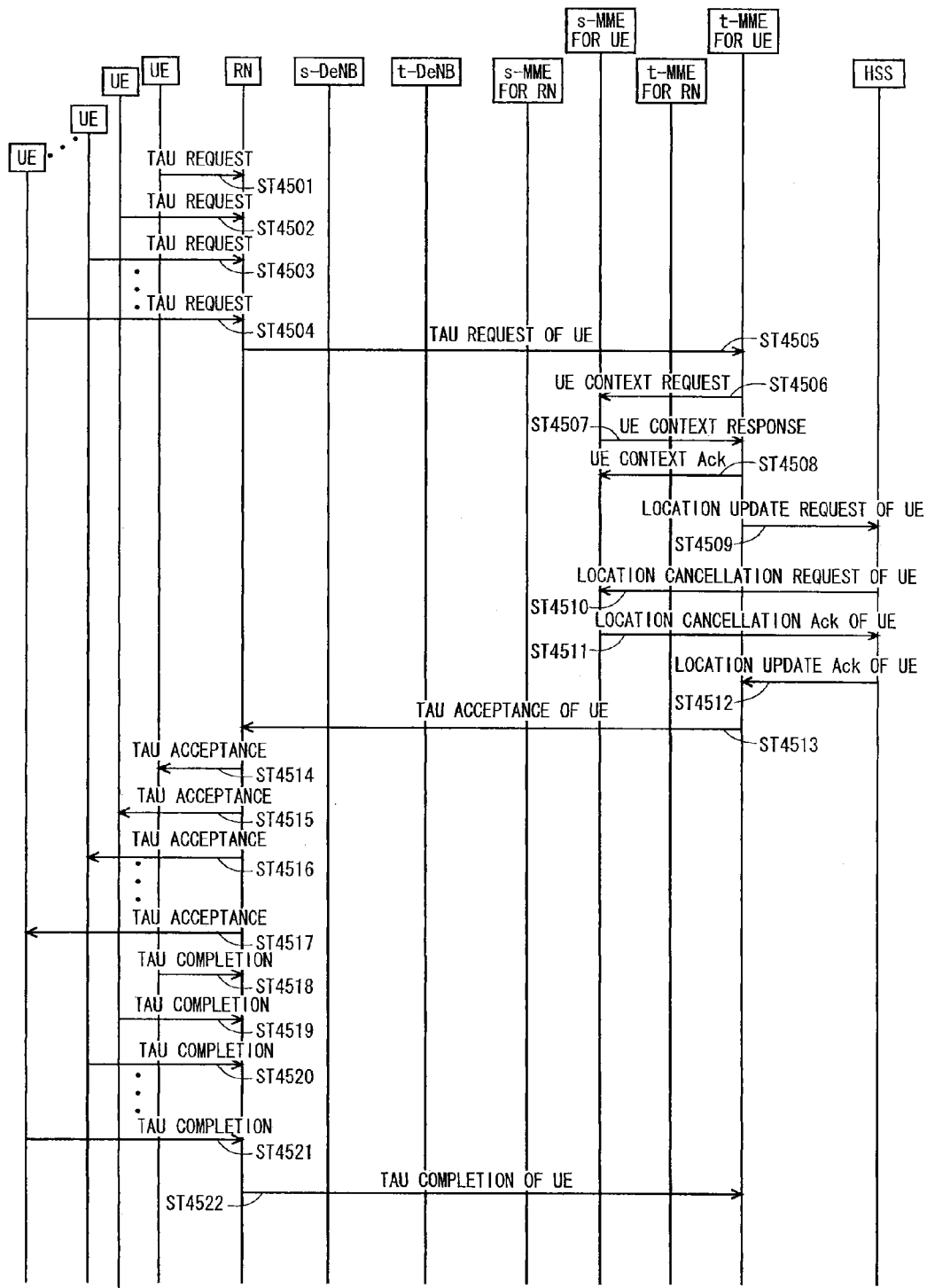
FIG. 45 is a diagram showing a sequence of a TAU process in a case where TAU processes of UEs being served by an RN are performed together.

FIG. 45 is a diagram showing a sequence of a TAU process in a case where the TAU processes of the UEs being served by the RN are performed together. FIG. 45 shows a case of the TAU between MMEs.

In Steps ST4501 to ST4504, a large number of UEs being served by an RN simultaneously activate the TAU and transmit a TAU request signal to the RN. The RN that has received a large number of TAU request signals includes those in one TAU request message together with the identities of the UEs that have transmitted the information included in the TAU request signal.

In Step ST4505, the RN transmits this one TAU request message to the target MME for UE.

In Step ST4506, the target MME for UE transmits, to the source MME for UE, one signal including pieces of context require information of all the UEs being served by the RN.

In Step ST4507, the source MME for UE transmits, to the target MME for UE, one signal including contexts of all the UEs being served by the RN.

In Step ST4508, the target MME for UE transmits, to the source MME for UE, one signal including context acceptance successes of all the UEs being served by the RN.

In Step ST4509, the target MME for UE transmits, to the HSS, one signal including pieces of location update request information of all the UEs being served by the RN.

In Step ST4510, the HSS transmits, to the source MME for UE, one signal including pieces of location cancellation request information of all the UEs being served by the RN.

The source MME for UE cancels the locations of all the UEs being served by the RN. In Step ST4511, then, the source MIME for UE transmits, to the HSS, a signal indicative of the location cancellation successes of all the UEs being served by the RN.

The HSS performs the process of updating locations of all the UEs being served by the RN. In Step ST4512, then, the HSS transmits, to the target MME for UE, a location update completion signal indicative of all the UEs being served by the RN.

The target MME for UE performs TAU processes of all the UEs being served by the RN. In Step ST4513, then, the target MME for UE transmits, to the RN, one signal including pieces of TAU accept information of all the UEs being served by the RN.

In Steps ST4514 to ST4517, the RN transmits the TAU acceptance signal to the UEs being served thereby.

The UEs that have received the TAU acceptance signal perform the TAU process, for example, updates the TAI list. In Steps ST4518 to ST4521, then, the UE transmits a TAU completion signal to the RN.

The RN that has received a large number of TAU completion signals includes those in one TAU completion message together with the identities of the UEs that have transmitted the information included in the TAU completion signal. At this time, the information common to all UEs and information dedicated to a UE may be differentiated such that the common information may be included in one signal as UE common information.

In Step ST4522, the RN transmits this one TAU completion message to the target MME for UE.

When the signal described above includes pieces of information of all the UEs being served by the RN, associations may be established together with the UE identities such that every association between information and UE is evident. They may be included in one message as a list.

The information common to all the UEs and the information dedicated to a UE may be differentiated such that the common information may be included in one signal as UE common information. This results in a reduction of information amount.

The UE having poor communication quality with an RN may not transmit a TAU request signal to the RN. In such a case, the RN will have kept waiting the TAU request signal from the UE until the communication quality with the UE becomes good. If the RN keeps waiting a TAU request signal, a large control delay is caused and, at worst, the TAU processes of all the UEs being served by the RN cannot be performed.

In order to solve this problem, a period, which spans from a time at which an RN receives a large number of TAU request signals of UEs being served thereby to a time at which the RN transmits the one TAU request message to the target MME for RN, may be taken as a predetermined period.

For example, the RN receives a TAU request signal from a UE being served thereby and, after a lapse of the predetermined period, transmits a TAU request message to the target MME for UE. The RN transmits one TAU request message, which includes the TAU request signals from all the UEs being served by the RN that have been received during the predetermined period, to the target MME for UE.

Through the above, a control delay can be reduced, allowing the RN to perform the TAU processes of UEs being served thereby as many as possible.

The predetermined period may be managed by a timer. The RN starts the timer upon receipt of a first TAU request signal from a UE being served thereby and, when the timer expires, transmits the TAU request signals from the UEs being served thereby that have been received so far, by including those in one TAU request message, to the target MME for UE.

The predetermined period may be set by the RN or may be set by the MME and notified the RN. Alternatively, the predetermined period may be notified the RN from the OAM being a node that holds and manages the RN.

The use of the method disclosed in this embodiment prevents the concentration of signaling loads on the core network side with respect to the RN also in a case where a large number of UEs being served by an RN simultaneously activate the TAU and the TAU processes of the large number of UEs are simultaneously performed, resulting in reductions in control delays and TAU process failures.

Tenth Embodiment

This embodiment discloses another method for solving a problem that when an RN moves, a source MME and a target MME cannot recognize a UE being served by the RN and communication between the UE and core network is not allowed.

The UE being served by the mobile RN regularly or periodically activates the TAU. As a result, the TAU process of the UE being served by the mobile RN is performed, enabling the MME to perform the mobility management of the UE. This allows for communication between the UE and core network.

The MME or mobile RN sets the TAU period of the UE and notifies the UE being served by the mobile RN of the TAU period. In a case where the MME sets the TAU period, the MME may notify the mobile RN using the S1 signaling or using the S1 signaling and the signaling on a Un interface, and then, the mobile RN may notify the UE being served thereby. As the method of notifying from the mobile RN to the UE being served thereby, the TAU period may be included in the system information and then be broadcast or may be notified in dedicated information. Alternatively, the TAU period may be included in an RN configuration parameter and then notified.

For an RN that supports the fixed mode and mobile mode, the TAU period for fixed mode and the TAU period for mobile mode may be set.

In a case where a UE being served by a mobile RN regularly or periodically activates the TAU, if the RN moves while the UE is activating the TAU, an MME cannot recognize the location of the UE, and thus cannot perform the mobility management. As a result, communication between the UE and core network is not allowed while the TAU is being activated. In order to shorten the period in which a mobile RN is not allowed communication, the TAU period of the mobile mode may be shortened. More specifically, the TAU period in the mobile mode may be shortened compared with the TAU period of the RN in the fixed mode or other cell (eNB). Consequently, the period in which the MME cannot perform the UE mobility management can be shortened.

In a case where the MME or RN makes a notification through dedicated signaling, the TAU period may differ from one UE to another. Alternatively, the TAU period may be set randomly from one UE to another.

The MME or RN may set the allowable TAU period range and notify a UE being served thereby. The UE is configured to individually select the TAU period from the allowable TAU period range at random.

As a result, the TAU process from the UE being served by the RN is randomly activated, preventing a control delay and a TAU process failure caused by the concentration of TAU processes among the UE, RN, and core network.

The method disclosed in this embodiment causes the TAU process of a UE being served by the mobile RN to be performed, allowing the MME to perform the mobility management of the UE. This allows for communication between the UE and core network.

In the methods of the present invention, the MME for RN and the MME for UE may be configured in the same MME. In a case where the MME for RN and the MME for UE are configured in the same MME, signaling between the MME for RN and the MME for UE is performed in the same MME, which does not require signaling between the MME for RN and the MME for UE.

The methods disclosed in the present invention are applicable not only to the case in which the RN performs the HO process but also to the case in which the RN selects or reselects a cell. Specifically, the method is also applicable to a case in which the RN reselects a cell as a result of moving, a case in which the power of the RN is turned off and then turned on again, or a case in which the communication quality between an RN and a DeNB declines and an RN thus selects or reselects a cell after a radio link failure. Also in this case, the TAU processes of the RN and the UE being served thereby are allowed such that communication between the UE being served by the RN and the core network is allowed.

The methods disclosed in the present invention can be appropriately carried out in combination. The control according to a situation of a system such as UE, relay, eNB, or MME can be performed.

It has been described that, as the method of dividing relay resources, a link from a DeNB to an RN and a link from an RN to a UE are time-division multiplexed in one frequency band and a link from the RN to the DeNB and a link from the UE to the RN are also time-division multiplexed in one frequency band. However, not limited to the above, and other division method may be used.

For example, the link from the DeNB to the RN and the link from the RN to the UE may be frequency-division multiplexed in different carriers or frequency bands, and the link from the RN to the DeNB and the link from the UE to the RN may also be frequency-division multiplexed in different carriers or frequency bands. The methods disclosed in the first to tenth embodiments described above are applicable.

The methods disclosed in the present invention are applicable not only to a relay node but also to an RRU, RRE, RRH, and the like to be connected to an eNB. For example, the RRH and eNB are wirelessly connected. It suffices that the access link between the RN and UE is applied to the radio link between the RRH and UE and the backhaul link between the DeNB and RN is applied to the radio link between the eNB and RRH. This allows for communication between a UE being served by an RRH and a core network also in a case where the RRH moves. The same holds true for an RRU and an RRE. The RRU, RRE, and RRH correspond to a relay device.

The methods disclosed in the present invention are applicable not only to a relay node but also to a HeNB. The HeNB and MME or the HeNB and HeNBGW are wirelessly connected. The access link between the RN and UE may be applied to the radio link between the HeNB and UE, and the link between the MME and RN that includes the backhaul link between the DeNB and RN may be applied to the radio link between the MME and HeNB. Alternatively, the link between the MME and RN that includes the backhaul link between the DeNB and RN may be applied to the radio link between the HeNBGW and HeNB. This allows for communication between the UE being served by a HeNB and a core network in a case where the HeNB moves. The HeNB corresponds to a relay device.

The methods disclosed in the present invention are applicable not only to a relay node but also to any node or device that has functions and modes of both of the user equipment and base station. The node or device that has functions and modes of both of the user equipment and base station corresponds to a relay device.

As described above, the methods disclosed in the present invention are applicable, as a DeNB that serves a relay, not only to normal eNBs (macro cells) but also to so-called local nodes such as pico eNB (pico cell), HeNB (femtocell), node for hotzone cell, relay node, and remote radio head (RRH). The local node corresponds to a relay device.

The embodiments above have described a user equipment (UE) carried by a passenger in a moving body such as an express bus or high-speed rail, not limited thereto. The embodiments above are also applicable to communication equipments not required to be operated by a person. The embodiments above are also applicable to an equipment (MTC device) for machine type communication (MTC) as the communication equipment not required to be operated by a person. The communication equipment corresponds to a user equipment device.

While the embodiments above have described the RN in the LTE-A, the communication system of the present invention is also applicable to a case in which relay communication is performed in other communication system or a case in which relay communication is performed in a heterogenous communication system.

While the invention has been shown and described in detail, the foregoing description is in all aspects illustrative and not restrictive. It is therefore understood that numerous modifications and variations can be devised without departing from the scope of the invention.

DESCRIPTION OF REFERENCE SYMBOLS 1501 second MME, 1502 to 1507 seventh to twelfth eNBs (cells), 1508 relay node (RN), 1509 user equipment (UE), 1511 to 1516 seventh to twelfth coverages, 1602 third TA, 1519 fourth TA, 1520 first MME, 1522 to 1527 first to sixth eNBs (cells), 1528 to 1533 first to sixth coverages, 1601 first TA, 1535 second TA.

The invention claimed is:
1. A mobile communication system comprising a plurality of base station devices to be connected to a core network, a user equipment device configured to perform radio communications with said base station devices, and a relay device movably configured to relay said radio communications between said base station devices and said user equipment device, wherein
said core network includes a mobility management entity that manages said base station devices, said user equipment device, and said relay device per predetermined tracking area,
said relay device sets, as a relay device tracking area of said relay device, a base station device tracking area of a base station device that is connected to said relay device belongs, and
upon judging that said relay device tracking area has changed when said relay device is connected to said user equipment device, said user equipment device transmits a user equipment device tracking area update request signal for updating a user equipment device tracking area of said user equipment device to said mobility management entity via said relay device whose relay device tracking area has changed.

2. The mobile communication system according to claim 1, wherein
said core network includes a plurality of said mobility management entity,
said user equipment device was connected to a first mobility management entity before said relay device tracking area was changed, and
said user equipment device transmits said user equipment device tracking area update request signal for updating said user equipment device tracking area to a second mobility management entity after said relay device tracking area has changed via said relay device whose relay device tracking area has changed.

3. A mobile communication system comprising a plurality of base station devices to be connected to a core network, a user equipment device configured to perform radio communication with said base station devices, and a relay device movably configured to relay said radio communications between said base station devices and said user equipment device, wherein
said core network includes a mobility management entity that manages said base station devices, said user equipment device, and said relay device per predetermined tracking area,
upon judging that a base station tracking area of a base station device connected to said relay device has changed, said relay device transmits a relay device tracking area update request signal for updating a relay device tracking area of said relay device to said mobility management entity,
upon receipt of said relay device tracking area update request signal from said relay device, said mobility management entity initiates and performs a process of updating said relay device tracking area, and
upon receipt of said relay device tracking area update request signal from said relay device, said mobility management entity initiates and performs a process of updating a user equipment device tracking area of said user equipment device.

4. The mobile communication system according to claim 3, wherein
said core network includes a plurality of said mobility management entity, each of said plurality of mobility management entity being configured to manage a tracking area different from that of other mobility managing entities,
(A) upon judgment that said base station tracking area of said base station device connected to said relay device has changed and judgment that a mobility management entity that manages said base station tracking area of said base station device connected to said relay device has not changed, said relay device transmits said relay device tracking area update request signal to said mobility management entity that manages said base station tracking area of said base station device connected to said relay device, and
(B) upon judgment that said base station tracking area of said base station device connected to said relay device has changed and judgment that said mobility management entity that manages said base station tracking area of said base station device connected to said relay device has changed,
(B1) said relay device sets, as said relay device tracking area, said base station tracking area of said base station device connected to said relay device, and
(B2) upon judging that said relay device tracking area of said relay device connected to said user equipment device has changed, said user equipment device transmits a user equipment device tracking area update request signal for updating said user equipment device tracking area to a mobility management entity that manages said relay device tracking area of said relay device connected to said user equipment device.

5. The mobile communication system according to claim 3, wherein
said core network includes a plurality of said mobility management entity,
upon judging that said base station tracking area of said base station device connected to said relay device has changed, said relay device transmits said relay device tracking area update request signal for updating said relay device tracking area of said relay device to a first mobility management entity, and
upon receipt of said relay device tracking area update request signal from said relay device, said first mobility management entity transmits a user equipment device tracking area update request signal for updating said user equipment device tracking area of said user equipment device to a second mobility management entity.

* * * * *